US011402136B2

(12) United States Patent
Rule et al.

(10) Patent No.: US 11,402,136 B2
(45) Date of Patent: Aug. 2, 2022

(54) DRUM-TYPE MAGNETIC REFRIGERATION APPARATUS WITH MULTIPLE BED RINGS

(71) Applicant: Astronautics Corporation of America, Milwaukee, WI (US)

(72) Inventors: Kyle Charles Rule, Milwaukee, WI (US); Andre Michael Boeder, Milwaukee, WI (US); Carl Bruno Zimm, Milwaukee, WI (US); Bryant Wayne Mueller, Milwaukee, WI (US); Steven Lee Russek, Milwaukee, WI (US); Jeremy Jonathan Chell, Milwaukee, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 363 days.

(21) Appl. No.: 16/110,751

(22) Filed: Aug. 23, 2018

(65) Prior Publication Data

US 2019/0063796 A1    Feb. 28, 2019

Related U.S. Application Data

(60) Provisional application No. 62/550,464, filed on Aug. 25, 2017.

(51) Int. Cl.
*F25B 21/00* (2006.01)

(52) U.S. Cl.
CPC ........ *F25B 21/00* (2013.01); *F25B 2321/002* (2013.01); *F25B 2321/0021* (2013.01);
(Continued)

(58) Field of Classification Search
CPC ............... F25B 21/00; F25B 2321/022; F25B 2321/021; F25B 2321/002;
(Continued)

(56) References Cited

U.S. PATENT DOCUMENTS

| 4,332,135 A | 6/1982 | Barclay et al. |
| 4,702,090 A | 10/1987 | Barclay et al. |

(Continued)

FOREIGN PATENT DOCUMENTS

| DE | 10 2006 011 013 | 9/2007 |
| EP | 2 420 760 A1 | 2/2012 |

(Continued)

OTHER PUBLICATIONS

Apex Magnets. (Apr. 26, 2015). Retrieved Apr. 11, 2019, from https://www.apexmagnets.com/news-how-tos/the-various-shapes-of-magnets-and-their-uses/ (Year: 2015).

(Continued)

*Primary Examiner* — John F Pettitt, III
(74) *Attorney, Agent, or Firm* — Foley & Lardner LLP

(57) ABSTRACT

A magnetic refrigeration apparatus according to the present disclosure includes a magnetic-field source and two or more bed rings. The bed rings can be arranged in pairs with shared cold and hot fluid plenums. A flow of heat transfer fluid may pass at least partially radially through the shared fluid plenum or through a connection between the fluid plenum and one or more flow tubes. The MR apparatus and systems of the present disclosure may further include one or more circumferential flux returns with radial through-hole passageways to accommodate flow tubing. For apparatus configurations with an even number of bed rings, the axial dimension of the passageways may be smaller than the circumferential dimension of the passageways.

19 Claims, 35 Drawing Sheets

(52) U.S. Cl.
CPC ............... F25B 2321/0022 (2013.01); F25B 2321/0023 (2013.01)

(58) Field of Classification Search
CPC ............ F25B 2321/0023; H01F 7/021; H01F 7/70205; H01F 7/0278; H01F 7/0273; H01F 1/012
USPC .......................................................... 62/3.1
See application file for complete search history.

(56) References Cited

U.S. PATENT DOCUMENTS

| | | | |
|---|---|---|---|
| 5,028,902 A * | 7/1991 | Leupold | H01F 7/0278 335/306 |
| 5,249,424 A | 10/1993 | Degregoria et al. | |
| 5,934,078 A | 8/1999 | Lawton et al. | |
| 6,526,759 B2 | 3/2003 | Zimm et al. | |
| 6,668,560 B2 | 12/2003 | Zimm et al. | |
| 6,935,121 B2 | 8/2005 | Fang et al. | |
| 6,946,941 B2 | 9/2005 | Chell | |
| 7,148,777 B2 | 12/2006 | Chell et al. | |
| 7,481,064 B2 | 1/2009 | Kitanovski et al. | |
| 7,650,756 B2 | 1/2010 | Muller et al. | |
| 8,037,692 B2 | 10/2011 | Muller et al. | |
| 9,027,339 B2 | 5/2015 | Morimoto et al. | |
| 9,995,512 B2 | 6/2018 | Morimoto et al. | |
| 10,030,895 B2 | 7/2018 | Kim et al. | |
| 10,436,481 B2 | 10/2019 | Vetrovec | |
| 10,684,044 B2 | 6/2020 | Schroeder | |
| 10,782,051 B2 | 9/2020 | Schroeder | |
| 10,830,506 B2 | 11/2020 | Schroeder | |
| 2002/0053209 A1 | 5/2002 | Zimm et al. | |
| 2005/0046533 A1 | 3/2005 | Chell | |
| 2005/0242912 A1 | 11/2005 | Chell et al. | |
| 2009/0019859 A1 | 1/2009 | Shin et al. | |
| 2009/0308079 A1 | 12/2009 | Lee | |
| 2010/0000228 A1 | 1/2010 | Wiest et al. | |
| 2010/0071383 A1 | 3/2010 | Zhang et al. | |
| 2010/0146989 A1 | 6/2010 | Egolf et al. | |
| 2011/0041514 A1 | 2/2011 | Heitzler et al. | |
| 2011/0061398 A1 | 3/2011 | Shih et al. | |
| 2011/0146300 A1 | 6/2011 | Duval | |
| 2011/0192833 A1 | 8/2011 | Muller et al. | |
| 2011/0215088 A1 | 9/2011 | Muller et al. | |
| 2012/0074130 A1 | 3/2012 | Muller et al. | |
| 2012/0139676 A1 | 6/2012 | Sari et al. | |
| 2012/0272666 A1 | 11/2012 | Watanabe et al. | |
| 2013/0104568 A1 | 5/2013 | Kuo et al. | |
| 2013/0186107 A1 | 7/2013 | Shih et al. | |
| 2013/0298571 A1 | 11/2013 | Morimoto et al. | |
| 2014/0165595 A1 | 6/2014 | Zimm et al. | |
| 2014/0311165 A1 | 10/2014 | Watanabe et al. | |
| 2015/0184902 A1* | 7/2015 | Torii | F25B 21/00 62/3.1 |
| 2015/0184903 A1 | 7/2015 | Mun et al. | |
| 2015/0206638 A1 | 7/2015 | Muller | |
| 2015/0267943 A1 | 9/2015 | Kim et al. | |
| 2016/0025385 A1 | 1/2016 | Auringer et al. | |
| 2016/0076797 A1 | 3/2016 | Boeder et al. | |
| 2016/0091227 A1 | 3/2016 | Leonard et al. | |
| 2016/0238287 A1 | 8/2016 | Benedict | |
| 2016/0298880 A1 | 10/2016 | Humburg | |
| 2016/0298881 A1 | 10/2016 | Humburg | |
| 2016/0370037 A1 | 12/2016 | Morimoto et al. | |
| 2017/0059214 A1 | 3/2017 | Shirron | |
| 2017/0067670 A1 | 3/2017 | Kummlee et al. | |
| 2017/0120419 A1 | 5/2017 | Li et al. | |
| 2017/0130999 A1 | 5/2017 | Numazawa | |
| 2017/0328609 A1 | 11/2017 | Benedict et al. | |
| 2017/0336108 A1 | 11/2017 | Muller | |
| 2017/0363333 A1 | 12/2017 | Vetrovec | |
| 2018/0023851 A1 | 1/2018 | Benedict et al. | |
| 2018/0045437 A1 | 2/2018 | Vetrovec | |
| 2018/0156502 A1 | 6/2018 | Benedict et al. | |
| 2018/0156503 A1 | 6/2018 | Benedict et al. | |
| 2019/0063794 A1 | 2/2019 | Shirron et al. | |
| 2019/0063795 A1 | 2/2019 | Rule et al. | |
| 2019/0063796 A1 | 2/2019 | Rule et al. | |
| 2019/0170408 A1 | 6/2019 | Iwaya | |
| 2019/0323744 A1 | 10/2019 | Schroeder | |

FOREIGN PATENT DOCUMENTS

| | | |
|---|---|---|
| JP | 2002-106999 | 4/2002 |
| JP | 2008-051410 A | 3/2008 |
| JP | 2008-051412 A | 3/2008 |
| JP | 2009-543022 A | 12/2009 |
| WO | WO-03/016794 A1 | 2/2003 |
| WO | WO-2008/007834 A1 | 1/2008 |

OTHER PUBLICATIONS

Barcza, et al., "Stability and magnetocaloric properties of sintered La(Fe,Mn,Si) 13H2 alloys," presented at the IEEE International Magnetics Conference (Taipei, Taiwan) 2011, session ED-07.
Dung, et al., "Mixed Magnetism for Refrigeration and Energy Conversion," Advanced Energy Materials 1, 1215, (2011), 6 pages.
Engelbrecht, et al., "Recent Developments in Room Temperature Active Magnetic Regenerative Refrigeration," HVAC&R Research, 13 (2007) pp. 525-542.
Extended European Search Report in EP 13864149, dated May 22, 2017 (10 pages).
Frischmann, et al., "Measuring Nusselt number using a single-blow regenerator facility", Proc. 3rd Int. Conf. on Mag. Refrig. at Room Temp., pp. 443-448 (2009).
Gschneidner, et al., "Thirty years of near room temperature magnetic cooling: Where we are today and future prospects," International Journal of Refrigeration, Sep. 2008, vol. 31, Issue 6, pp. 945-961.
International Preliminary Reporton Patentability in International Application No. PCT/US2013/075009 dated Jul. 2, 2015(8 pages).
International Search Report and Written Opinion in International Application No. PCT/US2013/075009 dated Aug. 26, 2014 (13 pages).
International Search Report and Written Opinion in International Application No. PCT/US2014/070106 dated Mar. 10, 2015 (10 pages).
International Search Report and Written Opinion in PCT/IB2018/056361 dated Nov. 20, 2018 (16 pages).
International Search Report and Written Opinion in PCT/IB2018/056402 dated Dec. 17, 2018 (14 pages).
Jacobs, "Modeling and optimal design of a multilayer active magnetic refrigeration system," Proc. 3rd Int. Conf on Mag. Refrig. at Room Temp., pp. 267-273 (2009).
Jacobs, et al., "Modeling of a magnetic refrigeration system with a layered bed," Proceedings of the 2010 International Symposium on Next-generation Air Conditioning and Refrigeration Technology (Japan): p. 09-1-p. 09-9, 2010.
Jacobs, et al., "The Performance of a Large-Scale Rotary Magnetic Refrigerator," Proceedings of the 5th International Conference on Magnetic Refrigeration at Room Temperature, Sep. 2012; published in the International Journal of Refrigeration, 37 (2014), pp. 84-91.
Jasinski, et al., "La(Fe,Co,Si)13 bulk alloys and ribbons with high temperature magnetocaloric effect" Journal of Applied Physics, v107, n9, p. 09A953 (3 pp.), 2010.
Non-Final Office Action on U.S. Appl. No. 15/686,862 dated Apr. 18, 2019.
Non-Final Rejection Office Action on U.S. Appl. No. 14/105,843 dated Aug. 12, 2016 (12 pages).
Non-Final Rejection Office Action on U.S. Appl. No. 14/105,843 dated Jan. 21, 2016 (12 pages).
Notice of Preliminary Rejection in KR 10-2017-7005425 dated Oct. 30, 2017, with English translation (11 pages).
Office Action in JP Appl. 2015-547987 dated Jan. 4, 2016, with English translation (10 pages).
Office Action in JP2017-504347 dated Aug. 23, 2017, with English translation (10 pages).

(56) References Cited

OTHER PUBLICATIONS

Russek, at al., "The performance of a rotary magnet magnetic refrigerator with layered beds," Proc. 4th Conference on Magnetic Refrigeration at Room Temperature, Baotou, China, Aug. 23-28, 2010, pp. 339-349.
Russek, et al., "Potential for cost effective magnetocaloric air conditioning systems," International Journal of Refrigeration, vol. 29, Issue 8, Dec. 2006, pp. 1366-1373.
Schmidt, F.W., et al., "Thermal Energy Storage and Reneration," McGraw-Hill Inc. (1981).
Supplementary Partial European Search Report dated Jan. 19, 2017 for EP Appl. 13864149 (7 pages).
Tagliafico, et al., "Dynamic 1D Model of an Active Magnetic Regenerator: A Parametric Investigation," Strojniski vestnik—Journal of Mechanical Engineering 58(2012) 1, pp. 9-15.
U.S. Notice of Allowance on U.S. Appl. No. 14/569,450 dated Feb. 14, 2017.
Zimm, et al., "Description and Performance of a Near-Room Temperature Magnetic Refrigerator", Advances in Cryogenic Engineering, 43, pp. 1759-1766 (1998).
Zimm, et al., "Design and initial performance of a magnetic refrigerator with a rotating permanent magnet," Proceedings of the 2nd International Conference on Magnetic Refrigeration at Room Temperature: pp. 341-347 (2007).
Zimm, et al., "Design and Performance of a Permanent Magnet Rotary Refrigerator," International Journal of Refrigeration, vol. 29, pp. 1302-1306 (2006).
Zimm, et al., "Near room temperature magnetic refrigeration: the path to applications," Proc. 3rd Int. Conf. on Mag. Refrig, at Room Temp., pp. 355-361 (2009).
Non-Final Office Action in U.S. Appl. No. 15/686,862 dated Jun. 23, 2020 (12 pages).
Final Office Action on U.S. Appl. No. 15/686,862 dated Oct. 16, 2019.
Notice of Allowance on U.S. Appl. No. 15/686,862 dated May 25, 2021.
Non-Final Office Action in U.S. Appl. No. 15/686,862 dated Feb. 8, 2021.

* cited by examiner

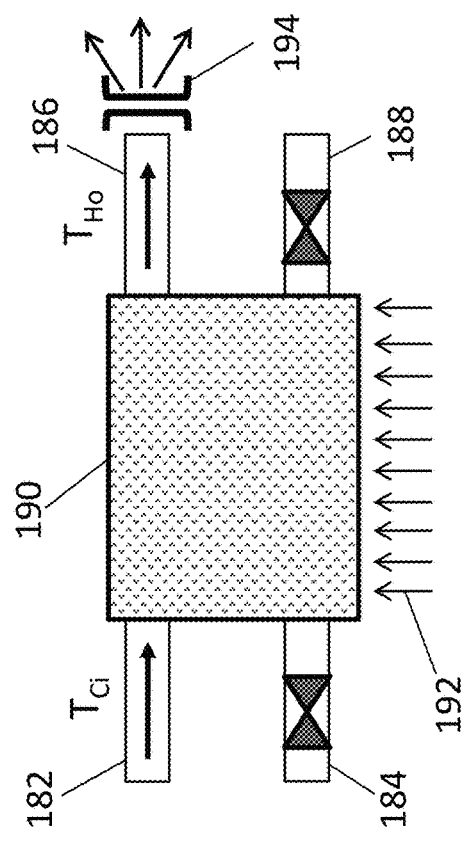
FIG. 1A: Magnetization
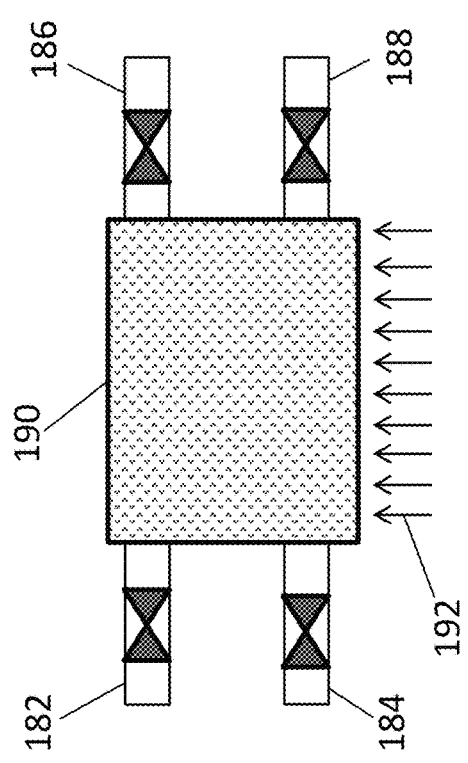
FIG. 1B: Cold to hot flow
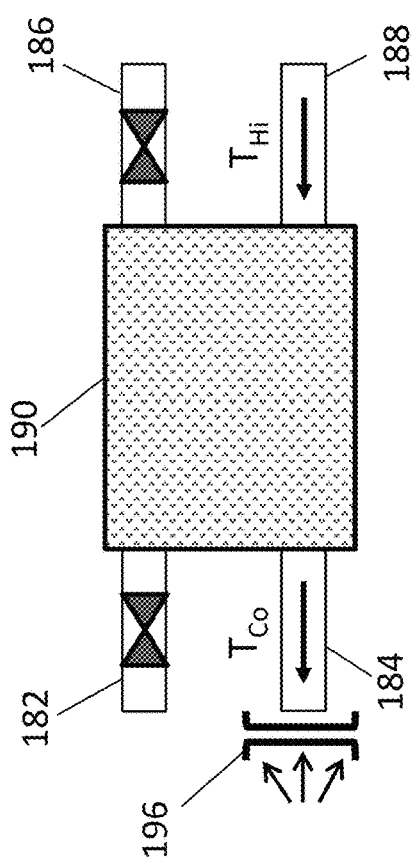
FIG. 1C: Demagnetization
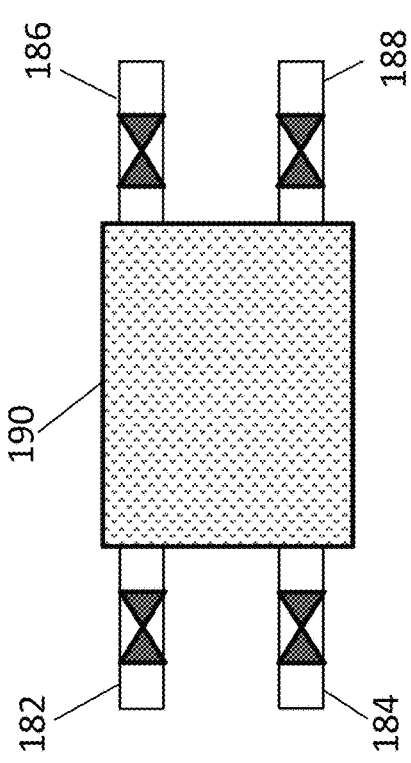
FIG. 1D: Hot to cold flow

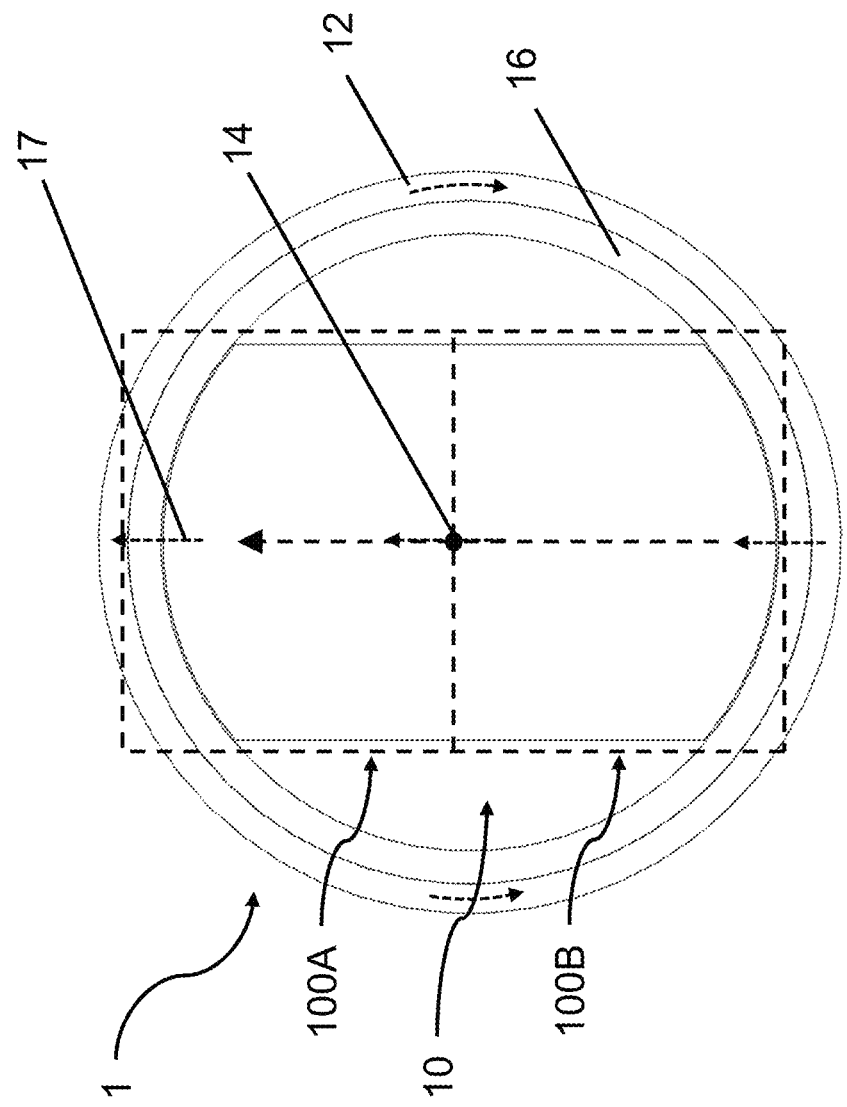

Multiple drum
Parallel flow
Blow process #2

Two active bed rings
Series flow
Blow process #2

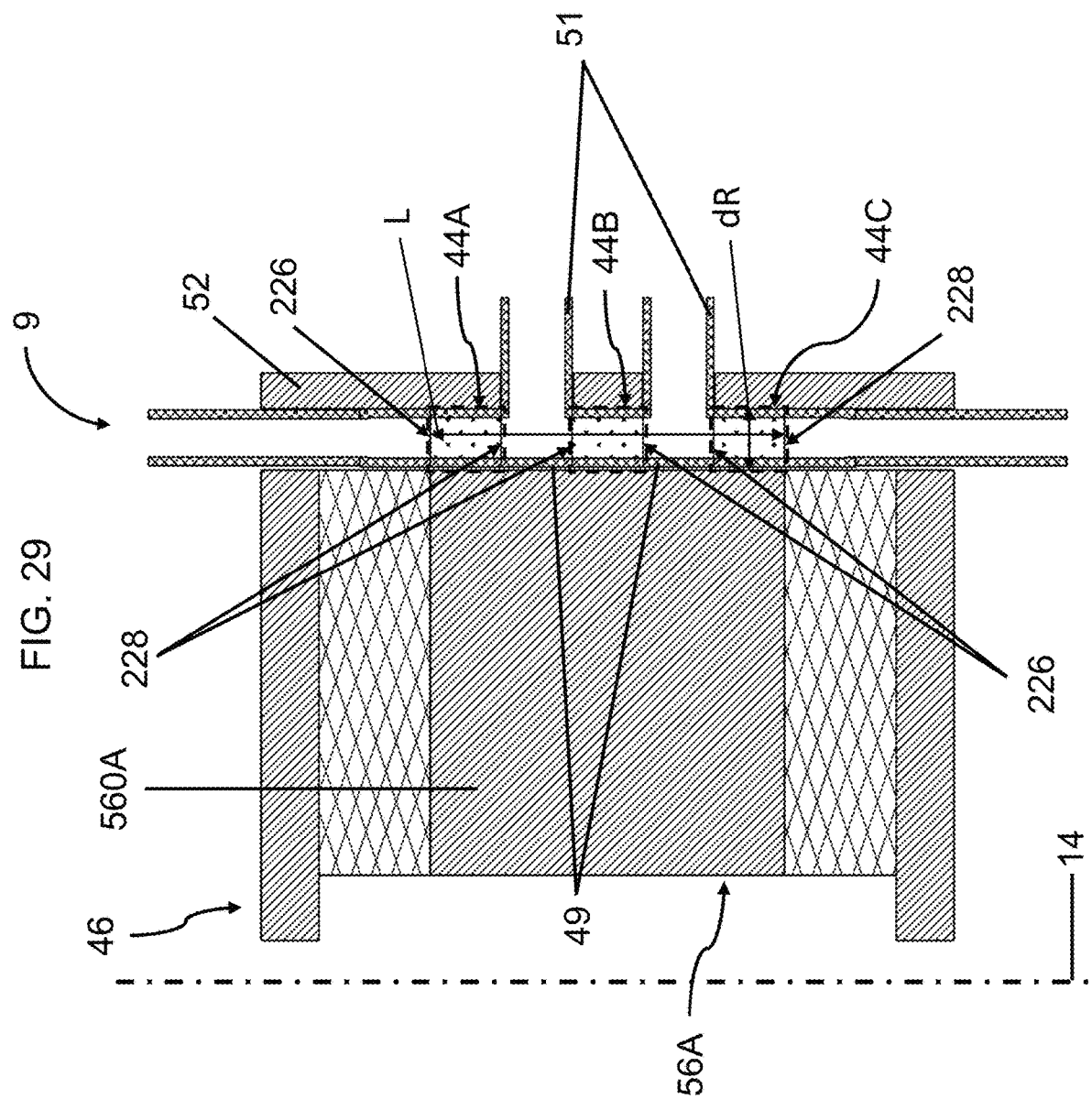

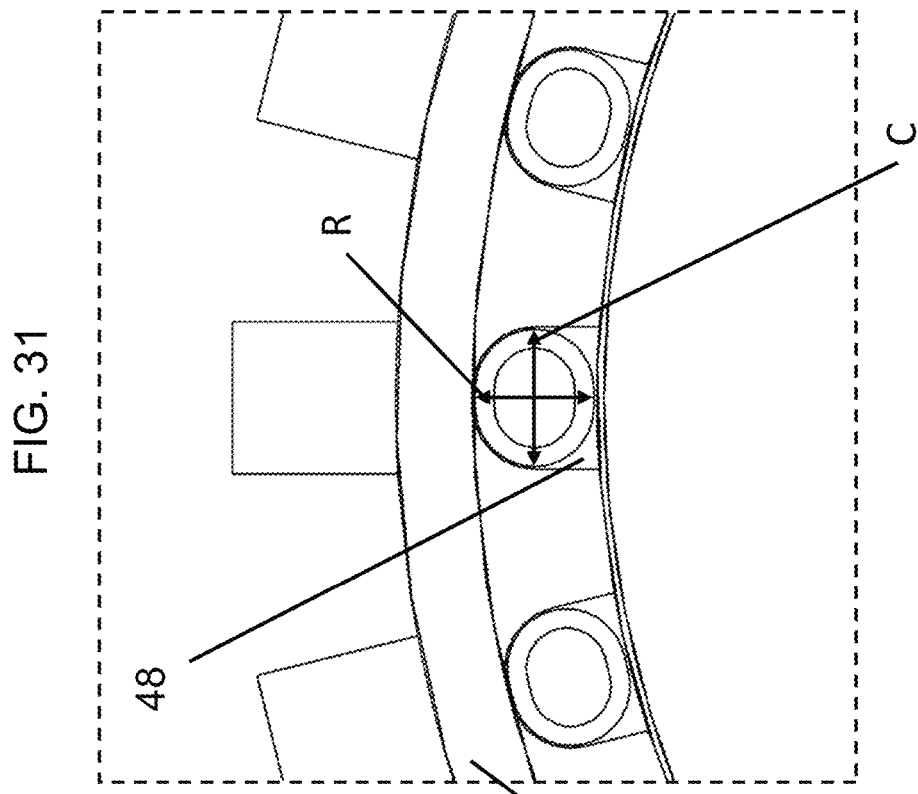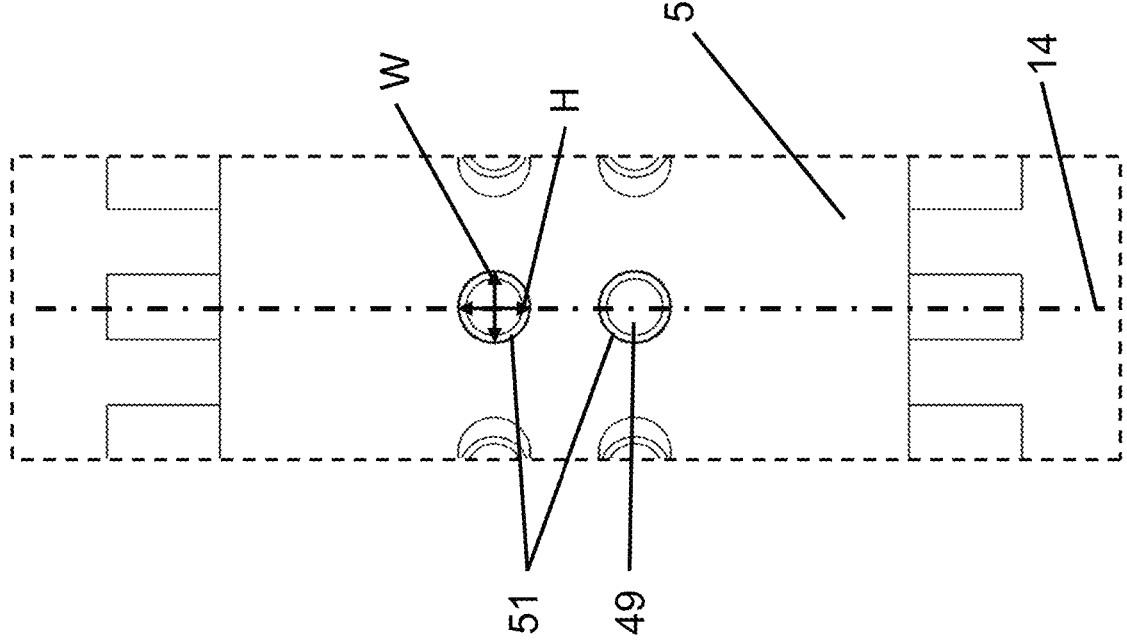

DRUM-TYPE MAGNETIC REFRIGERATION APPARATUS WITH MULTIPLE BED RINGS

CROSS-REFERENCE TO RELATED APPLICATIONS

This application claims the benefit of and priority to U.S. Provisional Application No. 62/550,464, filed Aug. 25, 2017, the content of which is incorporated herein by reference in its entirety.

BACKGROUND

Magnetic refrigeration (MR) is an emerging cooling technology that is based on the magnetocaloric effect: a property exhibited by certain materials which heat up when placed in a magnetic field and cool down when the field is removed. Magnetic refrigeration offers a number of distinct advantages over vapor compression, which is currently the most widely used method for cooling. First, MR uses no hydrofluorocarbons (HFCs), chlorofluorocarbons (CFCs), nor any other gaseous materials; the refrigerant in the MR system is in the form of a porous solid. The absence of any gases greatly reduces the potential for leaks, a common problem in vapor compression systems. As a result, MR systems can have greater reliability with reduced maintenance and downtime. The elimination of HFCs and CFCs has benefits for the environment, as these gases are ozone-depleting and contribute to global warming. Also, theoretical studies demonstrate that MR systems can be more energy-efficient than vapor compression systems, particularly under off-peak load conditions. Many areas of opportunity exist to improve the performance of MR systems and reduce manufacturing costs.

SUMMARY

One aspect of the present disclosure is directed to MR apparatus and systems having a magnetic-field source and two or more bed rings. The magnetic-field source may be configured to apply a time-varying magnetic field oriented in a substantially radial direction to one or more bed rings. The beds in each pair of bed rings may be connected to one another by a shared fluid plenum. A flow of heat transfer fluid may pass at least partially radially through the shared fluid plenum or through a connection between the fluid plenum and one or more flow tubes. The MR apparatus and systems may also include a heat transfer fluid, one or more hot side heat exchangers (HHEXs), and one or more pumps or fluid displacement devices configured to move the heat transfer fluid through the MR apparatus. The MR apparatus can also include one or more valves configured to control the flow of heat transfer fluid, one or more cold side heat exchangers (CHEXs) that accept fluid from the demagnetized beds, and one or more nominally circumferential flux returns. The one or more circumferential flux returns are located on the opposite side of the beds as the magnetic-field source. The one or more circumferential flux returns can be made from a soft magnetic material and guide the magnetic field from a pole of the magnetic-field source through the beds and then onto an opposing pole of the magnetic-field source to complete the magnetic circuit.

An embodiment of the MR apparatus, referred to herein as the two-drum embodiment, includes a single magnetic-field source, an even number of bed rings that are arranged in a parallel flow configuration, and a circumferential flux return that is located at a larger radial position than the beds (so that the circumferential flux return surrounds the beds). Each bed ring is arranged so that the hot end of the bed ring faces toward an axial end of the MR apparatus. This arrangement allows the cold end plenums to be shared between the two bed rings, which reduces the required number of cold end flow tube connections by a factor of two. Radial through-hole passageways are machined into the circumferential flux return to accommodate flow tubes between the beds and the one or more CHEX(s). These through-hole passageways penetrate the circumferential flux return along a mirror symmetry plane that is normal to the central axis. In this arrangement the axial dimension of the through-hole passageways may be less than the circumferential dimension of the through-hole passageways to provide a low magnetic reluctance pathway for the magnetic flux. Using through-hole passageways with a narrow axial dimension reduces the required axial length of the plenums between bed rings. In addition to the parallel flow configuration utilized for the illustrative embodiment of the two-drum MR apparatus, the flow may optionally be configured to pass through multiple bed rings in series. In the series flow arrangement, the MR apparatus can further include a device to turn off the flow through one of the bed rings, thereby adjusting the refrigeration load temperature or otherwise altering the performance of the MR apparatus.

An embodiment of the MR apparatus, referred to herein as the three-drum embodiment, includes an odd number of bed rings in a parallel flow configuration. Like the two-drum embodiment, the bed rings for the three-drum embodiment can be arranged in pairs with shared cold and hot end fluid plenums. In some instances, the three-drum embodiment may have improved mass efficiency of the permanent magnet material over the two-drum embodiment.

BRIEF DESCRIPTION OF THE DRAWING

FIGS. 1A-1D are schematics illustrating an AMR cycle to perform cooling, in accordance with an illustrative embodiment.

FIG. 4 is an end view of the MR apparatus of FIG. 3.

FIG. 29 is a side view of the MR apparatus of FIG. 27 showing half of the MR apparatus at a cross-section through the high field region of the gap, along a symmetry plane that is parallel to the central axis, in accordance with an illustrative embodiment.

FIG. 30 is a partial, side view of the MR apparatus of FIG. 27, in accordance with an illustrative embodiment.

FIG. 31 is a partial, end view of the MR apparatus of FIG. 27, in accordance with an illustrative embodiment.

DETAILED DESCRIPTION

Figure 2:
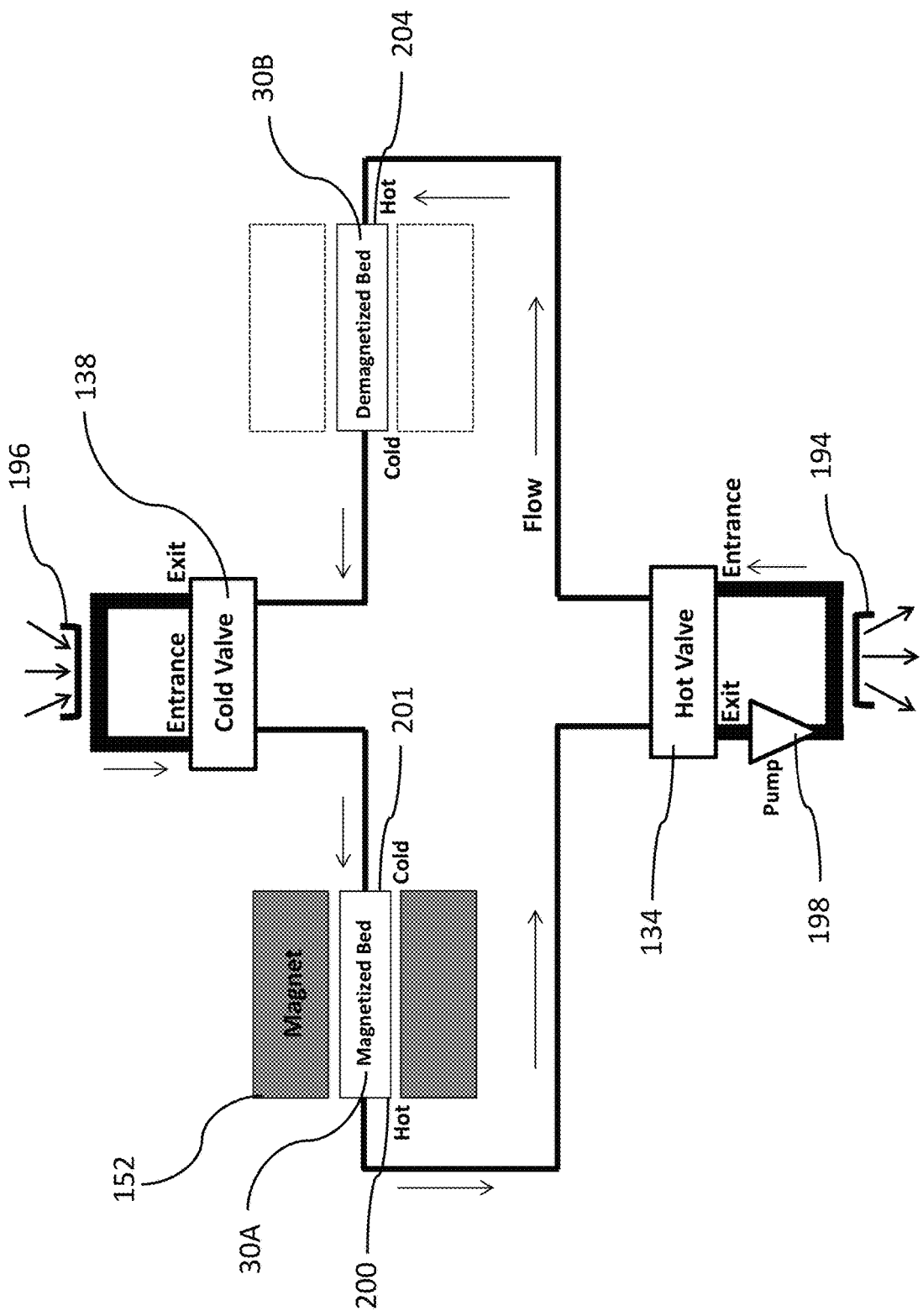
FIG. 2 is a flow schematic for a typical AMR cycle, in accordance with an illustrative embodiment.

General background on magnetic refrigeration may be found at K. Gschneidner and V. Pecharsky, "Thirty years of near room temperature magnetic cooling: Where we are today and future prospects," Int. J. of Refrig. 31: 945-961, 2008 and K. Engelbrecht, G. Nellis, S. Klein, and C. Zimm, "Recent Developments in Room Temperature Active Magnetic Regenerative Refrigeration," HVAC&R Research, 13(4): 525-542, 2007. These and all other referenced journal articles, patents, and applications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Modern room-temperature MR systems implement the so-called Active Magnetic Regenerator (AMR) cycle to perform cooling, for example, as discussed in U.S. Pat. No. 4,332,135. The cycle has four stages, as shown schematically in FIGS. 1A, 1B, 1C, and 1D. The MR system in these figures consists of a porous bed of magnetocaloric material (MCM), bed 190, and a heat transfer fluid which exchanges heat with the MCM as it flows through the bed 190. The left side of the bed 190 is the cold end, while the hot end is on the right side. The timing and direction (hot-to-cold or cold-to-hot) of the fluid flow is coordinated with the application and removal of the magnetic field 192. In the first stage of the cycle ("magnetization"), as shown in FIG. 1A, while the fluid in the bed 190 is stagnant, a magnetic field 192 is applied to the MCM causing the MCM to heat. In the next stage (the "hot blow"), as shown in FIG. 1B, while the magnetic field 192 over the bed 190 is maintained, fluid at a temperature TCi (the cold inlet temperature) is pumped through the bed from the cold end to the hot end though the cold inlet 182. This fluid pulls heat from the MCM in the bed 190 and rises in temperature as it passes through the bed 190. During the hot blow, the fluid exits the bed 190 at the temperature THo (the hot outlet temperature) through the hot outlet 186 and is circulated through a hot-side heat exchanger (HHEX) 194, where the fluid gives up heat to the ambient environment and returns to the temperature THi (the hot inlet temperature), which is less than THo. In the next stage ("demagnetization"), as shown in FIG. 1C, the fluid flow is terminated and the magnetic field is removed. This causes the bed 190 to cool further. In the final stage (the "cold blow"), as shown in FIG. 1D, fluid at a temperature THi is pumped through the bed 190 from the hot end via the hot inlet 188 to the cold end in the continued absence of the magnetic field. The fluid is cooled as it passes through the MCM in the bed 190, reaching a temperature TCo (the cold outlet temperature), which is less than TCi. At this point, the fluid is directed to a cold-side heat exchanger (CHEX) 196, which can assume two types of functions as summarized herein and described in further detail in, for example, paragraphs [0125]-[0128] of published U.S. patent application Ser. No. 14/567,835, the entirety of which is incorporated herein by reference. The colder fluid exiting the bed 190 during the cold blow via the cold outlet 184 may be circulated through a CHEX 196 of a first type, transferring heat from a cold source (e.g., a refrigerated environment, or a secondary-fluid). The fluid then exits the CHEX 196 of the first type at temperature TCi and completes the AMR cycle. Alternately, a first part of the fluid may be circulated through a CHEX 196 of a second type, transferring heat from an external counter-flowing stream to be chilled, before returning to the hot end of the bed 190 via hot inlet 188 (FIG. 1D). A second part of the fluid, which has not circulated through the CHEX 196 of the second type, is returned to the cold end of the bed 190 via cold inlet 182 (FIG. 1B). Alternately, parts of the fluid may be directed to both types of CHEX. The heat absorbed by the cold fluid in the CHEX 196 of the first type during the cold blow allows the refrigerated environment to maintain its colder temperature, and the heat absorbed by the cold fluid in the CHEX 196 of the second type during the cold blow allows an external fluid stream to be chilled.

Although FIGS. 1A, 1B, 1C, and 1D illustrate the operation of a single-bed MR system, multiple beds, each undergoing the same AMR cycle, may be advantageously combined in a single system to increase the cooling power, reduce the system size, or otherwise improve the performance of the cycle. Illustrative examples of MR apparatuses include U.S. Pat. Nos. 6,526,759 and 6,668,560, both of which are incorporated herein by reference in their entirety. U.S. Pat. No. 6,526,759 describes, in part, an MR apparatus in which the beds rotate relative to a fixed magnet assembly enabling the beds to be magnetized when entering a gap and demagnetized when exiting the gap of the magnet assembly. U.S. Pat. No. 6,668,560 describes, in part, an MR apparatus in which the magnet assembly rotates relative to a fixed assembly of beds enabling the beds to be magnetized when entering the gap and demagnetized when exiting the gap of the magnet assembly.

FIG. 2 generally depicts a flow schematic for a multi-bed MR apparatus at a condition where the magnet is aligned with bed 30A, such that bed 30A is magnetized. In addition to the beds 30A and 30B, a typical MR apparatus includes a heat transfer fluid, one or more HHEXs 194, one or more pumps or fluid displacement devices 198 configured to move the fluid through the MR apparatus, and a magnetic-field source 152 for applying and removing a magnetic field to the beds 30A and 30B (corresponding to a high value or state of the magnetic field and a low value or state of the magnetic field, respectively). The MR apparatus can further include a device to control the flow of the fluid to coordinate the timing and direction of the fluid flow through the beds 30A and 30B with the application and removal of the magnetic field through the beds 30A and 30B. In FIG. 2, the flow of the fluid through the MR apparatus is controlled by two rotary valves, a cold valve 138 and a hot valve 134. For the condition where the magnet is aligned with bed 30B (not shown), the flow direction through the beds is reversed. The MR apparatus further includes one or more CHEXs 196 which accepts cold fluid from the demagnetized beds 30B. The CHEX(s) 196 may be of two distinct types. A first type transfers heat from a cold source to the fluid and then returns the fluid to the cold end 201 of the magnetized beds 30A. The CHEX 196 shown in FIG. 2 is of the first type. A second type of CHEX (not shown) transfers heat from an external counter-flowing fluid to be chilled then returns the fluid to the hot end 204 of the demagnetized beds 30B. Either or both types of CHEXs 196 may be present within the MR apparatus. If both types are present, then devices are provided to control the flow between the types of CHEXs 196 (not shown). In alternative embodiments, any suitable type of CHEX may be used.

In one implementation, the MR apparatus includes a cylindrical bed ring formed from separate, individual beds that are located at approximately the same axial position with respect to a central axis (same position along a line that is parallel to the central axis). In some instances, each bed is identical to the others. Alternatively, a bed ring can include a single bed shell with multiple chambers of MCM. The bed ring can be rotated relative to a fixed magnet assembly enabling the beds to be magnetized when entering the gap and demagnetized when exiting the gap of the magnet assembly. Alternatively, the magnet assembly can be rotated relative to a fixed assembly of beds enabling the beds to be magnetized when entering the gap and demagnetized when exiting the gap of the magnet assembly. In this arrangement, referred to herein as a drum-type MR apparatus, the magnet assembly is configured to generate magnetic flux that passes radially through the beds. An example drum-type MR apparatus is described in co-pending U.S. application Ser. No. 15/686,862, filed Aug. 25, 2017, and titled "A Drum-Type Magnetic Refrigeration Apparatus with Improved Magnetic-Field Source," which is incorporated herein by reference in its entirety. Increasing the magnetic field (also known as the magnetic flux density) in a high field region of the gap improves the thermal performance of the MR apparatus. Ideally, the bed experiences no magnetic field while it is outside of the gap of the magnet assembly.

Typically, a magnetic field of 0.75-1.5 Tesla is utilized to effectively exploit the magnetocaloric effect for commercially relevant refrigeration, although any other suitable field can be used. This field is usually provided by a magnetic-field source with one or more poles. Each pole can include an assembly of powerful NdFeB magnets along with flux return elements made from a material with high magnetic permeability, generally referred to as a soft magnetic materials; for example low carbon steel or iron-cobalt-vanadium alloys, which have a magnetic permeability on the order of 1.26e-4 H/m and 2.3e-2 H/m, respectively. Other suitable materials with high magnetic permeability may also be used. The flux return elements form a low magnetic reluctance pathway to guide the magnetic flux for the magnetic-field source. As used herein, the magnetic reluctance (or simply, reluctance) is a term used to express the opposition offered by the magnetic circuit to the magnetic flux. Because of their use of the rare-earth elements Nd and Dy, NdFeB magnets are costly, and the cost of a magnetic refrigeration system may be significantly impacted by the cost of the NdFeB magnets it uses. Consequently, to increase commercial viability, a magnetic refrigeration system may use the minimum mass of NdFeB to achieve the desired field strength. In the subsequent discussion, the term "mass efficiency" refers to the quantity of permanent magnet material needed to generate a desired magnetic flux density in the gap occupied by the beds.

Figure 3:
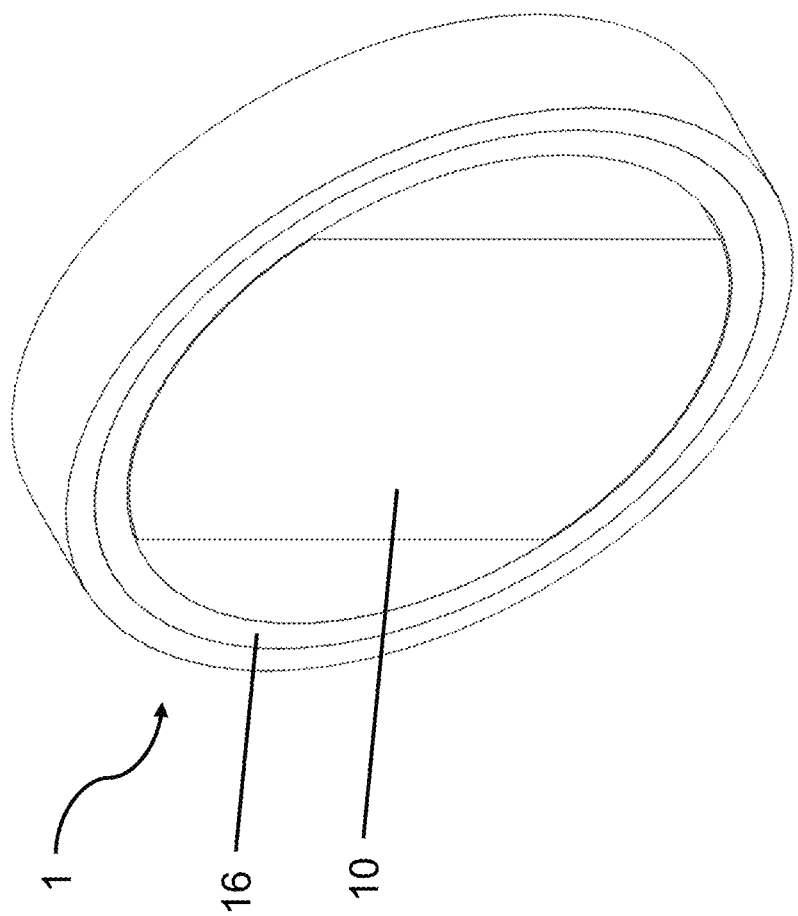
FIG. 3 is an isometric view of a drum-type MR apparatus.
Figure 5:
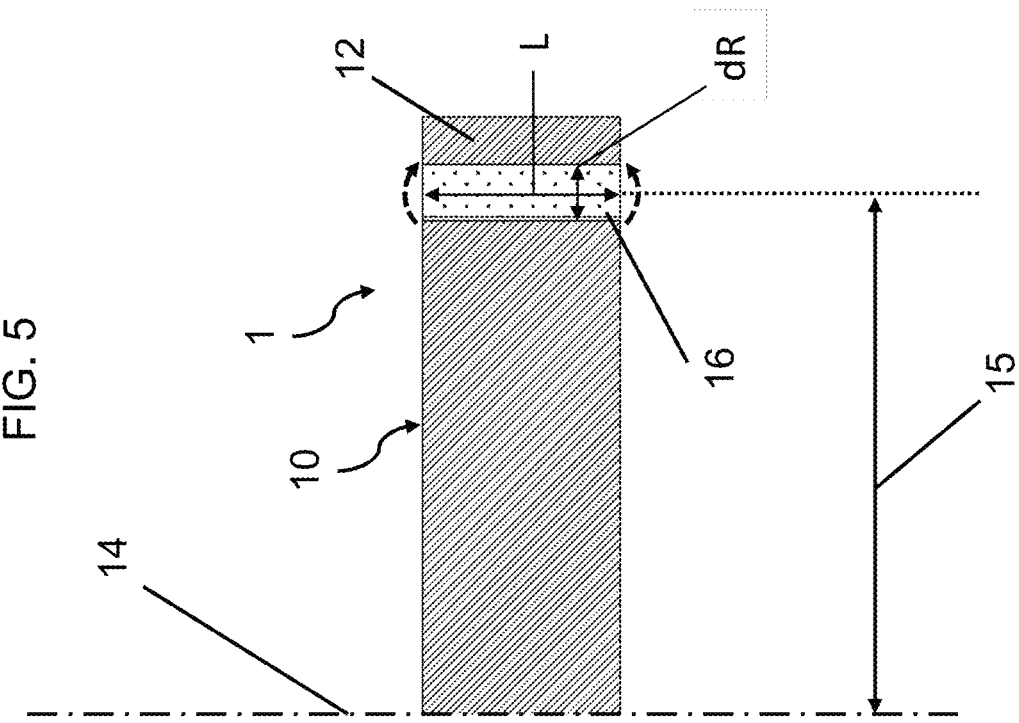
FIG. 5 is a side view of the MR apparatus of FIG. 3 at a cross-section through a symmetry plane parallel to the central axis, showing one half of the MR apparatus.

In practical MR apparatus designs, a portion of the magnetic flux will inevitably bypass the magnetic circuit and move toward the periphery of the system where the flux cannot be utilized by the beds. Generally this fringing or leakage flux, as it will be referred to herein, does not contribute beneficially to the performance of the MR apparatus. FIGS. 3-5 generally depict a drum-type MR apparatus 1, referred to herein as the drum embodiment. As shown in FIG. 3, the drum embodiment includes a single bed ring 16 and a two-pole magnetic-field source 10. In alternative embodiments, additional, fewer, and/or different elements may be used. Auxiliary components including flow tubes, fluid plena, heat exchangers, pumps, and valves or other means to control the flow of heat transfer fluid are not shown. FIG. 4 is an end view of the MR apparatus of FIG. 3. As shown in FIG. 4, the magnetic-field source 10 for the drum embodiment includes a single block of permanently magnetic material characterized by a uniform direction of the magnetization vector 17, indicated by the dashed arrow in FIG. 4. The general path of magnetic flux through the apparatus is indicated using arrows with dotted lead lines. Starting at pole 100A (FIG. 4), magnetic flux passes in a substantially radial direction through a gap formed between a first pole 100A and a cylindrical piece of soft magnetic material that is located at an axial position along the central axis 14 that is aligned with an axial position of at least one of the two or more bed rings 22A, 22B. In other words, there exists a plane normal to the central axis 14 that passes through both the cylindrical piece of soft magnetic material and one of the bed rings 22A or 22B. This cylindrical piece of soft magnetic material is known as a circumferential flux return 12. In FIG. 4 the circumferential flux return 12 is coaxial with the magnetic-field source 10. The magnetic flux is guided in a circumferential direction through the circumferential flux return 12, then in a substantially radial direction through the gap, before returning through a second, opposing pole 100B of the magnetic-field source 10. For the drum embodiment, a time-varying magnetic field in the gap is applied by rotating the magnetic-field source 10 about a central axis 14 while the circumferential flux return 12 is fixed in position.

A bed ring 16 for the drum embodiment is also shown in FIG. 4. The bed ring 16 is arranged along a circumferential direction and is located in the gap between the magnetic-field source 10 and the circumferential flux return 12. A side view of the drum embodiment is shown in FIG. 5 at a cross-section through a plane of symmetry that is parallel to the central axis 14. In the drum embodiment shown in FIG. 5, the axial length of the gap is equal to the axial length of the bed ring 16, the magnetic-field source 10, and the circumferential flux return 12. The axial length of the magnetized gap is referenced as L, while the radial extent of the gap is referenced as dR. In alternative embodiments, any suitable ratios may be used. A majority of the magnetic flux for the drum embodiment passes through the bed ring 16, while a small amount of leakage flux bypasses the bed ring 16 at each axial end of the MR apparatus 1. In the embodiment shown in FIG. 5, the general path of the leakage flux is indicated by the curved arrows at either axial end of the gap. The MCM in the bed ring 16 is unable to effectively utilize this stray magnetic flux, which reduces the mass efficiency of the permanent magnet material.

Figure 6:
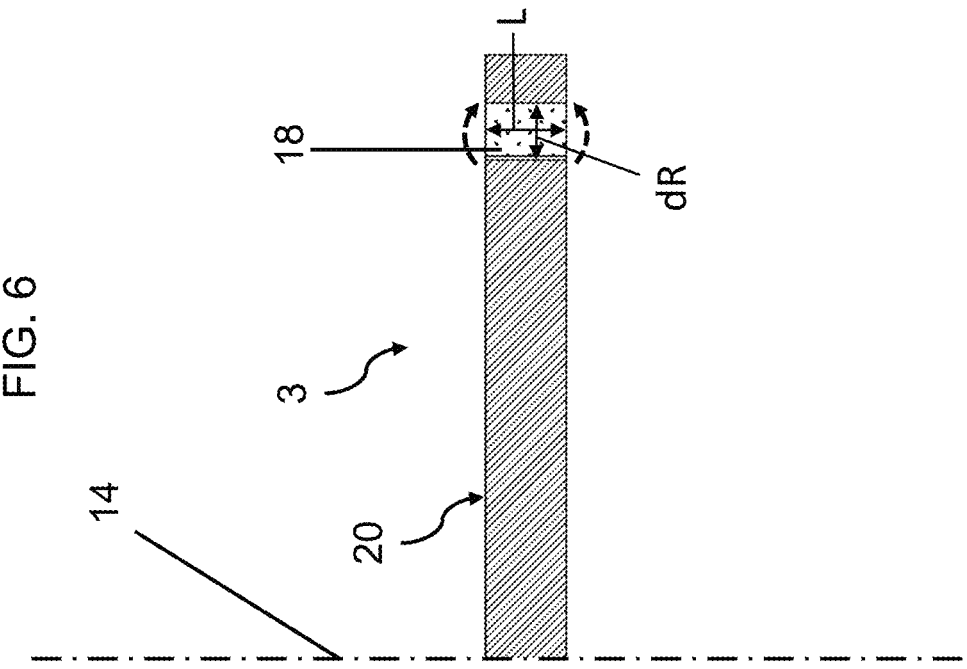
FIG. 6 is a side view of a drum-type MR apparatus in which the axial length of the beds is less than the axial length of the beds in the embodiment of FIG. 3.

The fraction of magnetic flux that bypasses the bed ring 16 depends, in part, on the dimensions of the gap where the bed ring 16 is located. FIG. 6 generally depicts an MR apparatus 3, in which the required axial length of the bed ring 18, parallel to the direction of flow, is relatively small compared to the embodiment shown in FIG. 5. The bed flow area, which is the area of a cross section of the bed perpendicular to the central axis 14, remains unchanged in this reduced length embodiment and equal to the bed flow area for the drum embodiment of FIG. 5. Correspondingly, the radial extent of the gap, dR, and hence the magnetic flux leakage at either axial end of the gap is approximately the same between the two embodiments. As a result, the leakage flux for the reduced length embodiment (FIG. 6) is a much more significant fraction of the total magnetic flux generated in the gap as compared with the drum embodiment (FIG. 5). There are few options available to reduce the radial extent of the gap, dR, without altering the bed flow area or bed length (parameters that directly impact MR system performance). One solution is to increase the mean radius of the gap 15 (FIG. 5), although there are multiple disadvantages to this approach. Increasing the mean radius of the gap 15 results in an increase in its overall package size or footprint of the MR apparatus 3. Increasing the mean radius of the gap 15 also increases the aspect ratio of the MR apparatus 3, the ratio between the outer diameter of the MR apparatus 3 and the overall axial length of the MR apparatus 3. Also, increasing the mean radius of the gap 15 adds mass to the magnetic-field source 20, as the diameter of the magnetic-field source 20 must increase to keep the magnetic flux density in the gap constant. Innovative MR apparatus configurations are needed that improve the mass efficiency of the permanent magnet material without altering (or minimally altering) the performance of the MR system (e.g., without changing both the bed flow area and the bed length parallel to the direction of flow).

Figure 7:
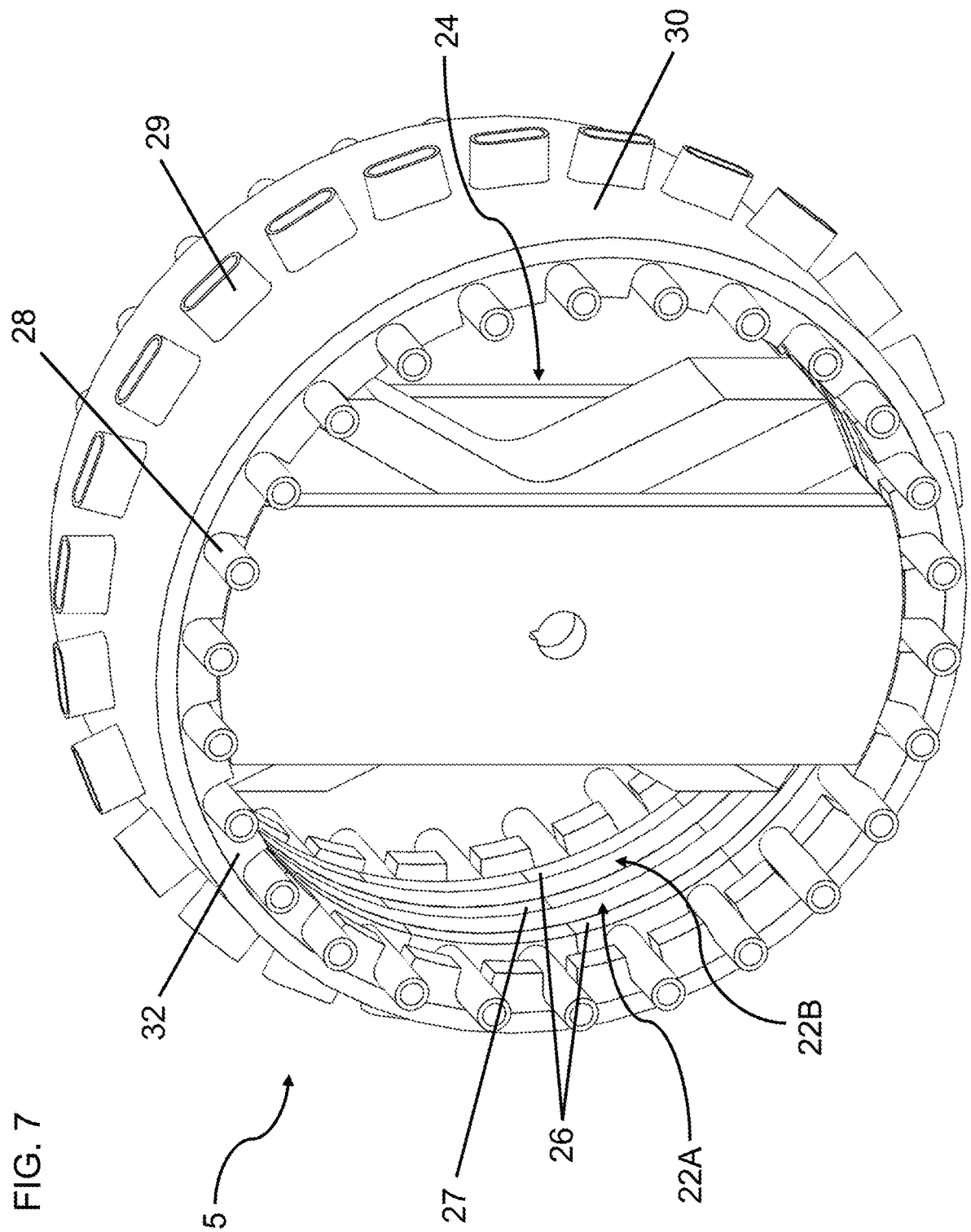
FIG. 7 is an isometric view of an MR apparatus with two bed rings, in accordance with an illustrative embodiment.

FIG. 7 generally depicts an MR apparatus 5 having two bed rings 22A, 22B and a single magnetic-field source 24, referred to herein as the two-drum embodiment. The two-drum embodiment shown in FIG. 7 further includes fluid plena 26, 27, flow tubes 28, 29, a circumferential flux return 30, and gap flux return pieces 32. In alternative embodiments, additional, fewer, and/or different elements may be used. For example, additional auxiliary components may include one or more hot side heat exchangers (HHEXs), one or more cold side heat exchangers (CHEXs), one or more pumps or fluid displacement devices configured to move the heat transfer fluid, and one or more valves or other devices to control the flow of heat transfer fluid to the beds. Various implementations of these auxiliary components are disclosed in references provided herein.

Figure 8:
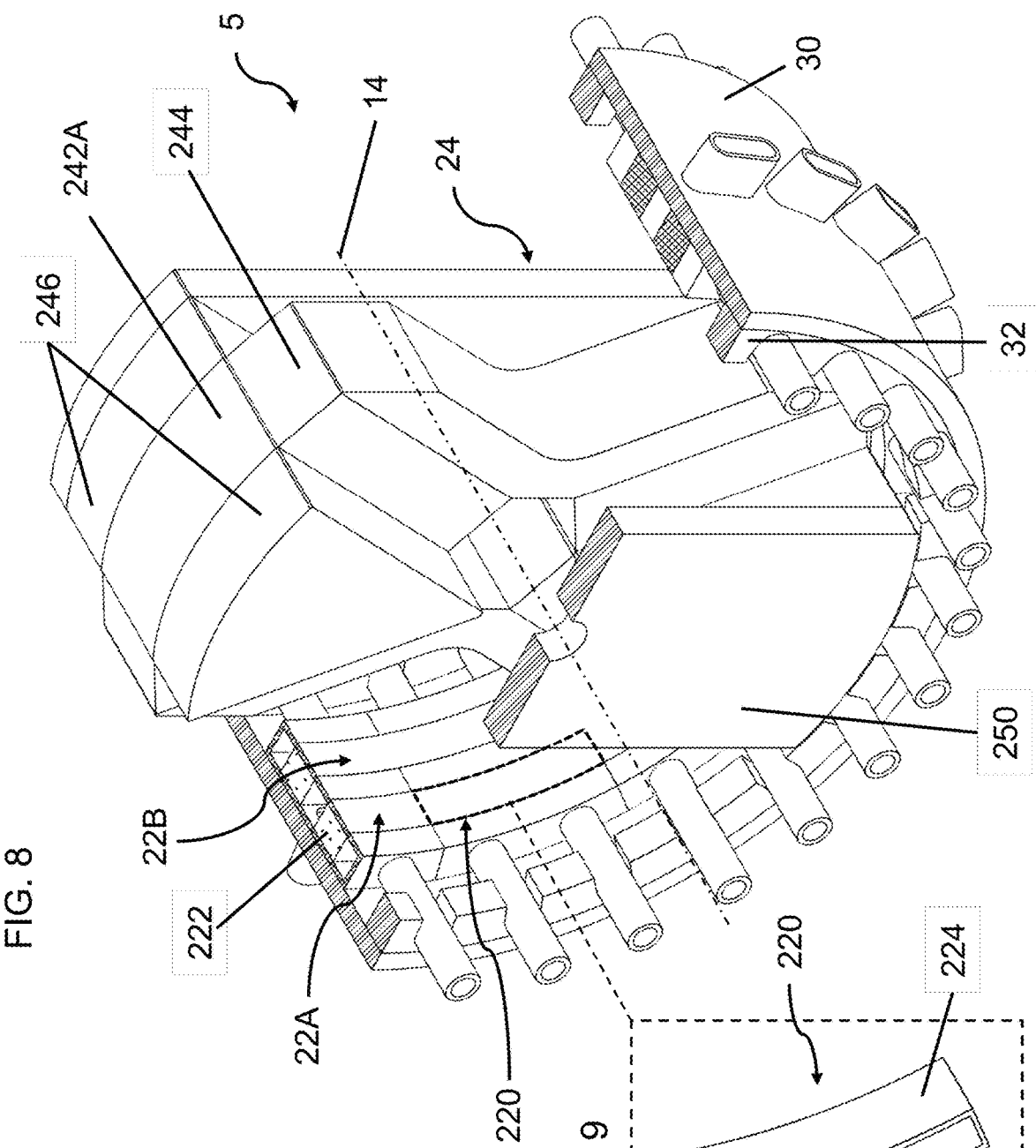
FIG. 8 is an isometric view of the MR apparatus of FIG. 7, at a partial cross-section through the bed rings, circumferential flux return, gap flux return pieces, and axial-end flux return piece, in accordance with an illustrative embodiment.
Figure 9:
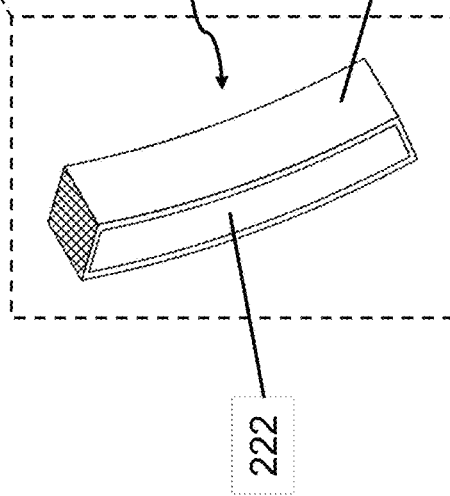
FIG. 9 is an isometric view of a single bed isolated from the MR apparatus of FIG. 8, in accordance with an illustrative embodiment.

FIG. 8 is an isometric view of the MR apparatus of FIG. 7, at a partial cross-section through the bed rings 22A, 22B, circumferential flux return 30, gap flux return pieces 32, and axial-end flux return pieces 250, in accordance with an illustrative embodiment. As shown in FIG. 8, the two-drum embodiment of the MR apparatus 5 includes two bed rings 22A, 22B, a first bed ring 22A and a second bed ring 22B that are adjacent to one another. Each of the two bed rings 22A, 22B includes two or more beds 220 that are arranged along a circumferential direction about a central axis 14. The bed rings 22A, 22B are located in a gap formed between the magnetic-field source 24 and the circumferential flux return 30. Each bed 220 in bed ring 22A is fluidly connected to a bed 220 in bed ring 22B by a shared fluid plenum 27. In the two-drum embodiment, the shared fluid plena 27 are coaxial with the beds 220 in each bed ring 22A, 22B. As shown in FIG. 8, the inner and outer radius of the shared fluid plenums 27 is the same as the inner and outer radius of the beds 220, respectively. However, various other configurations may be used; for example, a small extension could be added to the shared fluid plena 27 at its outer radius so that it occupies part of the space that is taken up by the flow tubes 29, or any other suitable configuration. FIG. 9 is an isometric view of a single bed isolated from the MR apparatus of FIG. 8, in accordance with an illustrative embodiment. As shown in FIG. 9, each of the two or more beds 220 includes a porous magnetocaloric material (MCM) 222 and a bed shell 224. The bed shell 224 is made from a material with low thermal conductivity to reduce heat transfer losses due to axial conduction; some examples include polycarbonate and polypropylene, whose thermal conductivity is on the order of 0.2 W/m-K. Other suitable materials with low thermal conductivity may also be used. The bed shell 224 surrounds the MCM 222 in a plane normal to the central axis 14 (FIG. 8). In the two-drum embodiment shown in FIG. 9, each bed ring 22A, 22B is formed from a single continuous piece of bed shell material containing multiple beds 220. However, other alternatives are contemplated. For example, each bed 220 can have its own bed shell. Returning to FIG. 8, the bed rings 22A, 22B are arranged to be coaxial with the magnetic-field source 24, such that the magnetic-field source 24 is surrounded by the beds 220. In the illustrative embodiment shown in FIG. 8, the bed rings 22A, 22B are identical (or practically identical); each bed ring 22A, 22B has the same number of beds 220 and contains the same amount of MCM 222. Alternatively, the quantity of beds 220 or MCM 222 in each bed ring 22A, 22B can be different. As shown in FIG. 8, the first and second bed rings, 22A and 22B, respectively, are located at different axial positions along the central axis 14. The angular position of each bed ring 22A, 22B is the same, so that each bed 220 in the first bed ring 22A shares the same circumferential position as another bed 220 in the second bed ring 22B.

Figure 10:
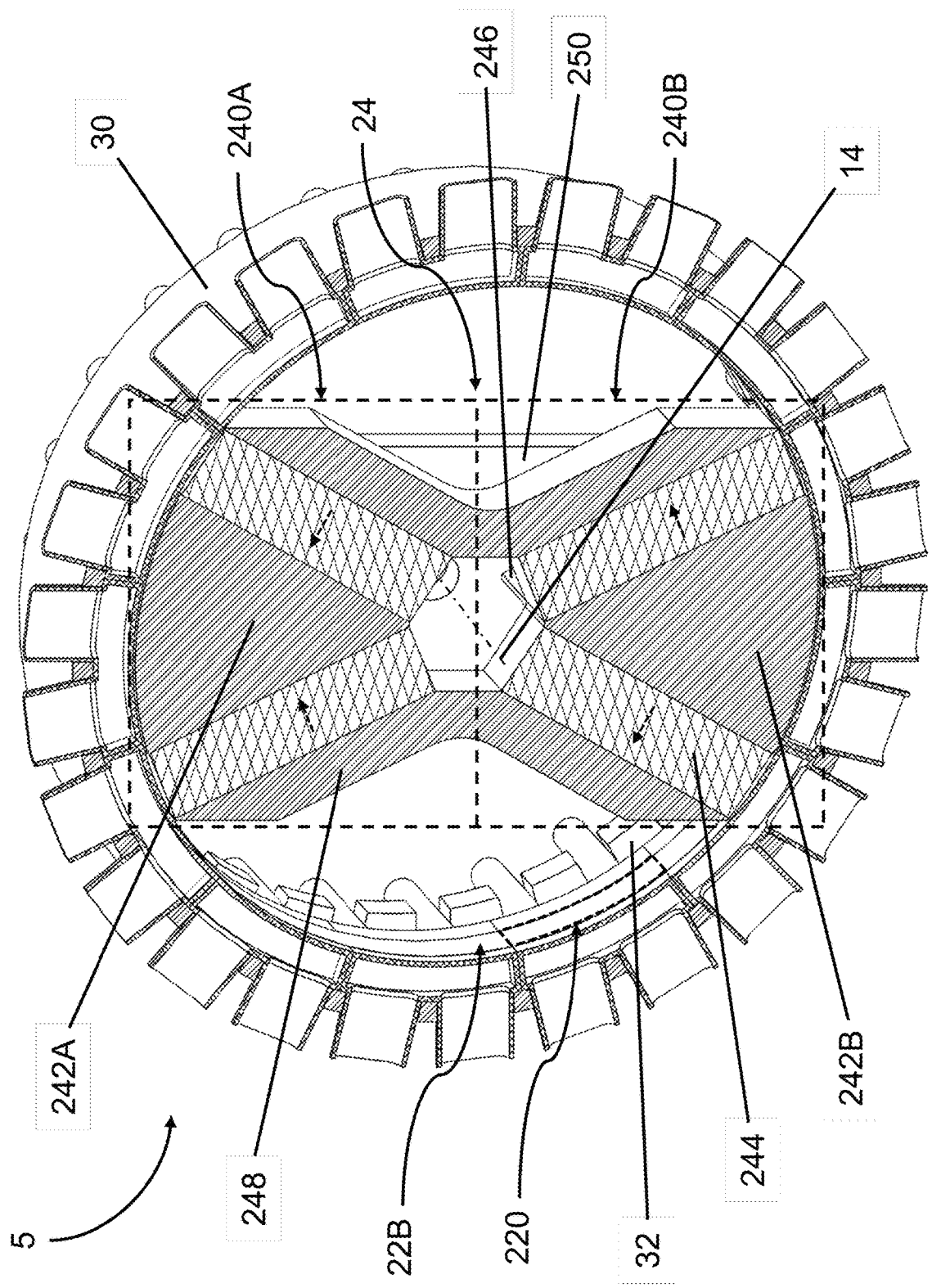
FIG. 10 is an isometric view of the MR apparatus of FIG. 7, at a cross-section through a symmetry plane normal to the central axis, in accordance with an illustrative embodiment.
Figure 11:
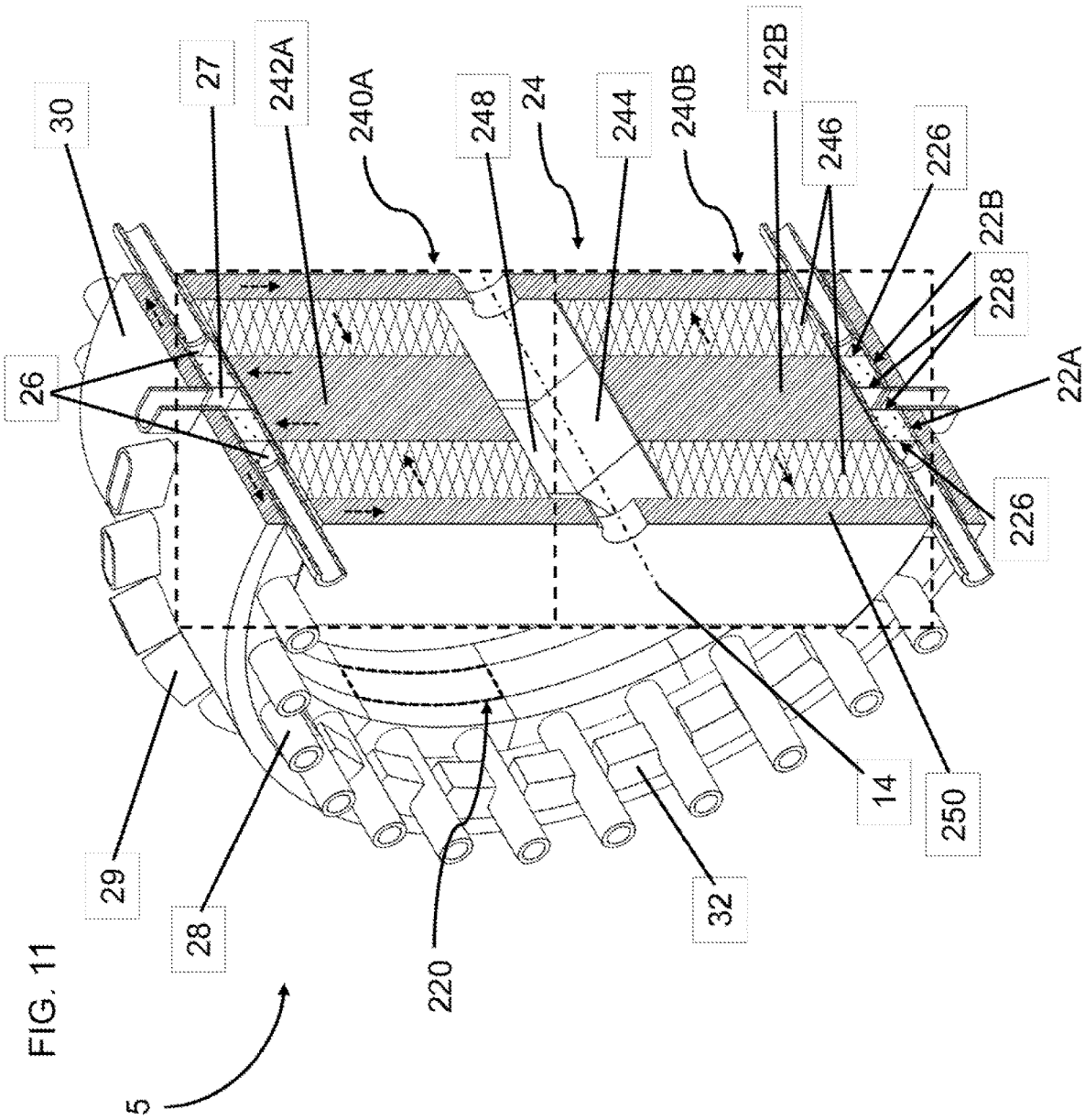
FIG. 11 is an isometric view of the MR apparatus of FIG. 7, at a cross-section through the high field region of the gap, along a symmetry plane parallel to the central axis, in accordance with an illustrative embodiment.

Various magnetic-field source configurations can be used. The magnetic-field source 24 for the two-drum embodiment is generally depicted in FIGS. 10 and 11. FIG. 10 shows the two-drum embodiment at a cross-section through a symmetry plane normal to the central axis 14. FIG. 11 shows the two-drum embodiment at a cross-section through a symmetry plane parallel to the central axis 14. As shown in FIG. 11, the magnetic-field source 24 for the two drum embodiment simultaneously provides a magnetic field to both bed rings 22A, 22B. As shown in FIGS. 10 and 11, the axial length of the magnetic-field source 24 is greater than the axial length of a single bed ring 22A, 22B, an apparatus configuration that offers improvements in the mass efficiency of the permanent magnet material as compared with a single bed ring configuration. For the two-drum embodiment shown in FIG. 11, the axial length of the magnetic-field source 24 (the length between either axial-end of the magnetic-field source 24) is greater than two times the axial length of a single bed ring 22A, 22B. Other suitable arrangements can also be used; for example, the axial length of the magnetic-field source 24 can be equal to two times the axial length of a single bed ring 22A, 22B, or greater than or equal to 1.5 times the axial length of a single bed ring 22A, 22B. The magnetic-field source 24 for the two-drum embodiment includes two poles 240A and 240B. Each pole 240A, 240B includes the following magnetic circuit components: a pole piece 242A, 242B, side magnets 244, axial-end magnets 246, side flux return pieces 248, and axial-end flux return pieces 250. In alternative embodiments of the poles 240A and 240B, additional, fewer, and/or different elements may be used.

In the embodiments shown in FIGS. 10 and 11, both poles 242A, 242B of the magnetic-field source 24 are identical with the exception of the direction of magnetization of the side magnets 244 and axial-end magnets 246. Various shapes may be utilized for the components of the magnetic-field source 24. In the illustrative embodiment shown in FIG. 10, the pole piece 242A in pole 240A is in the shape of a right prism whose base faces, at each axial end of the magnetic-field source 24, have a curved edge near the gap to provide uniform clearance between the pole piece 242A and the beds 220. As shown in FIG. 10, the pole piece 242A is tapered such that the distance between the side magnets 244 is greater at the outer radius of the pole piece 242A than at the inner radius of the pole piece 242A. As shown in FIG. 11, the pole pieces 242A, 242B for the two-drum embodiment extend over the entire axial length of the bed rings 22A, 22B, starting from an axial end of the first bed ring 22A nearest a first axial end of the MR apparatus 5 and extending to an axial end of the second bed ring 22B farthest from the first bed ring 22A. In other words, the axial length of the pole pieces 242A and 242B is greater than two times the axial length of an individual bed ring 22A or 22B. Various alternatives may be used. For example, the axial length of the pole pieces 242A and 242B could be greater than the axial length of a single bed ring 22A or 22B, greater than or equal to 1.5 times the axial length of an individual bed ring 22A or 22B, or equal to two times the axial length of a single bed ring. In an alternative embodiment, similar to the two-drum embodiment but comprising pole pieces 242A and 242B with an axial length equal to 1.5 times the axial length of an individual bed ring 22A or 22B, the combined axial length of the bed rings 22A, 22B and space in between bed rings 22A, 22B will be greater than the axial length of the pole pieces 242A, 242B. Arranging the bed rings 22A, 22B to utilize a portion of the annular gap just beyond each axial end of the pole pieces 242A, 242B provides an advantage with respect to magnet mass efficiency, since the beds 220 generally utilize some of the fringe field or leakage field region of the gap. Conversely, increasing the axial length of the pole pieces 242A, 242B (and thus the axial length in between axial-end magnets 246 for the two-drum embodiment), to a value that is greater than the combined axial length of the bed rings 22A, 22B and space in between bed rings 22A, 22B, improves magnetic flux uniformity throughout the beds 220. Improving the magnetic flux uniformity throughout the beds 220 will improve the performance of the MR apparatus 5.

In the embodiment shown in FIG. 10, the side magnets 244 for pole 240A are arranged in a circumferential direction to at least partly surround the pole piece 242A. Various other shapes can be used for the side magnets 244; for example, the side magnets 244 can take the form of right prisms with trapezoidal base or axial-end faces or any other suitable shape. In the two-drum embodiment, the side magnets 244 are in the shape of rectangular prisms with an axial length that is the same as the pole piece 242A. For the two-drum embodiment, the magnetization vector direction is uniform throughout each of the individual side magnets 244. The direction of the magnetization vector for each of the side magnets 244 is shown by the dashed arrows in FIGS. 10 and 11. The magnetization vector of the side magnets 244 in pole 240A is oriented toward the pole piece 242A, perpendicular to the surface of contact between the pole piece 242A and the side magnets 244, while the magnetization vector of the side magnets 244 in pole 240B is oriented away from the pole piece 242B. The axial-end magnets 246 for pole 240A are located at each axial end of the pole piece 242A. Like the side magnets 244, various other shapes can be used for the axial-end magnets 246; for example, the axial-end magnets 246 can take the form of right prisms with trapezoidal base or axial-end faces or any other suitable shape. In the embodiment of FIG. 8, the axial-end magnets 246 are in the shape of right prisms, whose base faces at each axial end are in the same shape as the base faces of the pole piece 242A (at each axial end of the pole piece 242A). Like the side magnets 244, the magnetization vector direction is uniform throughout each of the individual axial-end magnets 246. As shown in FIG. 11, the magnetization vector of the axial-end magnets 246 in pole 240A is oriented toward the pole piece 242A, parallel to the central axis 14 and perpendicular to the surface of contact between the pole piece 242A and the axial-end magnets 246. The magnetization vector of the axial-end magnets 246 in pole 240B is oriented away from the pole piece 242B. Although not pictured, the axial-end magnets 246 could alternatively be tilted such that an angle other than 90° (e.g., partially axial) is formed between a surface of the axial-end magnets 246 and the central axis. In the tilted arrangement, the magnetization vector of the axial-end magnets 246 may be oriented in a partially axial direction such that it has an axial component.

The side flux return pieces 248 and axial-end flux return pieces 250 for the magnetic-field source 24 of the two-drum embodiment are depicted in FIGS. 10 and 11, respectively. The side flux return pieces 248 and the axial-end flux return pieces 250 are both made from a soft magnetic material and guide the magnetic flux between opposing poles of the magnetic-field source 24. The side flux return pieces 248 are placed adjacent to, and in contact with, the side magnets 244. Various shapes are contemplated for the side flux return pieces 248; for example, the side flux return pieces 248 may take the form of right prisms (which generally reduces manufacturing costs) or any other suitable shape. For the two-drum embodiment (e.g., the embodiment of FIG. 10), the side flux return pieces 248 are in the shape of right prisms whose base faces at either axial end of the side flux return pieces 248 curve away from the bed rings 22A, 22B to reduce the magnetic flux density in a region of the gap between poles 240A, 240B. As shown in FIG. 11, the axial-end flux return pieces 250 are arranged to contact the axial-end magnets 246 at each axial end of the MR apparatus 5. Similar to the side flux return pieces 248 various other shapes for the axial-end flux return pieces 250 may be used; for example, the axial-end flux return pieces 250 may also take the form of right prisms (again to reduce manufacturing costs) or any other suitable shape. The axial-end flux return pieces 250 for the two-drum embodiment are in the shape of right prisms. The edges at the outer radius of the axial-end flux return pieces 250 are curved to provide uniform clearance between the axial-end flux return pieces 250 and the gap flux return pieces 32.

In the two-drum embodiment, as shown in FIG. 11, the MR apparatus 5 further includes a circumferential flux return 30 and gap flux return pieces 32. Both the circumferential flux return 30 and the gap flux return pieces 32 can be made from a soft magnetic material. In an illustrative embodiment, the circumferential flux return 30 for the two-drum embodiment can be made from multiple cylindrical pieces of soft magnetic material that are laminated together to reduce eddy currents within the circumferential flux return 30 (the laminations are not shown in FIG. 11). As shown in FIG. 11, the circumferential flux return 30 is located on the opposite side of the bed rings 22A, 22B as the magnetic-field source 24. The circumferential flux return 30 is located at a larger radius than the beds, and, hence, will be referred to simply as the outer flux return (OFR) 30. The circumferential flux return 30 can alternatively be located at a smaller radius than the beds 220, in which case the positions of the magnetic-field source 24 and the circumferential flux return 30 can be reversed (not shown). Alternatively, the MR apparatus 5 can function without a circumferential flux return 30. In such an embodiment, a two-part magnetic-field source may be used; a first part of the magnetic-field source that exchanges magnetic flux with a second part of the magnetic-field source across the gap (not pictured). Returning to FIG. 11, the gap flux return pieces 32 in the two-drum embodiment can be made from multiple cylindrical pieces of soft magnetic material that are laminated together to reduce eddy currents (the laminations are not shown in FIG. 11). The gap flux return pieces 32 are located at each axial end of the gap, in between the OFR 30 and the axial-end flux return pieces 250. As shown in FIG. 11, the gap flux return pieces 32 for the two-drum embodiment are connected to the OFR 30. Through-hole passageways are machined into the one or more gap flux return pieces 32 or otherwise produced to accommodate the flow tubes 28 that are oriented in a substantially axial direction as shown in FIG. 11. Various shapes/slots may be used to accommodate the flow tubes 28; for example, circular holes may be drilled into the one or more gap flux return pieces 32 to provide additional structural support for the flow tubes 28. Alternatively, the through-hole passageways may include slots with parallel surfaces cut into the one or more gap flux return pieces 32 from the inner radius; the inner surface of the slot may optionally be curved to provide uniform clearance between the flow tubes 28 and the one or more gap flux return pieces 32 (FIG. 11). Ideally the passageways in the one or more gap flux return pieces can be relatively small compared with the outer diameter of the MR apparatus 5. For example, as shown in FIG. 11, the diameter of the passageways is less than the radial thickness of the one or more gap flux return pieces. In an illustrative embodiment, the outer diameter of the OFR 30 is approximately 12.5 inches and the diameter of the passageways through the gap flux return piece 32 are approximately 0.6 inches. In alternative embodiments, any other suitable dimensions may be used. For example, the diameter of the OFR 30 may be greater than or less than 12.5 inches, and/or the diameter of the passageways through the gap flux return piece 32 may be greater than or less than 0.6 inches. Larger passageways in the one or more gap flux return pieces can also be accommodated, but the axial thickness of the gap flux return pieces 32 may need to increase to reduce the reluctance of the magnetic circuit. As shown in FIG. 11, the axial thickness of the gap flux return pieces 32 is generally equal to the axial thickness of the axial-end flux return pieces 250 to accommodate the transfer of magnetic flux throughout the cross section.

A majority of the magnetic flux for the two-drum embodiment passes through one of two parallel magnetic circuits. The first magnetic circuit is similar to that described for the drum embodiment above (FIG. 4). Starting at pole 240A of the two-drum embodiment shown in FIG. 10, the magnetic flux is directed by the pole piece 242A in a substantially radial direction through the gap (where the bed rings 22A, 22B are located) to the OFR 30. The OFR 30 guides the magnetic flux in a circumferential direction to pole 240B of the magnetic-field source 24. After passing through the OFR 30, the magnetic flux passes substantially in a radial direction through a gap formed between the pole piece 242B and the OFR 30 and back through the pole piece 242B. Simultaneously, as can be visualized from the dotted arrows near pole 240A in FIG. 11, the OFR 30 also guides the magnetic flux in an axial direction, along a parallel magnetic circuit through the gap flux return pieces 32, before finally returning to the axial-end magnets 246 through the axial-end flux return pieces 250.

In the two-drum embodiment shown in FIGS. 10 and 11, relative rotation between the magnetic-field source 24 and the bed rings 22A, 22B generates a time-varying magnetic field in a high-field state (or high state) and a low-field state (or low state) within the gap where the bed rings 22A, 22B are located. Various rotational configurations are possible, including rotating the magnetic-field source 24 with the bed rings 22A, 22B fixed in position or rotating the bed rings 22A, 22B with the magnetic-field source 24 fixed in position. In the two-drum embodiment, the bed rings 22A, 22B are fixed in position with respect to the OFR 30 and gap flux return pieces 32.

Alternative magnetic-field source 24 configurations can be used in addition to or in place of the magnetic-field source 24 configuration described above for the two-drum embodiment. For example, the axial-end magnets 246, axial-end flux return pieces 250, and gap flux return pieces 32 can be removed. In this configuration (not shown), with pole pieces 242A, 242B, side magnets 244, and side flux return pieces 248 only, the mass efficiency of the magnetic-field source 24 would be reduced; however, a similar magnetic flux density could be achieved by adjusting the dimensions of the side magnets 244 and the size of the gap.

Figure 12:
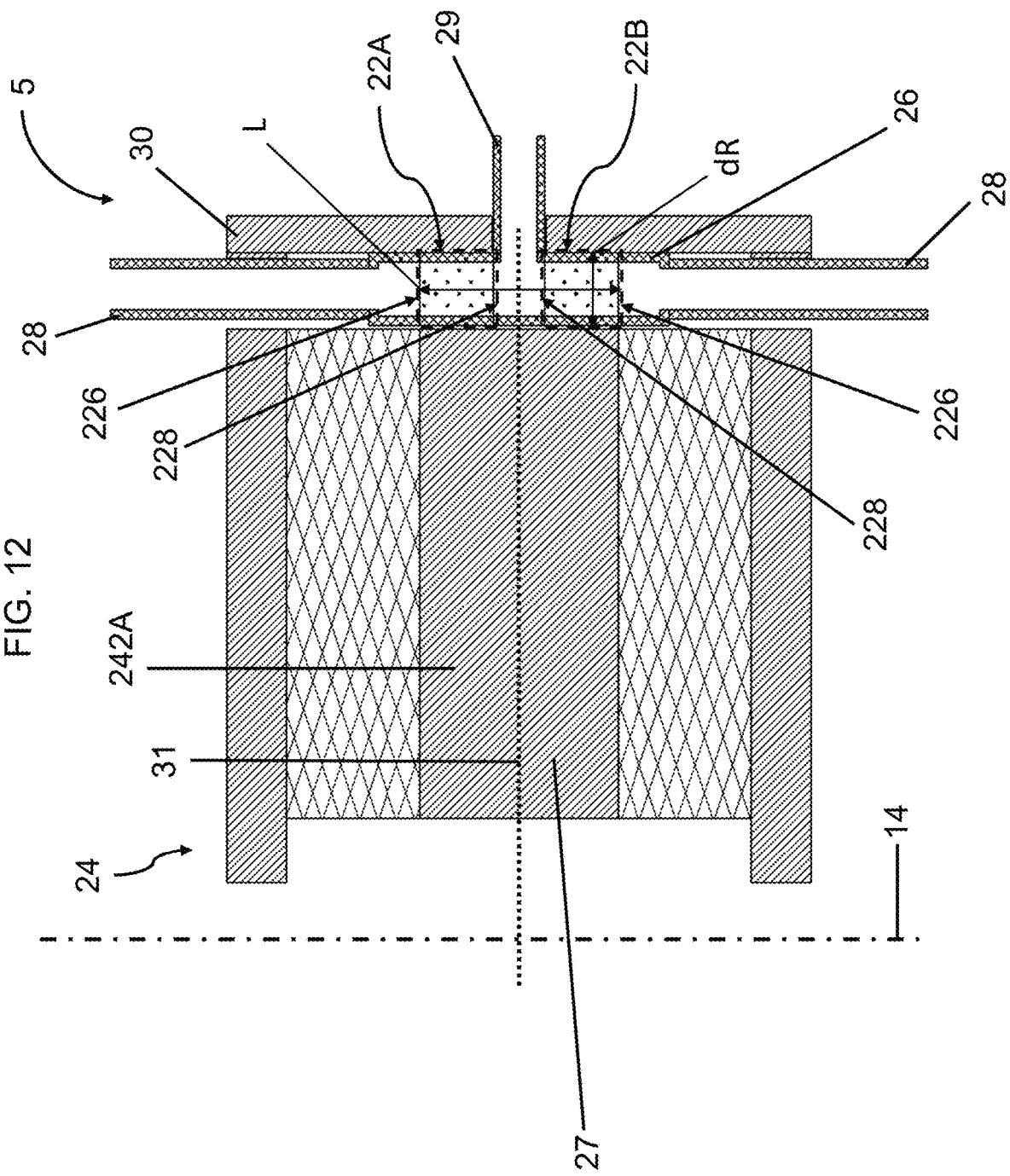
FIG. 12 is a side view of the MR apparatus of FIG. 7, showing half of the MR apparatus at a cross-section through the high field region of the gap, along a symmetry plane that is parallel to the central axis, in accordance with an illustrative embodiment.
Figure 13:
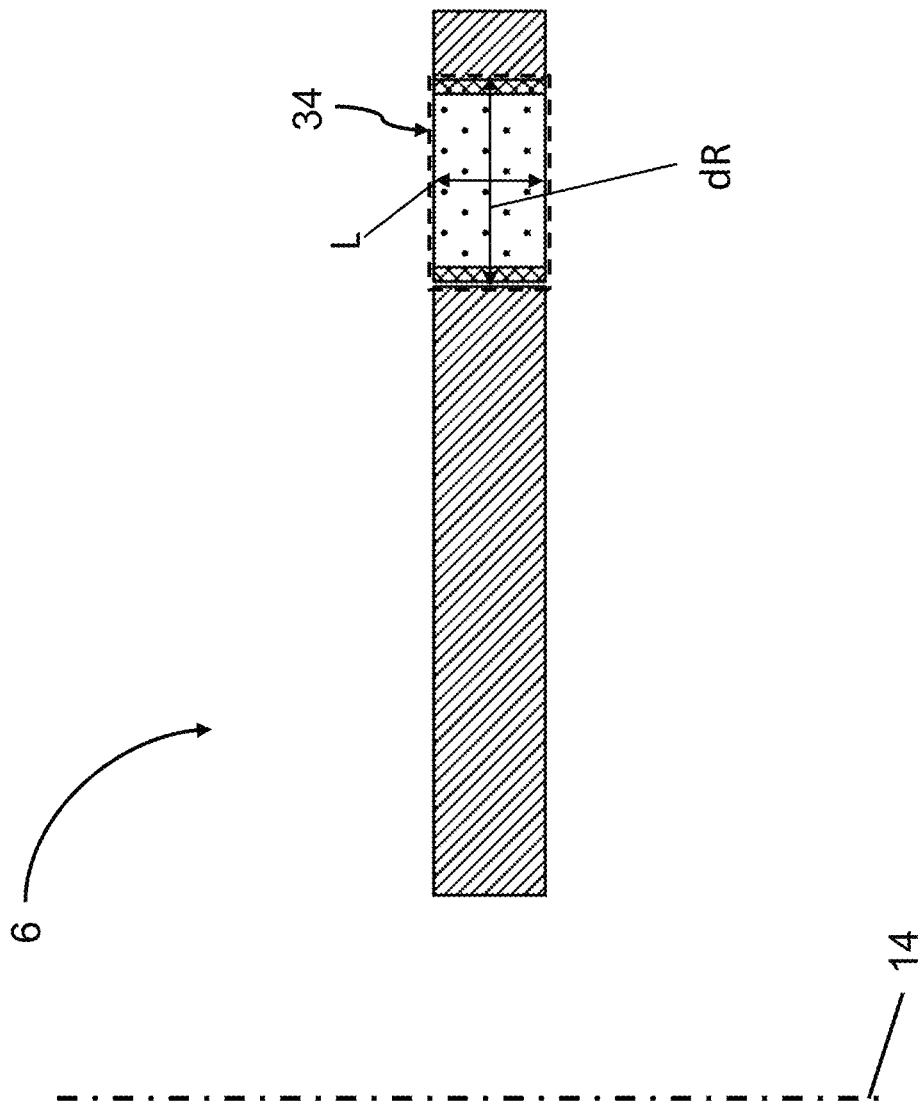
FIG. 13 is a side view of a MR apparatus having a single bed ring, showing half of the MR apparatus at a cross-section through the high field region of the gap, along a symmetry plane that is parallel to the central axis.

The geometry of the gap is generally depicted in FIG. 12, which shows half of the two-drum embodiment at a cross-section through the high field region along a plane of symmetry parallel to the central axis 14. As shown in FIG. 12, the axial length of the magnetic-field source 24 is much greater than the axial length of a single bed ring 22A, 22B. In FIG. 12, the axial length of the magnetic-field source 24 is approximately eight times the axial length of a single bed ring, although various other configurations can be used. The axial gap length for the two-drum embodiment is referenced as L in FIG. 12. This axial gap length, L, is equal to the combined axial length of the first and second bed rings, 22A and 22B, respectively, plus any additional axial length required for shared fluid plena 27 between bed rings, flow tubes 29 (that are oriented in a substantially radial direction), and air gaps between the bed rings 22A, 22B. The radial extent of the gap, referenced as dR in FIG. 12, is equal to the difference between the inner radius of the OFR 30 and the outer radius of the pole piece 242A. It is within this region of the gap, defined by L and dR, that the magnetic field generated by the magnetic-field source 24 can be utilized by the bed rings 22A, 22B. FIG. 13 shows an illustrative embodiment of an MR apparatus 6 with a single bed ring 34. For comparison purposes, parameters that directly impact the refrigeration performance are fixed between the embodiments of FIG. 12 and FIG. 13. These parameters include 1) the combined available flow area through the beds in the bed rings 22A, 22B versus bed ring 34 and 2) the axial length of the beds in each bed ring 22A, 22B, 34 parallel to the direction of flow. Together, these two parameters relate to the mass of MCM 222 in the MR apparatus 5, 6. Additionally, the inner radius of the bed ring(s) 22A, 22B, 34 for the embodiments of FIG. 12 and FIG. 13 are approximately the same. For the two-drum embodiment of FIG. 12, a parallel flow configuration is utilized as will be further described below. Hence, the combined available flow area through the beds in the bed rings 22A, 22B in the two-drum embodiment is equal to the flow area of the first bed ring 22A plus the flow area of the second bed ring 22B. As shown in FIGS. 12 and 13, the radial extent of the gap, dR, is more than two times larger for the embodiment having a single bed ring 34 (FIG. 13) compared to the two-drum embodiment (FIG. 12). Additionally, the axial length of the gap, L, in the embodiment having a single bed ring 34 (FIG. 13) is less than half the axial length of the gap for the two-drum embodiment (FIG. 12). For the two-drum embodiment, a smaller ratio of dR/L, or the ratio between the radial extent of the gap and the axial length of the gap, results in a much higher value of mass efficiency of the permanent magnet material because the relative effects of flux leakage at either axial end of the MR apparatus 5 are greatly reduced. One way to reduce the ratio of dR/L for the embodiment with a single bed ring 34 (FIG. 13) is to increase the inner radius of the bed ring 34. Hence, using an apparatus configuration with multiple bed rings 22A, 22B provides a way to reduce the aspect ratio of the MR apparatus, the ratio between the overall diameter of the MR apparatus and the overall axial length of the MR apparatus, without reducing the mass efficiency of the permanent magnet material.

The flow tubes 28, 29 and fluid plena 26, 27 for the two-drum embodiment are generally depicted in FIGS. 11 and 12. Each bed ring 22A, 22B in the two-drum embodiment further includes a first end 226 and a second end 228, wherein the first end 226 corresponds to a first axial-end of the bed ring 22A, 22B that is fluidly connected to a heat exchanger of a first type and the second end 228 corresponds to an opposing axial end of the bed ring 22A, 22B that is fluidly connected to a heat exchanger of a second type. In other words, the flow leaving the first end 226 of each bed ring 22A, 22B passes through the heat exchanger of a first type before returning to the first end 226 of each bed ring 22A, 22B. Similarly, flow leaving the second end 228 of each bed ring 22A, 22B passes through the heat exchanger of a second type before returning to the second end 228 of each bed ring 22A, 22B. The first type of heat exchanger can be a CHEX or a HHEX. If the first type of heat exchanger is a CHEX, then the second type of heat exchanger is a HHEX. Moreover, if the first type of heat exchanger is a HHEX, then the second type of heat exchanger is a CHEX. As shown in FIG. 11 for the two-drum embodiment, flow leaving or entering the beds from a first end 226 of the bed rings 22A and 22B passes through flow tubes 28 that are fluidly connected to a HHEX, while flow leaving or entering the beds from a second end 228 of the bed rings 22A and 22B passes through flow tubes 29 that are fluidly connected to the CHEX. For the two-drum embodiment (FIG. 11), flow leaving or entering the beds 220 from a first end 226 of the bed ring 22A, 22B passes through flow tubes 28 (axial flow tubes 28) oriented in a substantially axial direction, while flow leaving or entering the beds 220 from a second end 228 of the bed ring 22A, 22B passes through flow tubes 29 (radial flow tubes 29) oriented in a substantially radial direction. In alternative embodiments, any other suitable arrangements may be used.

As shown in FIG. 11, the bed rings 22A, 22B for the two-drum embodiment are arranged so that the first end 226 of each bed ring 22A, 22B faces toward an axial end of the MR apparatus 5. The second end 228 of each bed ring 22A, 22B faces the nearest adjacent bed ring 22A, 22B. Together, the two adjacent bed rings 22A, 22B form a ring pair. For a multiple bed ring 22A, 22B MR apparatus 5 in a parallel flow configuration, the beds 220 from each ring pair can be circumferentially aligned. The circumferential alignment of the beds in each bed ring 22A and 22B allows for a common, or shared fluid plena 27 to be utilized, along with the radial flow tubes 29 connected to the shared fluid plena 27. The circumferential alignment between the beds in each bed ring 22A and 22B need not be exact as long as the alignment is similar enough to allow the plenum to contact the beds 220 in each bed ring 22A and 22B of the ring pair. For example, in FIG. 11, flow leaving or entering a second end 228 of each bed ring 22A, 22B passes through a shared fluid plenum 27. As shown in FIG. 12, at a given time one or more beds 220 at a given circumferential position in the first bed ring 22A experience flow in a positive axial direction, while at the same time one or more beds 220 at a corresponding (i.e. similar) circumferential position in the second bed ring 22B experiences flow in a negative axial direction. In FIG. 12 the positive axial direction is defined by an arrow that is collinear with the central axis 14 and extends from a plane of symmetry (normal to the central axis) through the upper half of the MR apparatus 5. The negative axial direction is defined by an arrow that extends from the symmetry plane (normal to the central axis) through the lower half of the MR apparatus 5.

Figure 14:
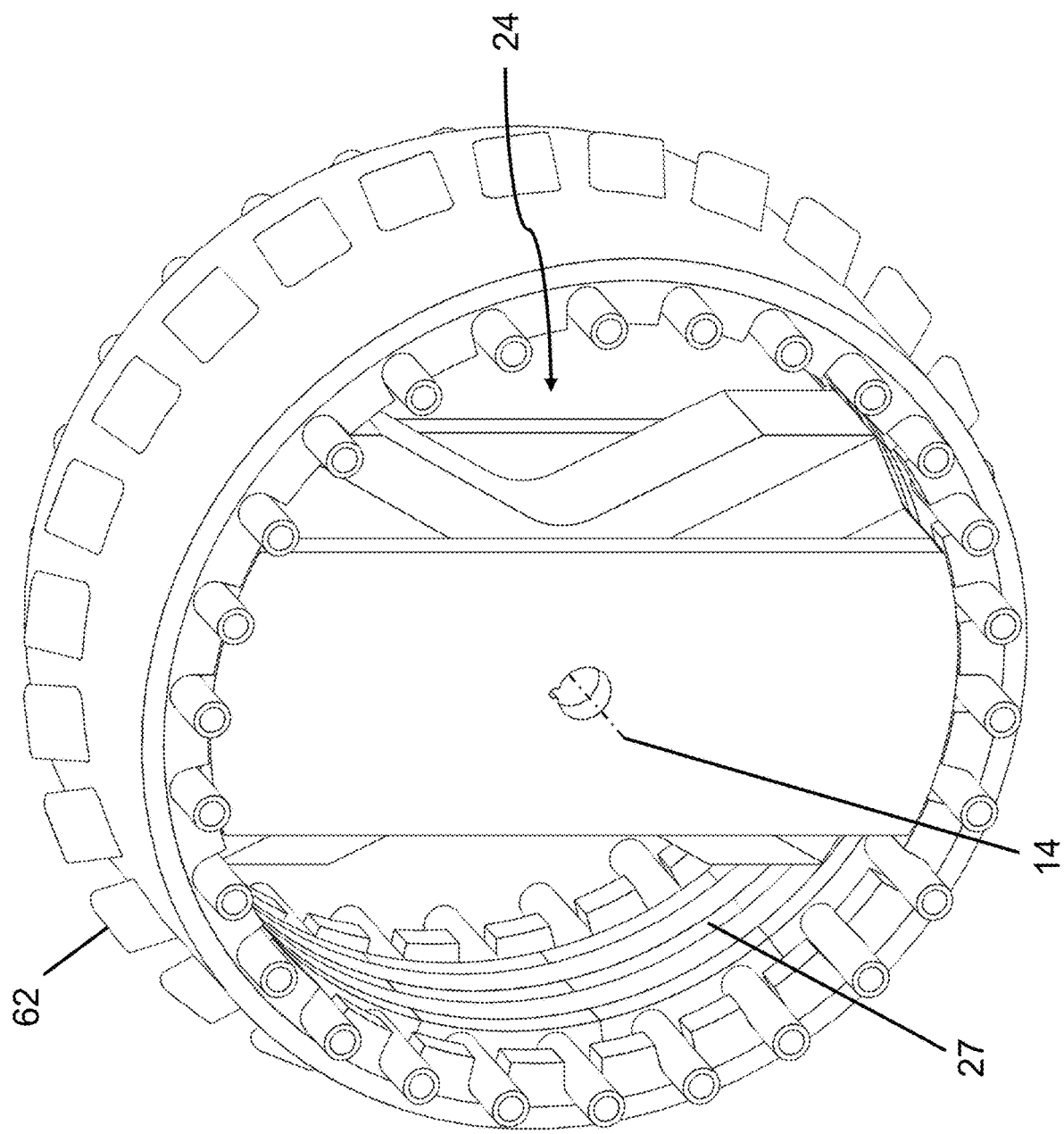
FIG. 14 is an isometric view of an MR apparatus in which fluid flows through the shared fluid plena in a direction that has an axial component, in accordance with an illustrative embodiment.
Figure 15:
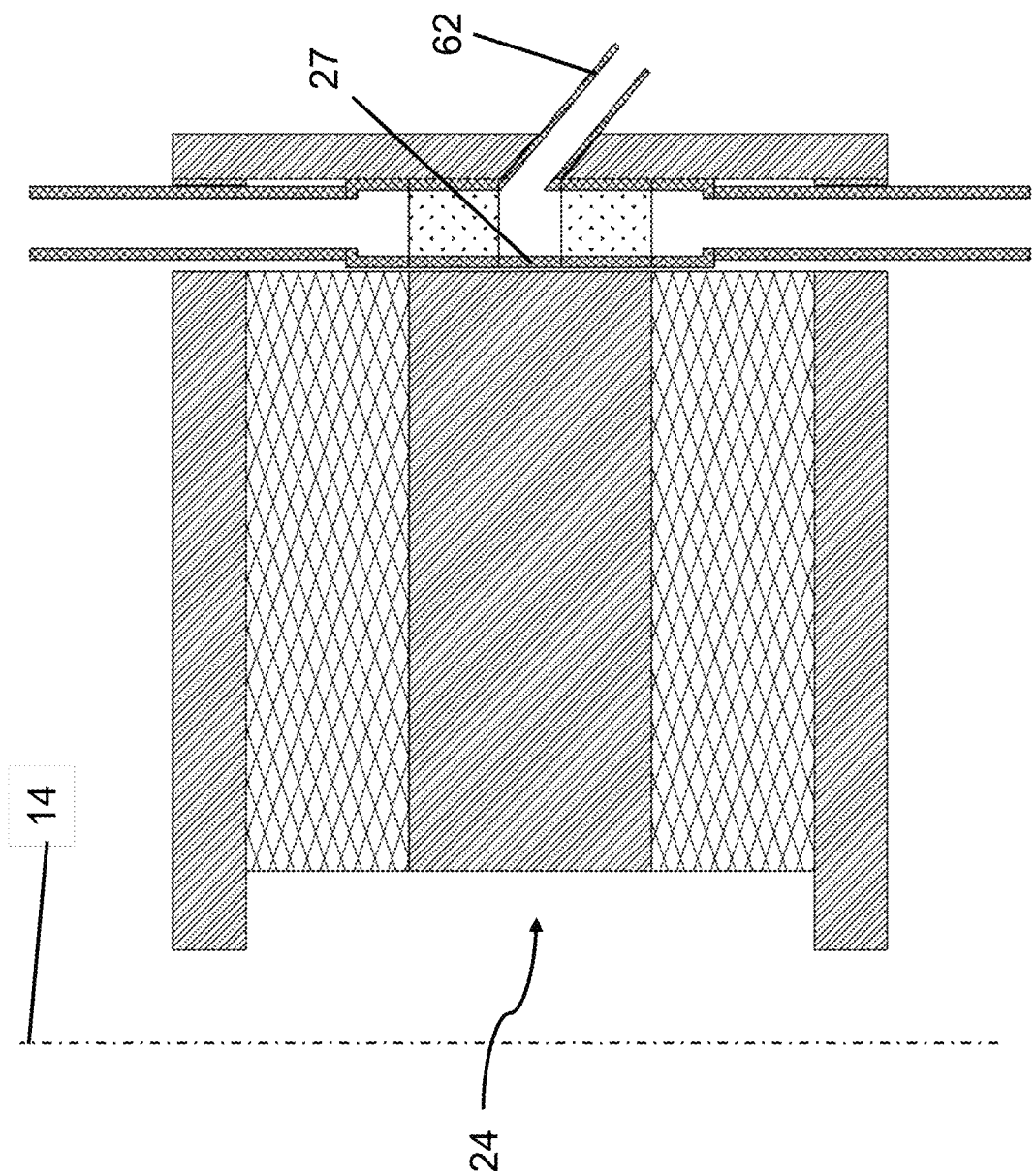
FIG. 15 is a side view of the MR apparatus of FIG. 14, showing half of the MR apparatus at a cross-section through the high field region of the gap, along a symmetry plane that is parallel to the central axis, in accordance with an illustrative embodiment.
Figure 16:
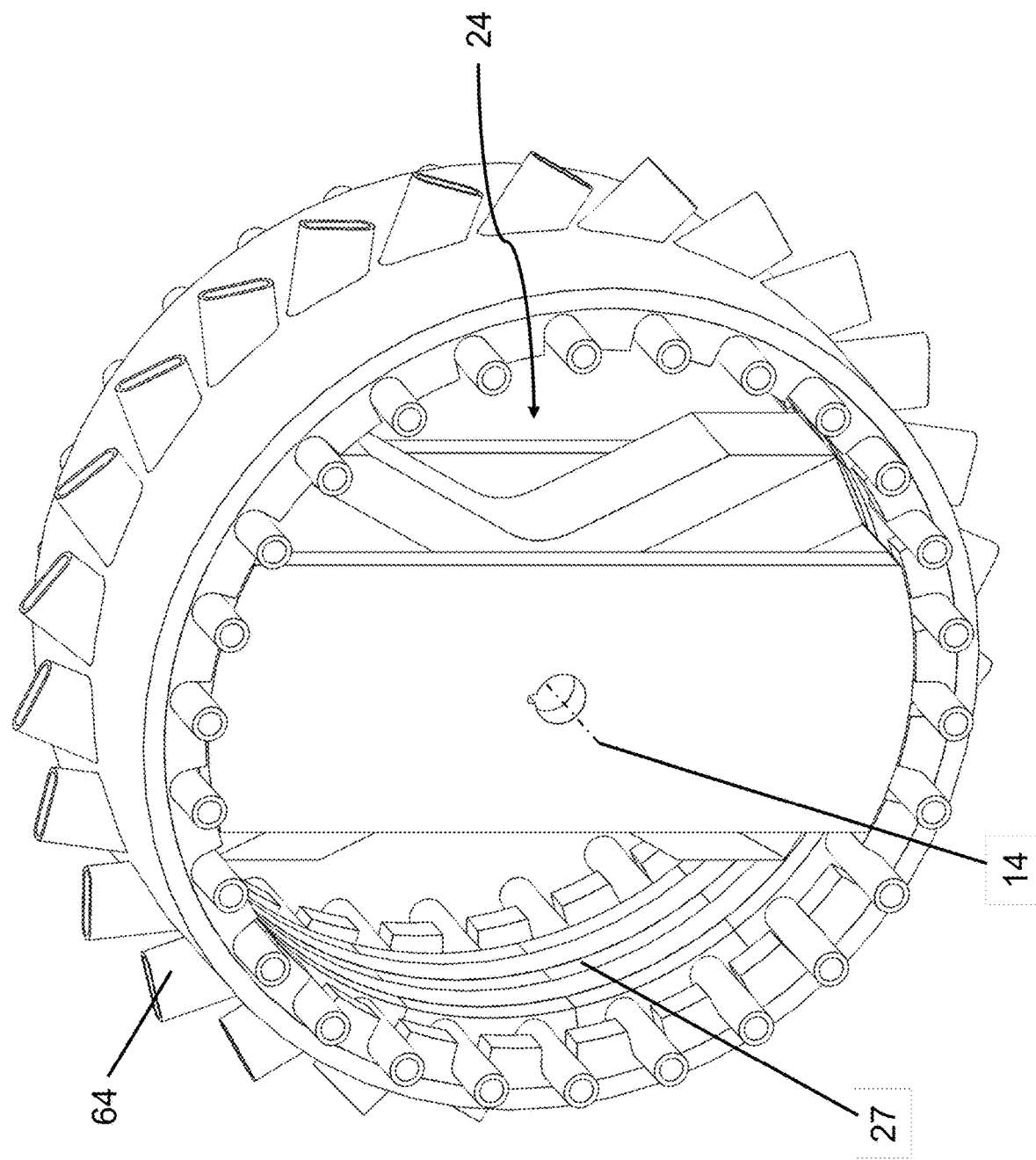
FIG. 16 is an isometric view of an MR apparatus in which fluid flows through the shared fluid plena in a direction that has a circumferential component, in accordance with an illustrative embodiment.
Figure 17:
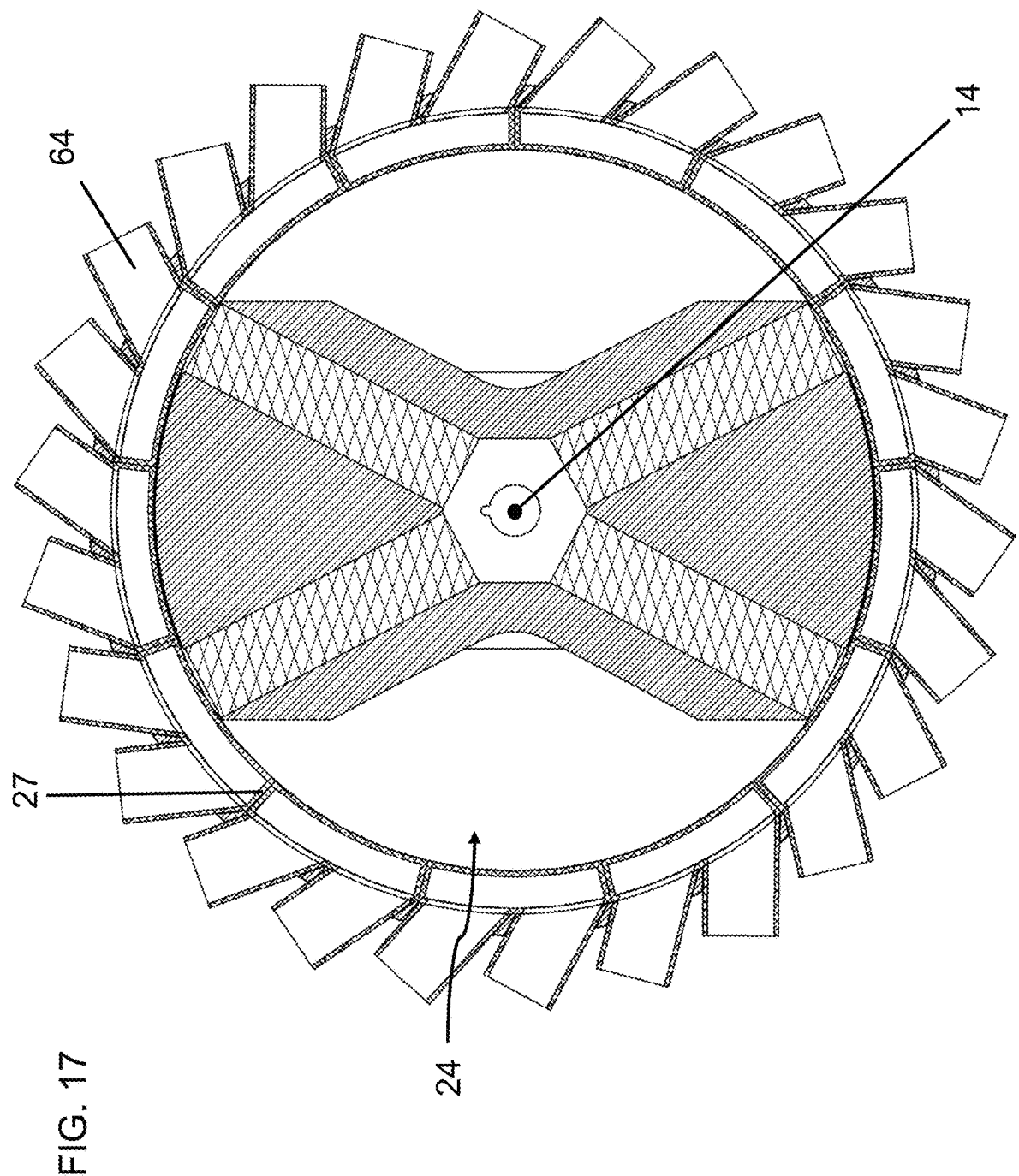
FIG. 17 is an end view of the MR apparatus of FIG. 16 at a cross-section through a symmetry plane that is normal to the central axis, in accordance with an illustrative embodiment.

The fluid plena 26, 27 and flow tubes 28, 29 for the two-drum embodiment are generally depicted in FIGS. 11 and 12. As shown in FIG. 11, each bed 220 in each bed ring 22A, 22B is connected to one unshared fluid plenum 26 and one shared fluid plenum 27. The fluid plena 26, 27 are open cavities that receive and distribute flow to the beds 220 in each bed ring 22A, 22B. As further shown in FIG. 11, for the two-drum embodiment, the flow leaving or entering the first end 226 of each bed in each bed ring 22A, 22B passes through an unshared fluid plenum 26 near each axial end of the MR apparatus 5, then in a substantially axial direction through an axial flow tube 28 that penetrates the gap flux return pieces 32. The flow leaving or entering the second end 228 of each bed ring 22A, 22B passes through a shared fluid plenum 27 and then in a substantially radial direction (with respect to the central axis 14) through a radial flow tube 29 that penetrates the OFR 30. Alternatively, as shown in FIGS. 14 through 17, the radial flow tubes 62, 64 may connect to the surface of the shared fluid plena at an angle. In FIGS. 14 and 15, the radial flow tubes 62 are oriented in a direction that has a radial component and an axial component (where the radial flow tubes 62 meet with the shared fluid plenum 27). In FIGS. 16 and 17, the radial flow tubes 64 are oriented in a direction that has a radial component and a circumferential component (where the radial flow tubes 64 meet with the shared fluid plenum 27). Regardless of the exact orientation of the radial flow tubes in these embodiments (shown in FIGS. 14 through 17), the radial flow tubes 62, 64 transport the heat transfer fluid away from or toward the magnetic-field source 24 in a direction that may be characterized as at least partially radial. That is, the flow direction through the radial flow tubes 64 has a radial component (such that the heat transfer fluid moves toward or away from the central axis 14). Furthermore, for the embodiments shown in FIGS. 14 and 15, the flow direction through the connection between the shared fluid plenum 27 and the radial flow tubes 64 also has a radial component.

Figure 18:
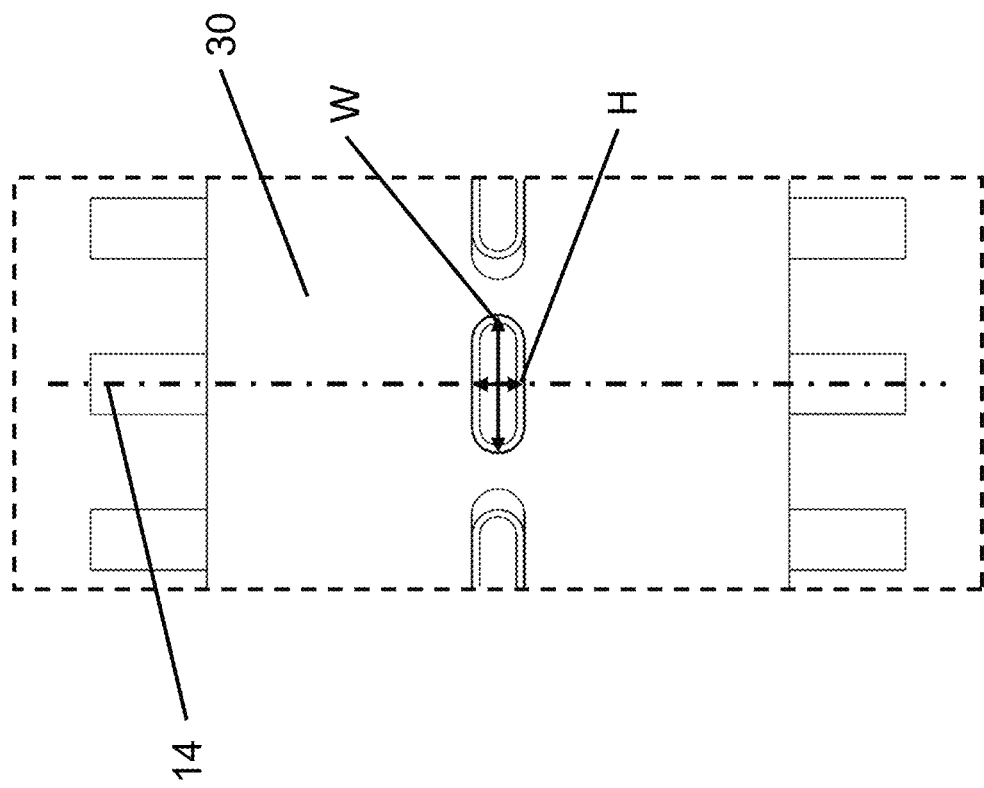
FIG. 18 is a partial, side view of the MR apparatus of FIG. 7, in accordance with an illustrative embodiment.

Returning to FIG. 11, unlike the fluid plena 26, 27, the flow through each of the axial flow tubes 28 and each of the radial flow tubes 29 is substantially unidirectional. A functional description of the flow configuration through the flow tubes for each bed 220 is provided in U.S. patent application Ser. No. 14/569,450, which is incorporated herein by reference in its entirety. To accommodate these radial flow tubes 29, through-hole passageways are machined into the OFR 30 or otherwise produced. For the two-drum embodiment, these through-hole passageways have the same shape as the radial flow tubes 29. The through-hole passageways are oversized to provide uniform clearance around the perimeter of the radial flow tubes 29. For the two-drum embodiment, the clearance between the OFR 30 and the flow tubes 29 is approximately equal to the wall thickness of the radial flow tubes 29 although other suitable dimensions are also contemplated. Various shapes can be utilized for the radial flow tubes 29 and the through-hole passageways; for example, the radial flow tubes 29 and passageways may be circular, rectangular, or any other suitable shape. As shown in FIG. 11, the radial flow tubes 29 and through-hole passageways are rectangular, with curved edges of constant radius at each circumferential end. As shown in FIG. 12, for an MR apparatus 5 with an even number of bed rings, at least one set of radial passageways pass substantially through a plane of symmetry 31 that is perpendicular to the central axis 14. The magnetic flux for the MR apparatus 5 in the near vicinity of this symmetry plane 31 is oriented substantially parallel to this symmetry plane 31. Because of the orientation of the magnetic flux, the axial dimension of the through-hole passageways is advantageously less than the circumferential dimension of the through-hole passageways. The axial dimension refers to the overall length of the through-hole passageways parallel to the central axis 14, referenced as H in FIG. 18. The circumferential dimension refers to the overall length of the passageways in a direction that is perpendicular to the axial dimension, referenced as W in FIG. 18. Reducing the axial dimension of the through-hole passageways in the OFR 30 reduces the reluctance of the OFR 30 in the magnetic circuit. For example, in the two-drum embodiment shown in FIG. 18, the axial dimension H of the passageways is approximately 2.5 times greater than the circumferential dimension W of the passageways, although other suitable dimensions can be used.

Figure 19:
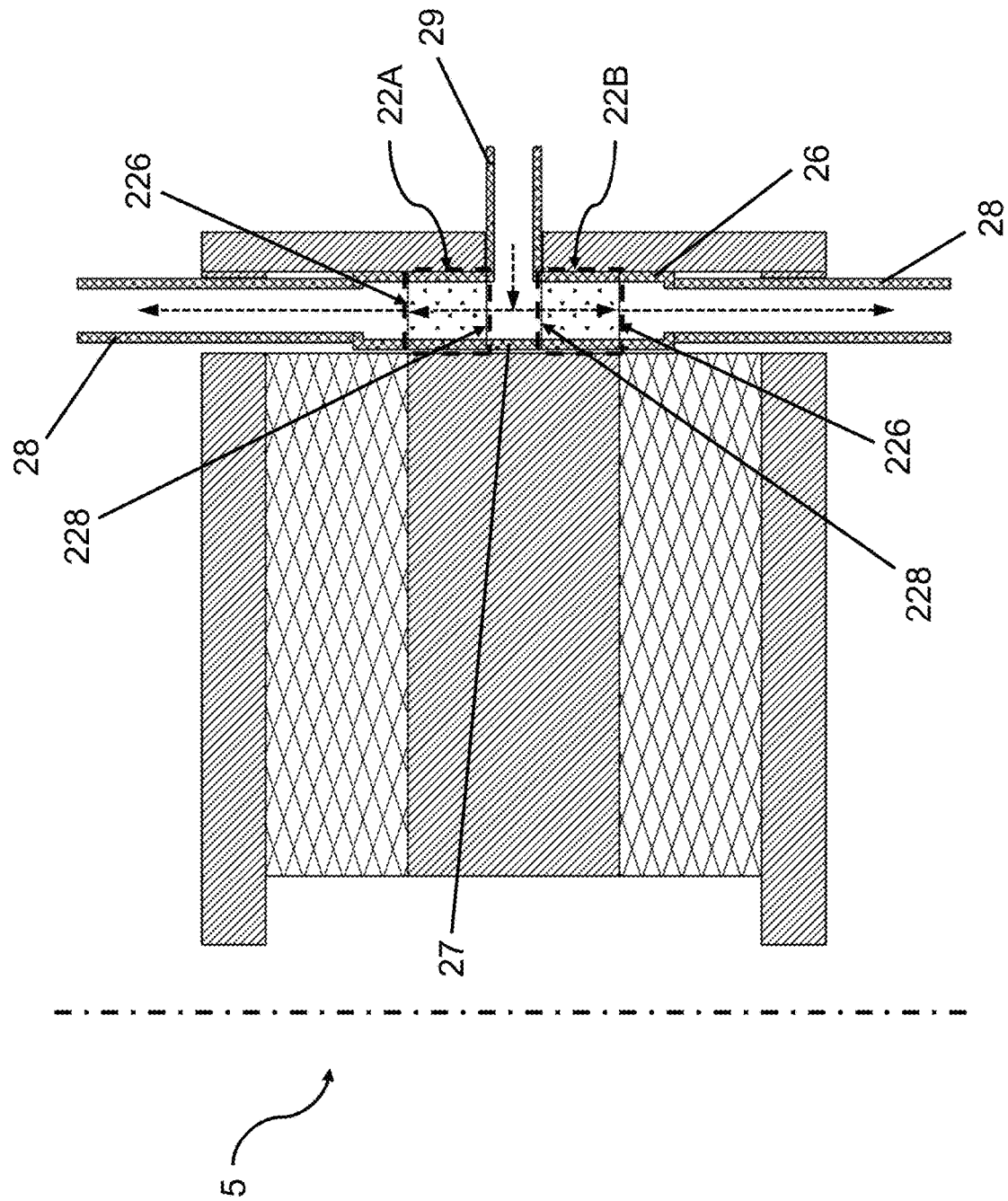
FIG. 19 is a side view of an embodiment of the MR apparatus with two bed rings, showing half of the MR apparatus in a parallel flow configuration at a cross-section through the high field region of the gap, along a symmetry plane that is parallel to the central axis, in accordance with an illustrative embodiment.
Figure 20:
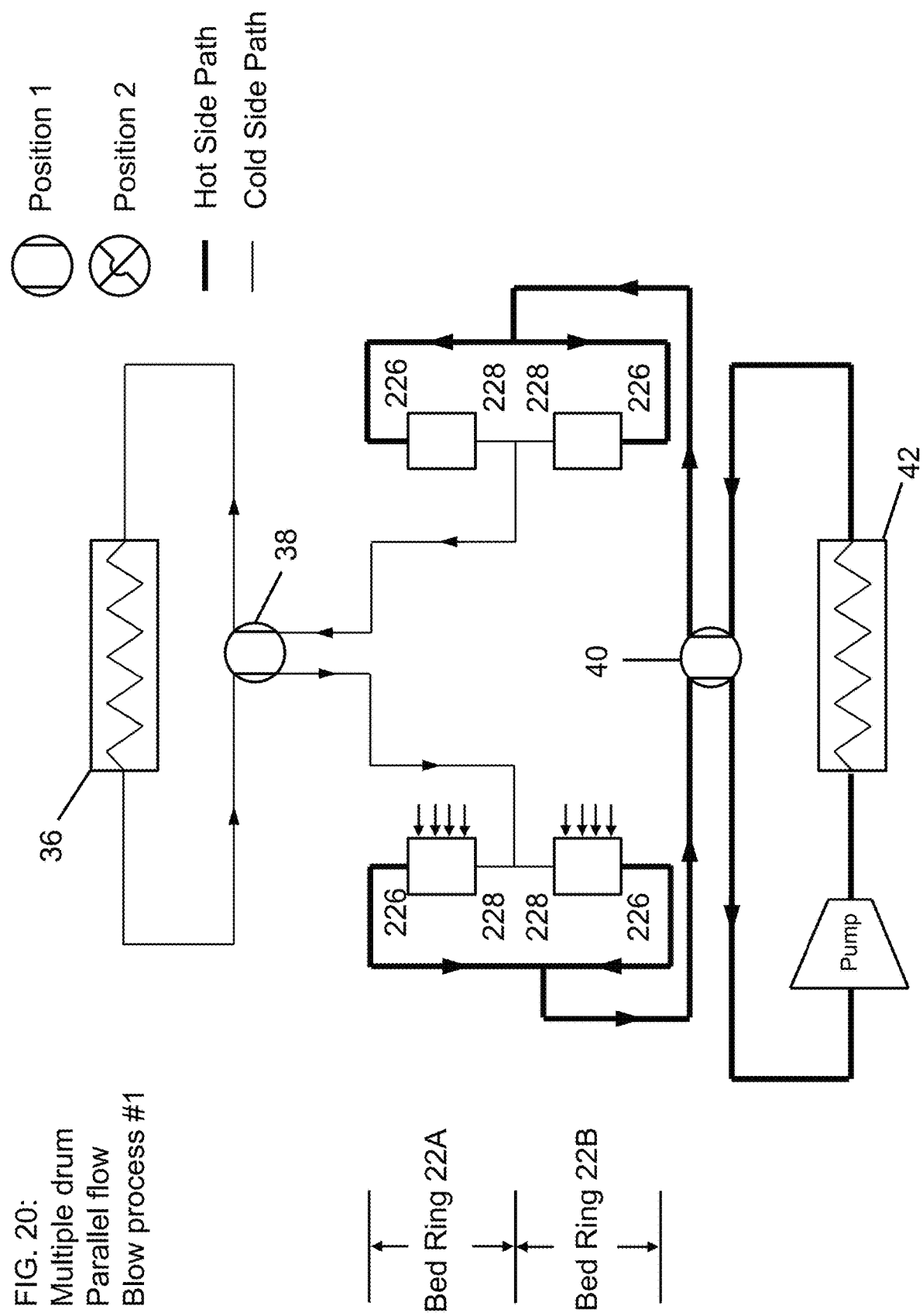
FIG. 20 is a flow schematic for the MR apparatus of FIG. 19 during the first blow process, in accordance with an illustrative embodiment.

The flow direction for two magnetized beds in a ring pair (for the two-drum embodiment) is shown generally using arrows overlaid on a cross-section through the flow tubes 28, 29, fluid plena 26, 27, and bed rings 22A, 22B in FIG. 19. This flow condition corresponds with the flow condition depicted in FIG. 1B as disclosed above. During this blow process, the "hot blow," the second end 228 of each bed ring 22A, 22B is advantageously fluidly connected to one or more CHEXs to minimize the surface area of the cold flow tubing and heat transfer losses. The flow enters the MR apparatus 5 through the second end 228 and then passes through the two bed rings 22A, 22B in parallel before leaving through the first end 226 of each bed ring 22A, 22B. The first end 226 of each bed ring 22A, 22B is fluidly connected to the one or more HHEXs. The flow direction through the beds in each bed ring 22A, 22B, fluid plena 26, 27 and flow tubes 28, 29 in the low field region is opposite of the flow direction shown in FIG. 19. A simplified flow schematic is provided in FIG. 20 that corresponds approximately with operation of the MR apparatus 5 at a given point in time, referred to herein as blow process #1. Inactive flow tubes are omitted from all the simplified flow schematics for clarity. Starting at the outlet of the CHEX 36, the flow moves through a cold end control valve 38 and is divided (e.g., equally) between magnetized beds in the two bed rings 22A, 22B at their second end 228. The magnetized beds are indicated by a series of arrows that are adjacent to one half of each bed ring 22A, 22B. After passing through the magnetized beds, the flow passes through a hot end control valve 40. Next, the flow passes through the HHEX 42 before returning to the demagnetized beds in each bed ring 22A, 22B through their first end 226. The flow then passes through the demagnetized beds (the "cold blow") in each bed ring 22A, 22B, and finally returns to the CHEX 36 through the second end 228 of each bed ring 22A, 22B and the cold end control valve 38.

Figure 21:
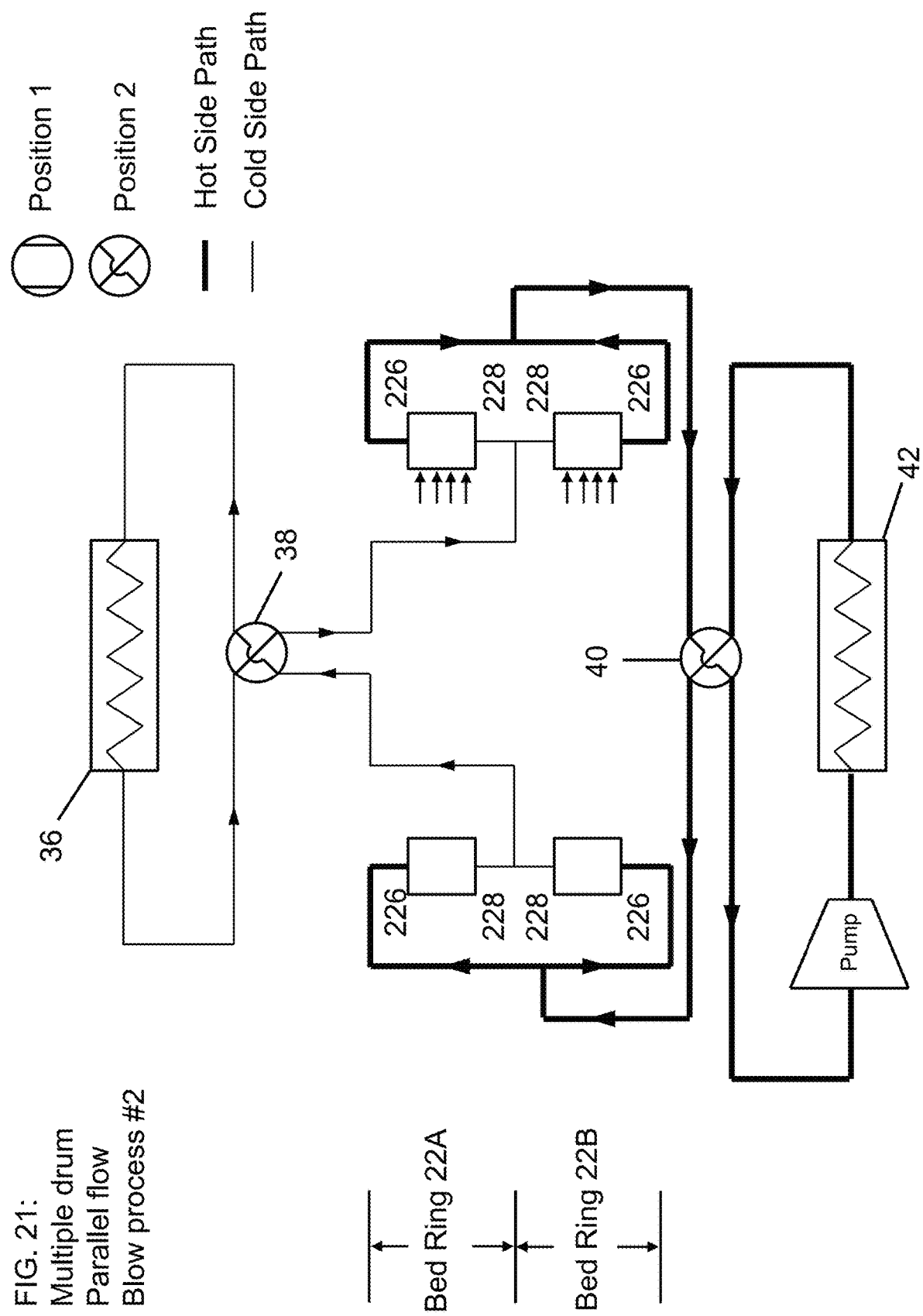
FIG. 21 is a flow schematic for the MR apparatus of FIG. 19 during the second blow process, in accordance with an illustrative embodiment.

To complete the AMR cycle for the two-drum embodiment, the hot end control valve 40 and the cold end control valve 38 are reversed as shown in FIG. 21. This scenario is referred to herein as blow process #2. The flow schematic shown in FIG. 21 corresponds to a condition where the magnetic-field source 24 (shown in FIGS. 10 and 11) has rotated 90°, so that the beds in each bed ring 22A, 22B that were previously magnetized are now demagnetized (a cross-section of this flow process is not provided). In this case the flow direction through the beds in each bed ring is reversed.

Figure 22:
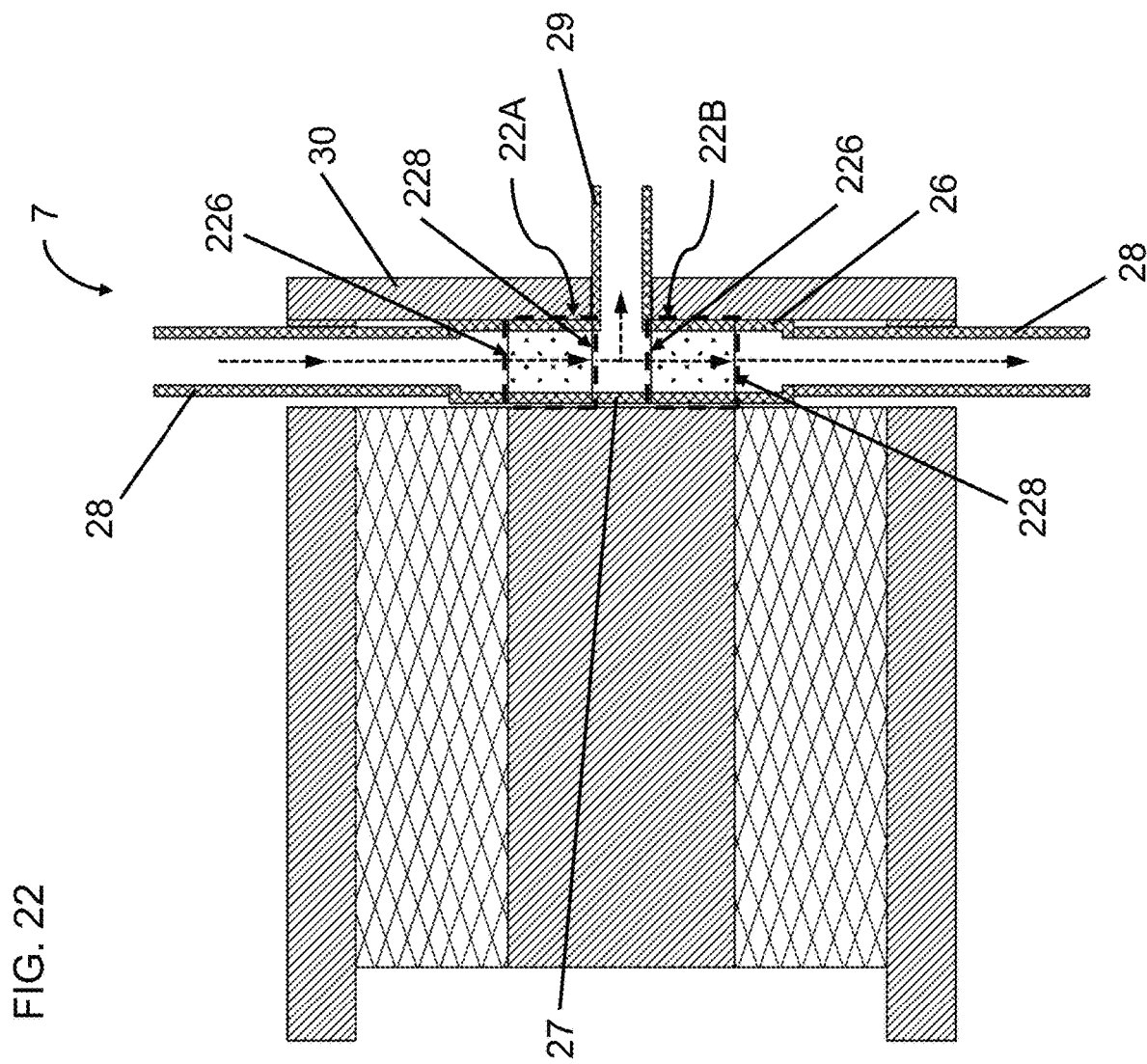
FIG. 22 is side view of an embodiment of the MR apparatus with two bed rings showing half of the MR apparatus in a series flow configuration at a cross-section through the high field region of the gap, along a symmetry plane that is parallel to the central axis, in accordance with an illustrative embodiment.
Figure 23:
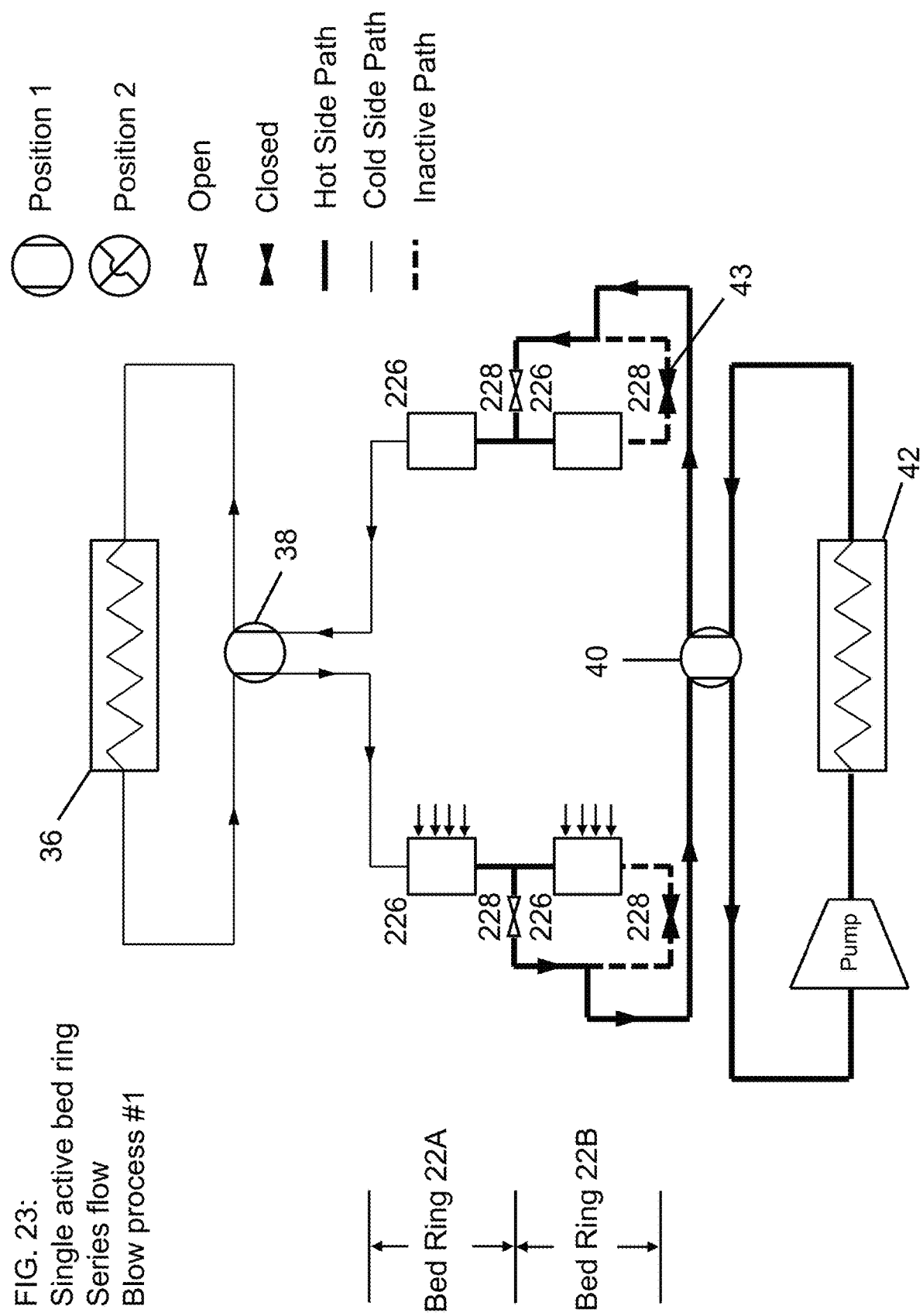
FIG. 23 is a flow schematic illustrating the first blow process for the MR apparatus of FIG. 22 with a single active bed ring, in accordance with an illustrative embodiment.
Figure 24:
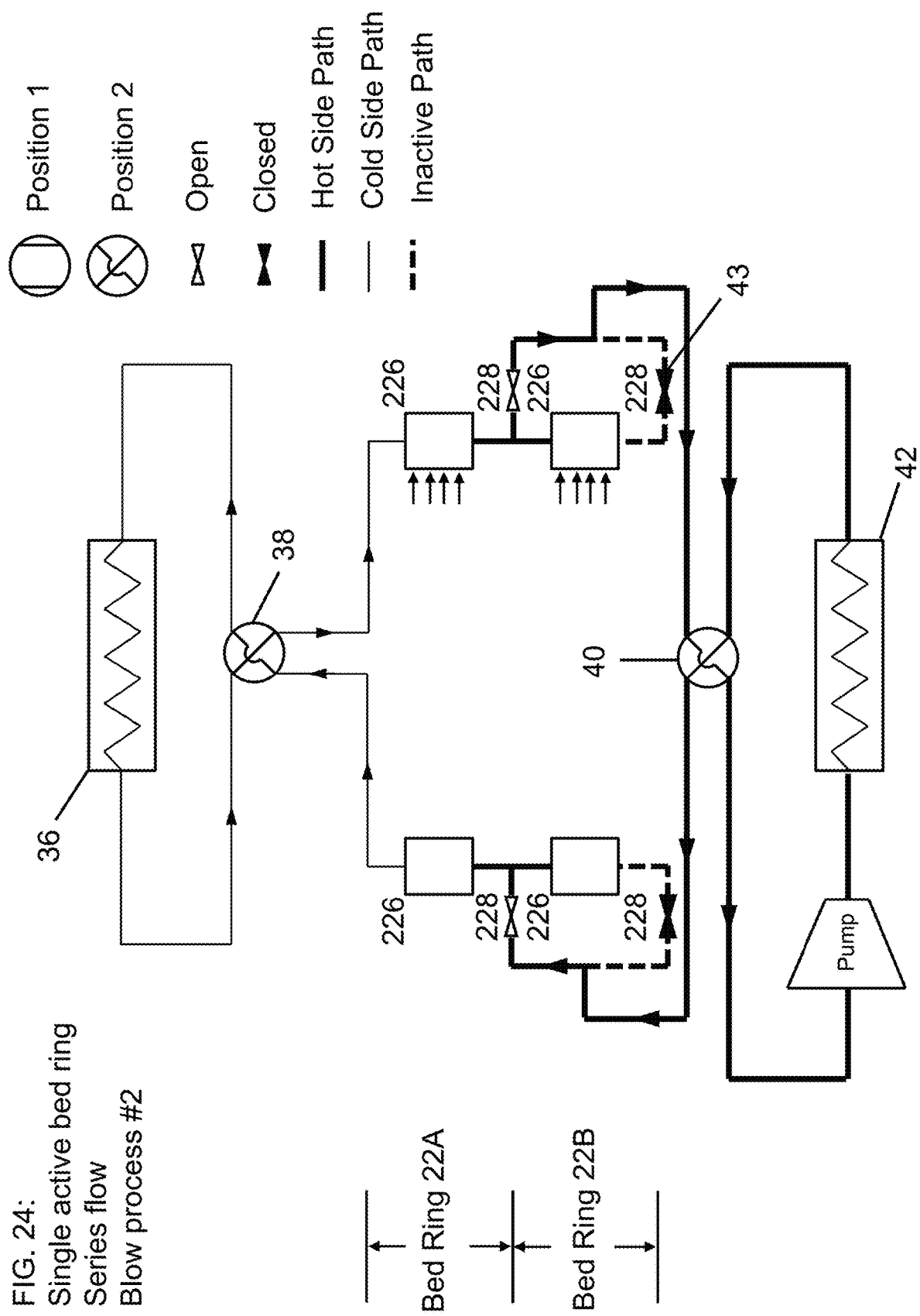
FIG. 24 is a flow schematic illustrating the second blow process for the MR apparatus of FIG. 22 with a single active bed ring, in accordance with an illustrative embodiment.

Various alternative flow configurations can be used in addition to or in place of the parallel flow configuration described above. FIG. 22 generally depicts an illustrative embodiment of an MR apparatus 7 with two bed rings 22A, 22B. As shown in FIG. 22, the flow is configured to pass through each of the two bed rings 22A, 22B in series to modulate the cold end temperature or otherwise alter the performance of the MR apparatus 7. This illustrative embodiment will be referred to herein as the series embodiment. As shown in FIG. 22, the first end 226 of each bed ring 22A, 22B faces toward the same axial end of the MR apparatus 7. In this apparatus configuration at least one of the two or more beds at a given circumferential position in each of the two bed rings 22A and 22B in the ring pair experience flow in the same axial direction. As shown by the arrows overlaid on a cross-section through the flow tubes 28, 29, fluid plena 26, 27, and bed rings 22A, 22B, flow enters the magnetized beds in the upper bed ring 22A through the first end 226 of the bed ring 22A. After passing through the upper bed ring 22A, the heat transfer fluid leaves from the second end 228 of the bed ring 22A along one of two paths (FIG. 24), 1) through the radial flow tubes 29 passing through the OFR 30, or 2) through the first end 226 of the lower bed ring 22B, then through the second end 228 of the lower bed ring 22B and the axial flow tubes 28 near the lower axial end of the MR apparatus 7. The flow path is controlled by valves located at the end of flow tubes 28, 29 (both the axial flow tubes 28 that are near the lower end of the MR apparatus 7 and the radial flow tubes 29 that are near the axial center of the MR apparatus 7). A variety of different control valve designs may be utilized for this purpose. For example, commercial off-the-shelf on/off solenoid valves could be connected to each of the flow tubes 28, 29 to intercept the heat transfer fluid leaving or returning through the second end 228 of each bed ring 22A, 22B. A simplified flow schematic showing an apparatus configuration where valves 43 are used to restrict the flow to the upper bed ring 22A is shown for blow process #1 and #2 in FIGS. 23 and 24, respectively. In this configuration, all of the valves 43 located in the flow path that communicate with the second end 228 of the lower bed ring 22B are closed, while at the same time all of the valves 43 located in the flow path that communicate with the second end 228 of the upper bed ring 22A are open.

Figure 25:
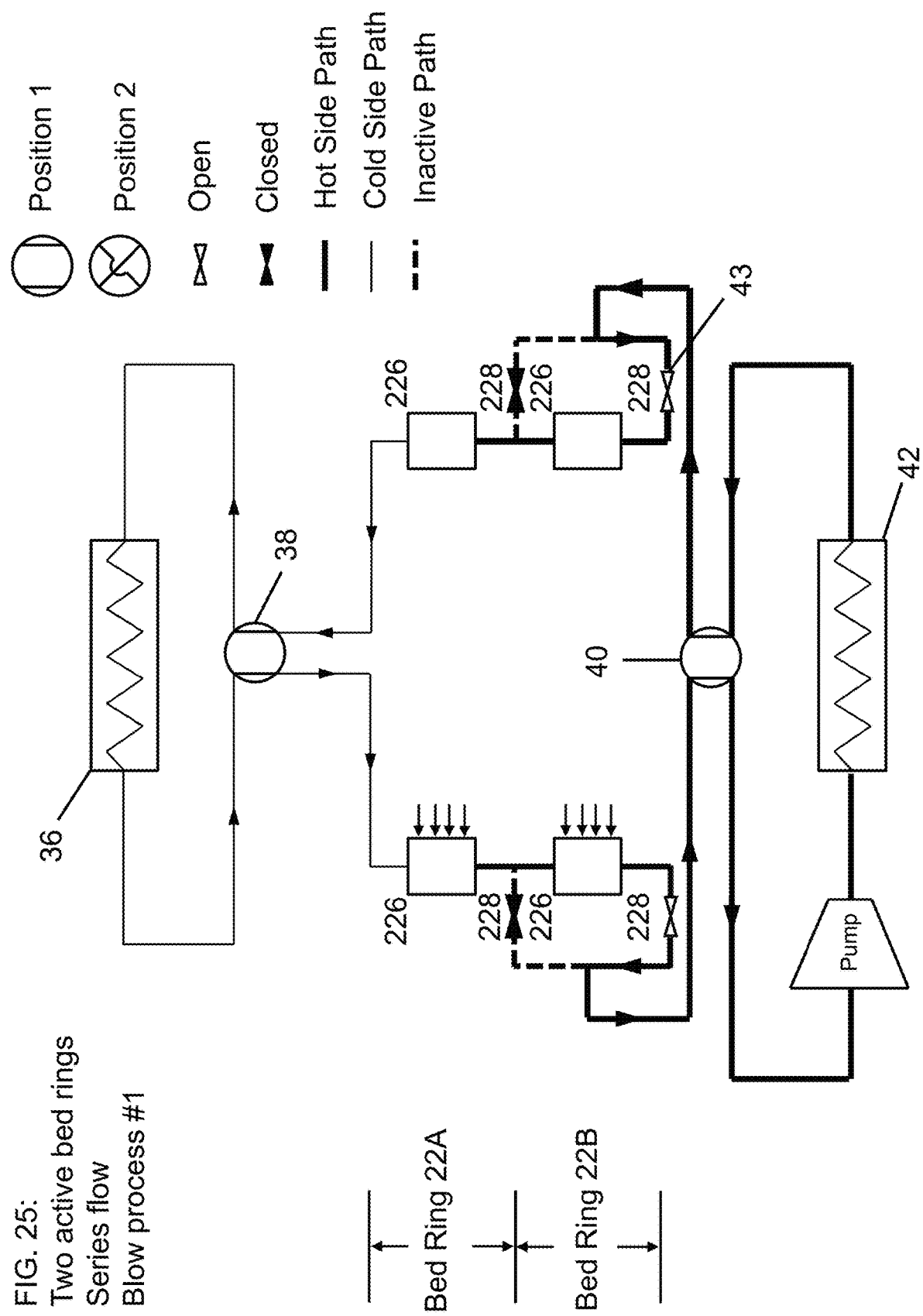
FIG. 25 is a flow schematic illustrating the first blow process for the MR apparatus of FIG. 22, in accordance with an illustrative embodiment.
Figure 26:
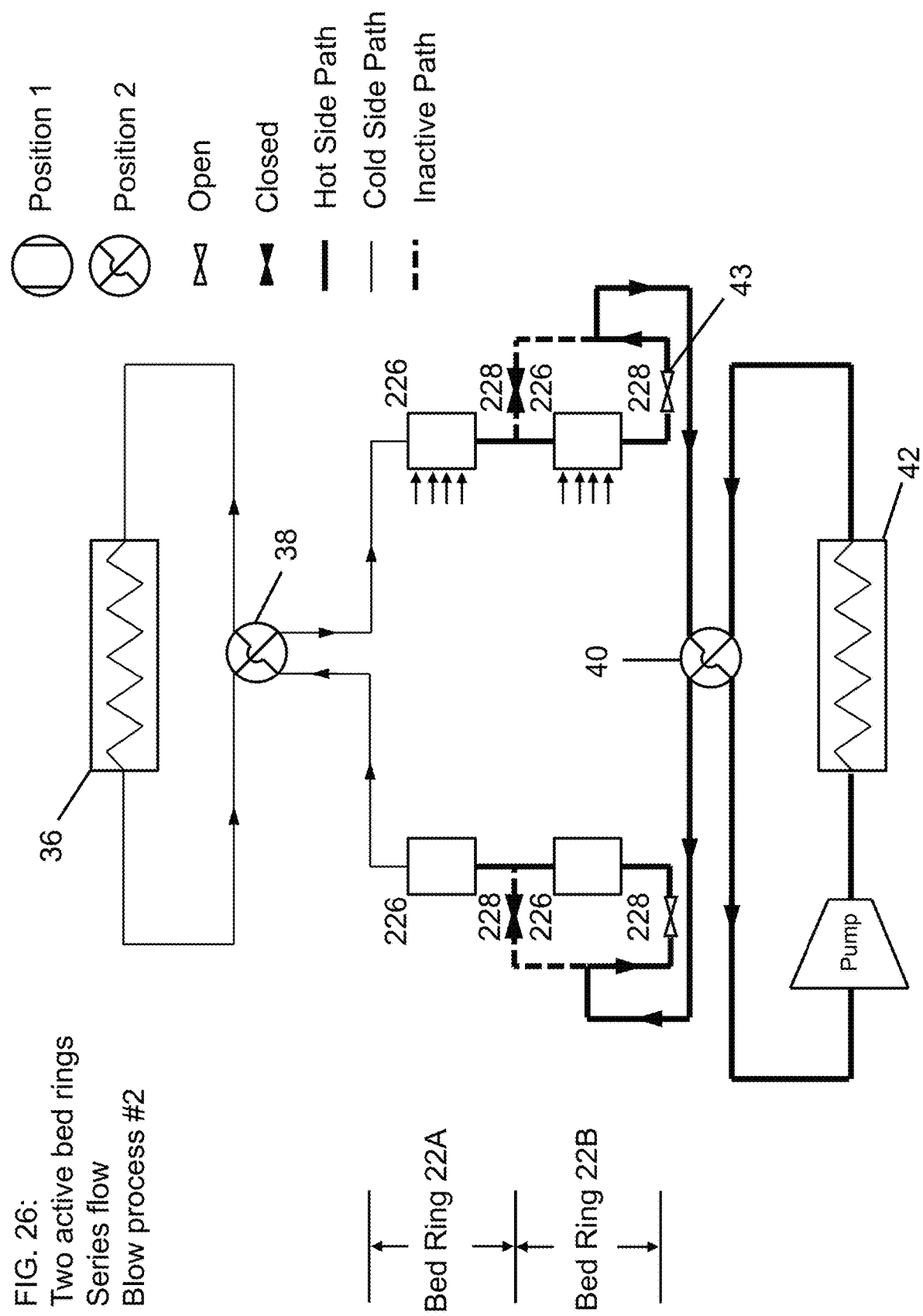
FIG. 26 is a flow schematic illustrating the second blow process for the two-drum MR apparatus of FIG. 22, in accordance with an illustrative embodiment.

An alternate apparatus configuration of the series embodiment is shown for blow process #1 and #2 in FIGS. 25 and 26, respectively. In FIGS. 25 and 26, the valves 43 located in the flow path that are fluidly connected to the second end 228 of the lower bed ring 22B are open, while at the same time all of the valves 43 located in the flow path that are fluidly connected to the second end 228 of the upper bed ring 22B are closed. In this apparatus configuration, the flow passes through both bed rings 22A, 22B.

Similar flow control techniques can be utilized to alter the performance of an MR apparatus configured for parallel flow. For example, devices to control the flow of heat transfer fluid through the first end 226 of each bed in the two-drum embodiment (FIG. 19) can be utilized to modulate system cooling power. During periods where the refrigeration load is reduced, the flow to one of the two bed rings 22A or 22B could be turned off to reduce energy consumption. An illustrative flow schematic is not provided for this MR apparatus configuration.

Figure 27:
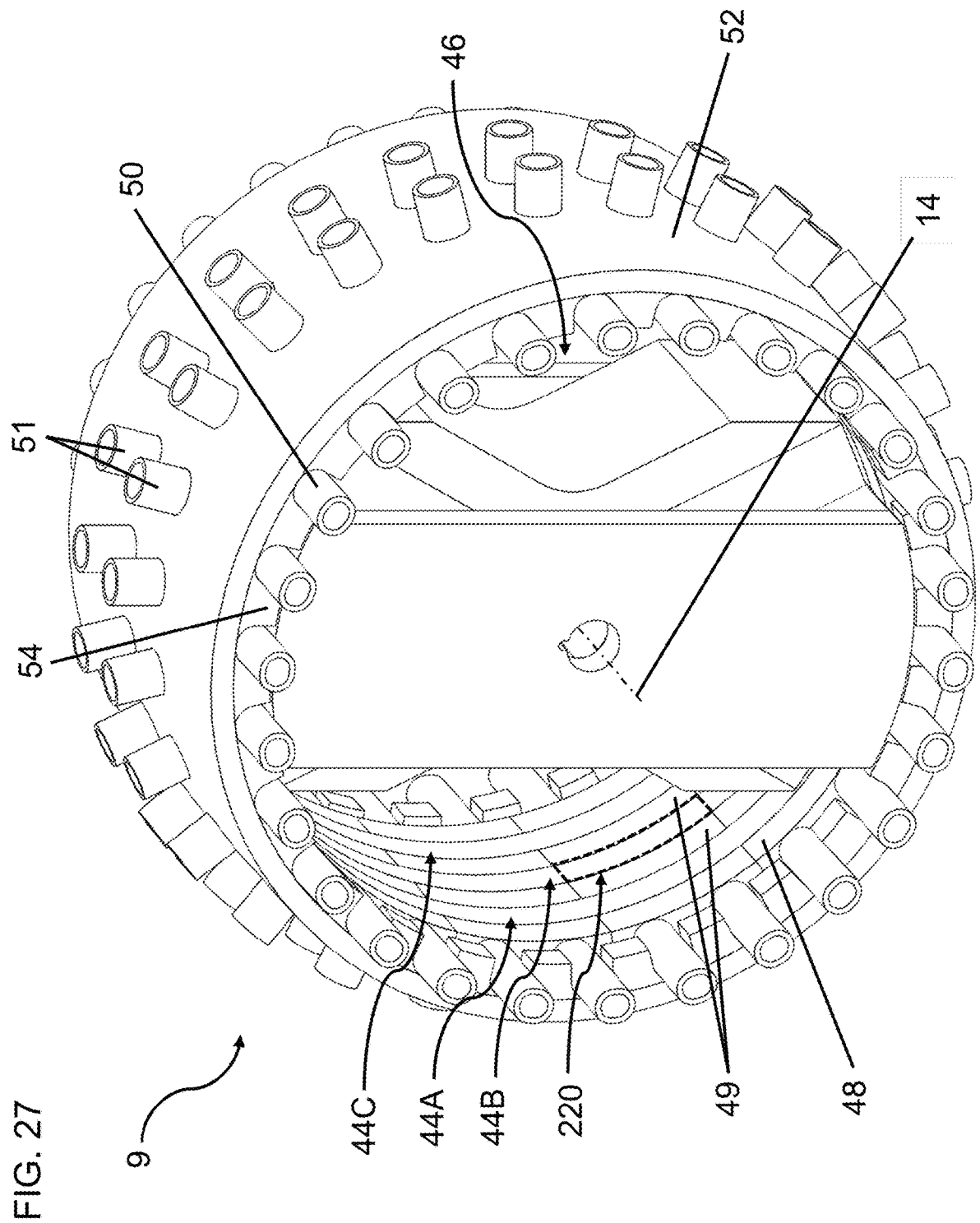
FIG. 27 is an isometric view of an MR apparatus having three bed rings, in accordance with an illustrative embodiment.

FIG. 27 generally depicts an MR apparatus 9 having a single magnetic-field source that provides a magnetic field to three bed rings 44A, 44B, 44C, referred to herein as the three-drum embodiment. The three-drum embodiment shown in FIG. 27 further includes fluid plena 48 (unshared), 49 (shared), flow tubes 50 (unshared), 51 (shared), an OFR 52, and gap flux return pieces 54. Additional auxiliary components (not shown) include one or more hot side heat exchangers (HHEXs), one or more cold side heat exchangers (CHEXs), one or more pumps or fluid displacement devices configured to move the heat transfer fluid, and one or more valves or other devices to control the flow of heat transfer fluid to the beds 220. Various implementations of these auxiliary components may be found in the references provided in this disclosure.

Figure 28:
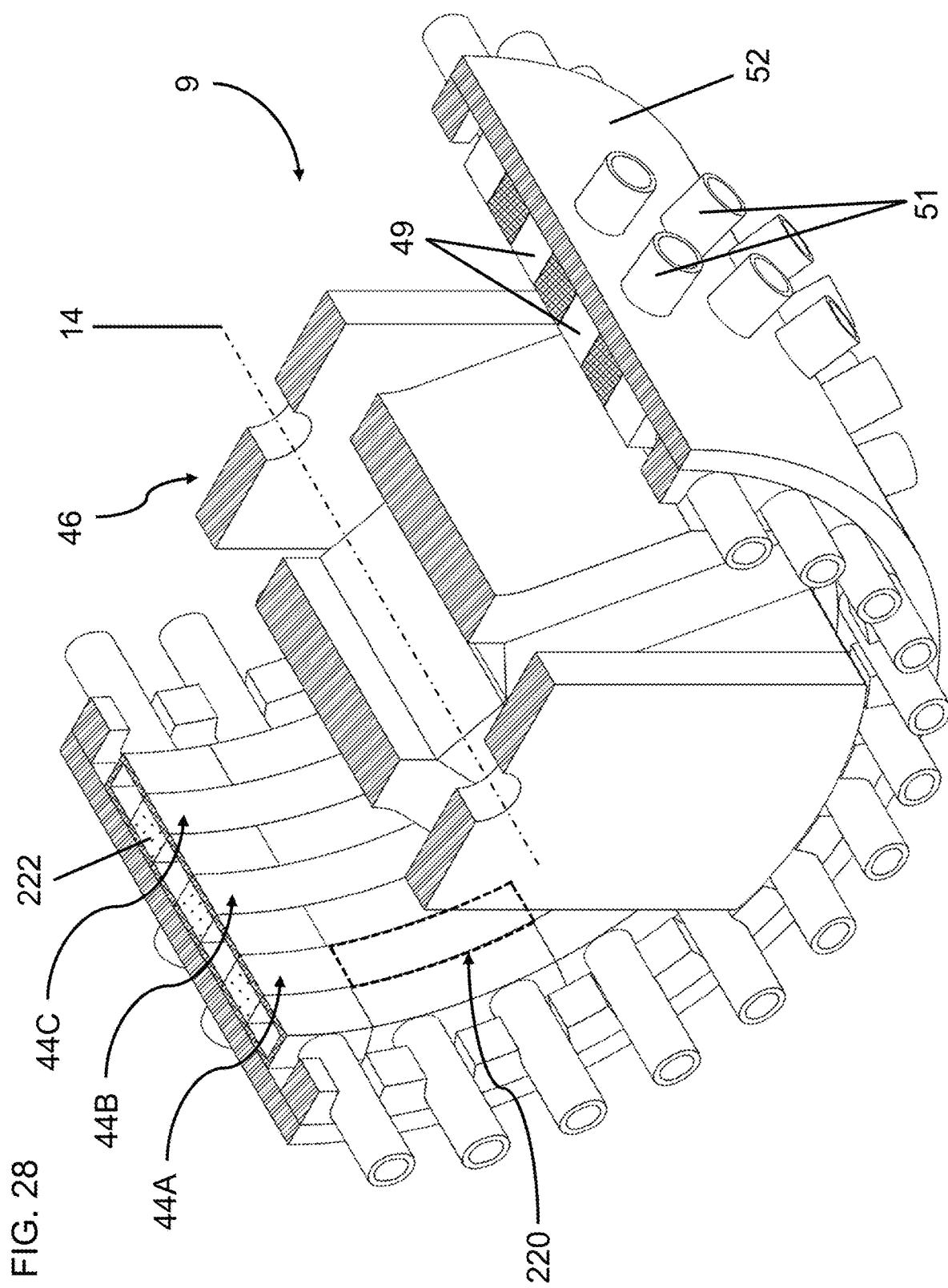
FIG. 28 is an isometric view of the MR apparatus of FIG. 27 at a cross-section through the low field region of the gap, along a symmetry plane that is parallel to the central axis, in accordance with an illustrative embodiment.

The three-drum embodiment shown in FIG. 27 includes a single magnetic-field source 46, an odd number of bed rings 44A, 44B, 44C in a parallel flow configuration, and an OFR 52. The components and functional description of the magnetic-field source 46, OFR 52, and gap flux return pieces 54 are identical to the two-drum embodiment disclosed above (FIGS. 8 through 12), with the exception of the axial length of these components. As shown in FIGS. 27 and 28, each of the three bed rings 44A, 44B, 44C includes two or more beds 220 that are arranged along a circumferential direction about a central axis 14. Like the two-drum embodiment (FIG. 8), the bed rings 44A, 44B, 44C for the three-drum embodiment (FIG. 28) are located in a gap formed between the magnetic-field source 46 and the OFR 52. Each of the three bed rings 44A, 44B, 44C shown in FIG. 28 are identical to one another in that each bed ring 44A, 44B, 44C has the same number of beds 220 and contains the same amount of MCM 222. Alternatively, the quantity of beds 220 or MCM 222 in each bed ring 44A, 44B, 44C can be different. As shown in FIG. 28, the three bed rings 44A, 44B, 44C are located at different axial positions along the central axis 14. The angular position of each bed ring 44A, 44B, 44C is the same, so that each bed 220 in one bed ring 44A shares the same circumferential position as another bed 220 in either of the remaining bed rings 44B, 44C.

Like the two-drum embodiment (FIGS. 8-12), each bed ring 44A, 44B, 44C in the three-drum embodiment forms a ring pair with its nearest adjacent bed ring 44A, 44B, 44C. As shown in FIG. 29, a shared fluid plenum 49 is associated with each ring pair. A first bed ring or upper bed ring 44A is located near the upper axial end of the MR apparatus 9, a second bed ring or middle bed ring 44B is located toward the center (axially) of the MR apparatus 9, and a third bed ring or lower bed ring 44C is located near the lower axial end of the MR apparatus 9. For the three-drum embodiment shown in FIG. 29, the first end 226 of the upper bed ring 44A faces toward the upper axial end of the MR apparatus 9. The second end 228 of the upper bed ring 44A faces toward the second end 228 of the middle bed ring 44B. Together, the upper and middle bed ring 44A and 44B, respectively, form one ring pair wherein flow leaving or entering beds 220 from the second end 228 of each bed ring 44A, 44B passes through a shared fluid plenum 49. As shown in FIG. 29, a second ring pair is formed between the middle bed ring 44B and the lower bed ring 44C, so that flow leaving or entering beds 220 from the first end 226 of each bed ring 44B, 44C passes through another shared fluid plenum 49.

The axial length of the gap for the three-drum embodiment is referenced as L in FIG. 29. As shown in FIG. 29, the axial length of the gap is equal to the combined axial length of the all three bed rings 44A, 44B, 44C, plus any additional axial length required for flow plenums 48, 49, flow tubes 50, 51, and air gaps between the bed rings 44A, 44B, 44C. As shown in FIG. 29, for pole 56A the axial length of the pole piece 560A is approximately equal to the axial length of the gap, L; although other suitable configurations can be used. For the three-drum embodiment, the axial length of the pole piece 560A is approximately equal to three times the axial length of a single bed ring 44A, 44B, or 44C plus the additional axial length required for the shared fluid plena 49. The radial extent of the gap is referenced as dR in FIG. 29. As with the two-drum embodiment, sub-dividing a single bed ring into multiple bed rings 44A, 44B, 44C without altering the combined available flow area through the beds in bed rings 44A, 44B, 44C, or the axial length through the beds, or the inner radius, results in a reduction of the ratio of dR/L. This decrease in dR/L results in an increase in the mass efficiency of the permanent magnet material. However, as shown in FIG. 29 for the three-drum embodiment, the combined axial length of the shared fluid plena 49 between beds in the high field region of the gap increases with the number of bed rings 44A, 44B, 44C. The shared fluid plena 49 occupy space in the gap and reduce the utilization of the high field region by the MCM and reduce the mass efficiency of the permanent magnet material.

As shown in FIG. 27, radial through-hole passageways are machined into the OFR 52 or otherwise produced to accommodate flow tubes 51 that are oriented in a substantially radial direction. As shown in FIG. 27, the flow tubes 51 extend from the shared fluid plena 49. For the three drum embodiment, these radial flow tubes 51 are circular. A partial view of the radial flow tubes 51 and OFR 52 is shown in FIG. 30. The axial dimension of the radial through-hole passageways, parallel to the central axis 14, is referenced as H in FIG. 30, while the circumferential dimension of the radial through-hole passageways, perpendicular to the axial dimension, is referenced as W. Increasing the axial dimension of the radial through-hole passageways, H, will increase the reluctance of the magnetic circuit through the OFR 52 in a circumferential direction. Increasing the circumferential dimension, W, of the through-hole passageways will increase the reluctance of the magnetic circuit through the OFR 52 in an axial direction. Other alternatives for the shape of the through-hole passageways (and hence the radial flow tubes 51) can be used; for example, the effect of the shared fluid plena 49 on the mass efficiency can be reduced by minimizing the axial dimension, H, of the through-hole passageways, thereby reducing the axial length of the shared fluid plena 49 (as was done for the two-drum embodiment shown in FIG. 12). In this case, the shape of the radial flow tubes 51 can be rectangular.

A partial view of the flow tubes 48 that are oriented in a substantially axial direction for the three-drum embodiment is shown in FIG. 31. Various other shapes of the axial flow tubes 48 can be used; for example, the axial flow tubes 48 may be circular, elliptical, or any other suitable shape. For the three-drum embodiment shown in FIG. 31, the axial flow tubes 48 are rectangular, with curved edges of constant radius at each circumferential end. The radial dimension of the axial flow tubes 48, referenced as R in FIG. 31, is less than the circumferential dimension, C of the axial flow tubes 48. In the three-drum embodiment, the radial dimension, R, of the axial flow tubes 48 is limited by the radial extent of the gap, dR (FIG. 29). Large values of R reduce the clearance between the axial flow tubes 48 and the magnetic-field source 46, or the axial flow tubes 48 and the OFR 52. Increasing the circumferential dimension of the axial flow tubes 48, C, relative to the radial dimension R, reduces the pressure drop through each axial flow tube 48, which improves the performance of the MR system.

Figure 32:
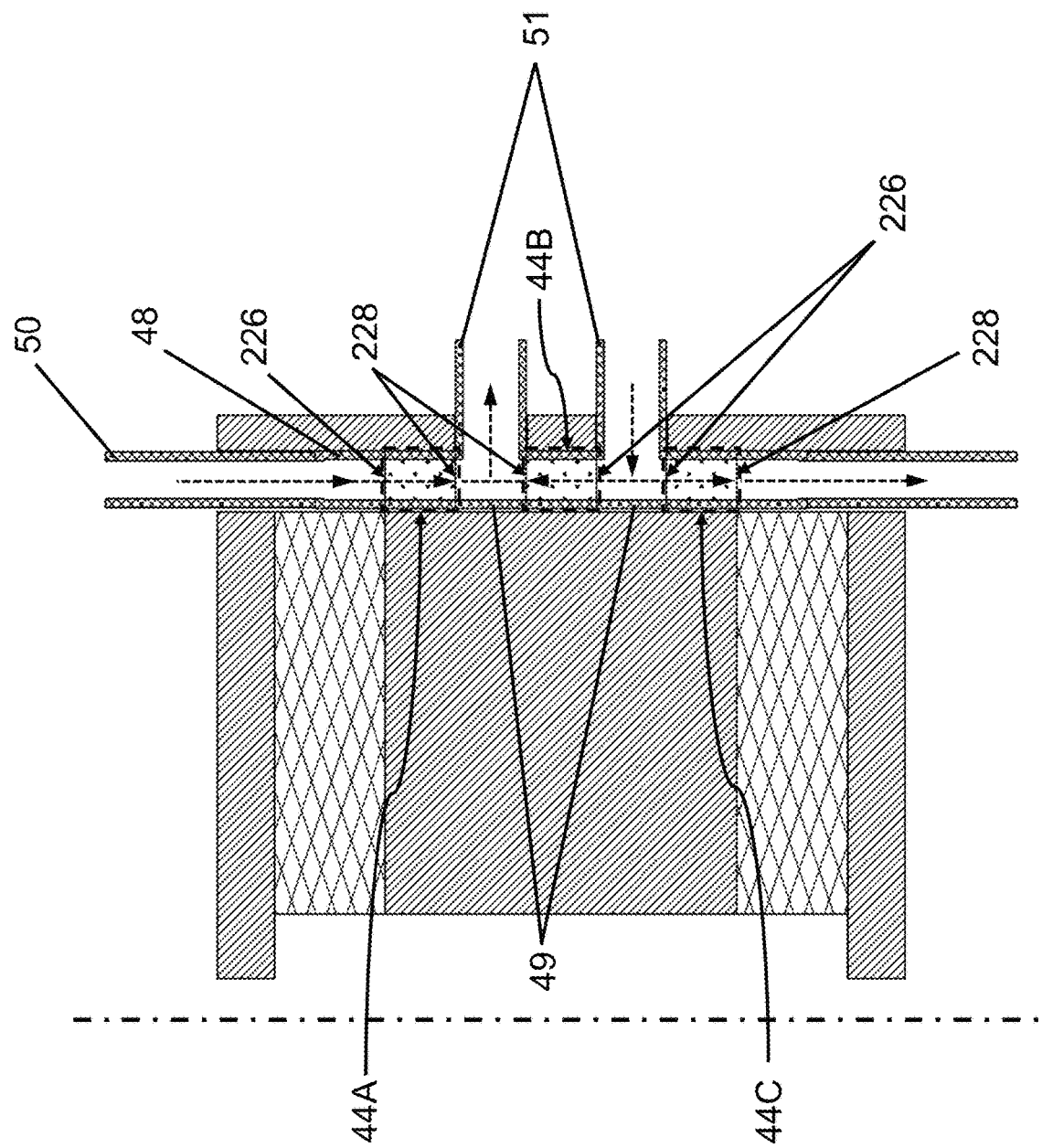
FIG. 32 is a side view of the MR apparatus of FIG. 27, showing half of the MR apparatus at a cross-section through the high field region of the gap, along a symmetry plane that is parallel to the central axis, in accordance with an illustrative embodiment.
Figure 33:
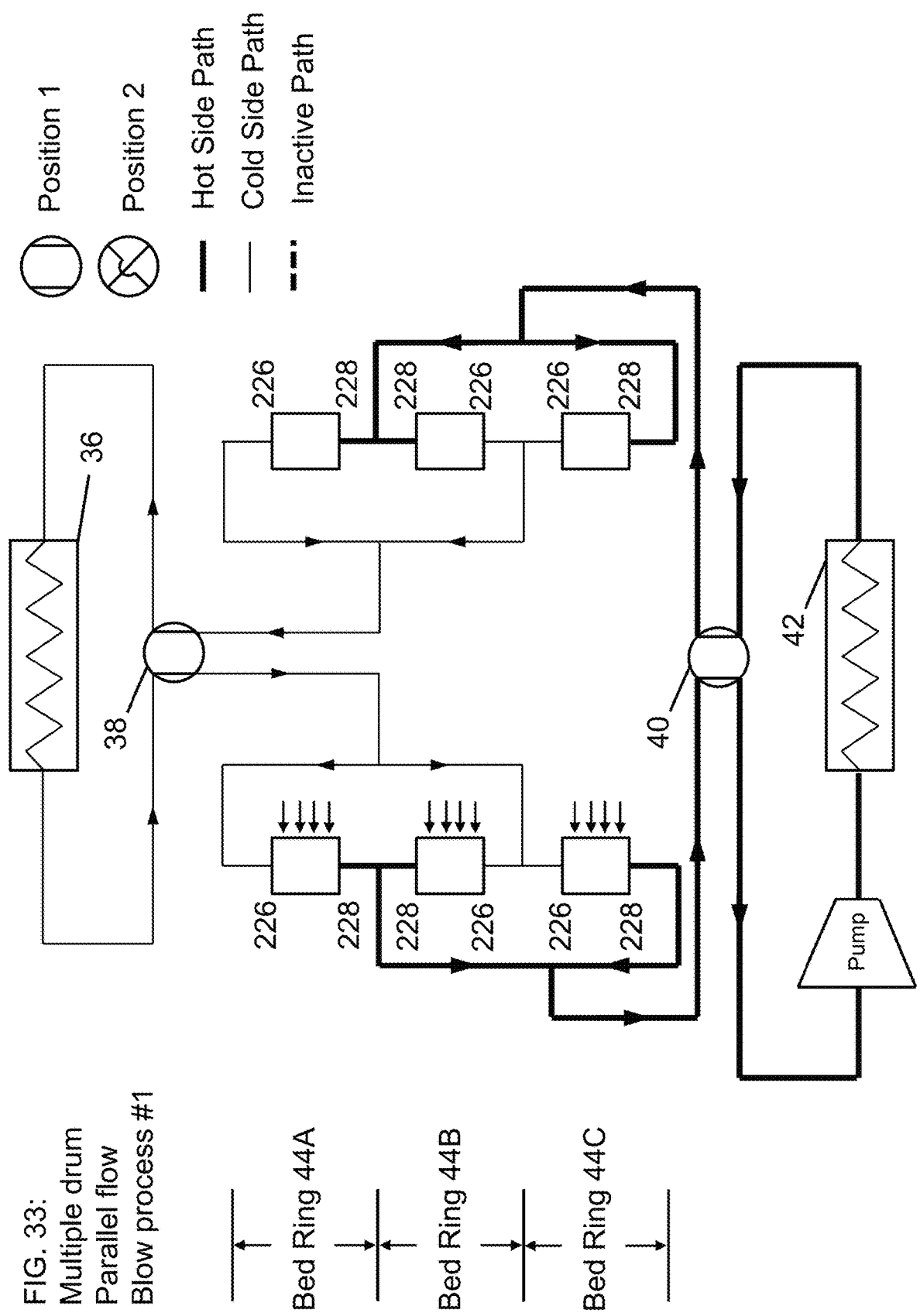
FIG. 33 is a flow schematic for the MR apparatus of FIG. 27 in a parallel flow configuration during the first blow process, in accordance with an illustrative embodiment.

The flow through the three-drum embodiment is shown using arrows overlaid on the cross-section through the flow tubes 48, 49, fluid plena 50, 51, and beds in FIG. 32. This flow condition corresponds with the flow condition depicted in FIG. 1B (the "hot blow") as disclosed in the background section above. In this apparatus configuration, a first bed ring 44A and a second bed ring 44B form a ring pair. The second bed ring 44B also forms a ring pair with a third bed ring 44C. At a given point in time, as shown in FIG. 32, the flow enters through the first end 226 of each bed ring 44A, 44B, 44C and proceeds through beds in each of the three bed rings 44A, 44B, 44C in parallel. In this configuration, at least one of the two or more beds 220 at a given circumferential position in each of the two beds rings 44A and 44B, or 44B and 44C in each ring pair experience flow in opposite axial directions. The flow leaves through the second end 228 of each bed ring 44A, 44B, 44C. The first end 226 of each bed ring 44A, 44B, 44C is fluidly connected to one or more CHEXs, while the second end 228 of each bed ring 44A, 44B, 44C is fluidly connected to the one or more HHEXs. The flow direction through the beds, fluid plena 50, 51, and flow tubes 48, 49 in the low field region is opposite of the flow direction shown in FIG. 32. A simplified flow schematic of blow process #1 is provided in FIG. 33. Starting at the outlet of the CHEX 36, the flow moves through a cold end control valve 38 and is equally divided between magnetized beds in the three bed rings 44A, 44B, 44C at their first end 226. The magnetized beds are indicated by a series of arrows that are adjacent to the beds. After passing through the beds, the flow passes through a hot end control valve 40. Next, the flow passes through the HHEX 42 before returning to the demagnetized beds in each bed ring 44A, 44B, 44C through their second end 228. The flow then passes through the demagnetized beds (the "cold blow") in each bed ring 44A, 44B, 44C, and finally returns to the CHEX 36 through the first end 226 of each bed ring 44A, 44B, 44C and the cold end control valve 38.

Figure 34:
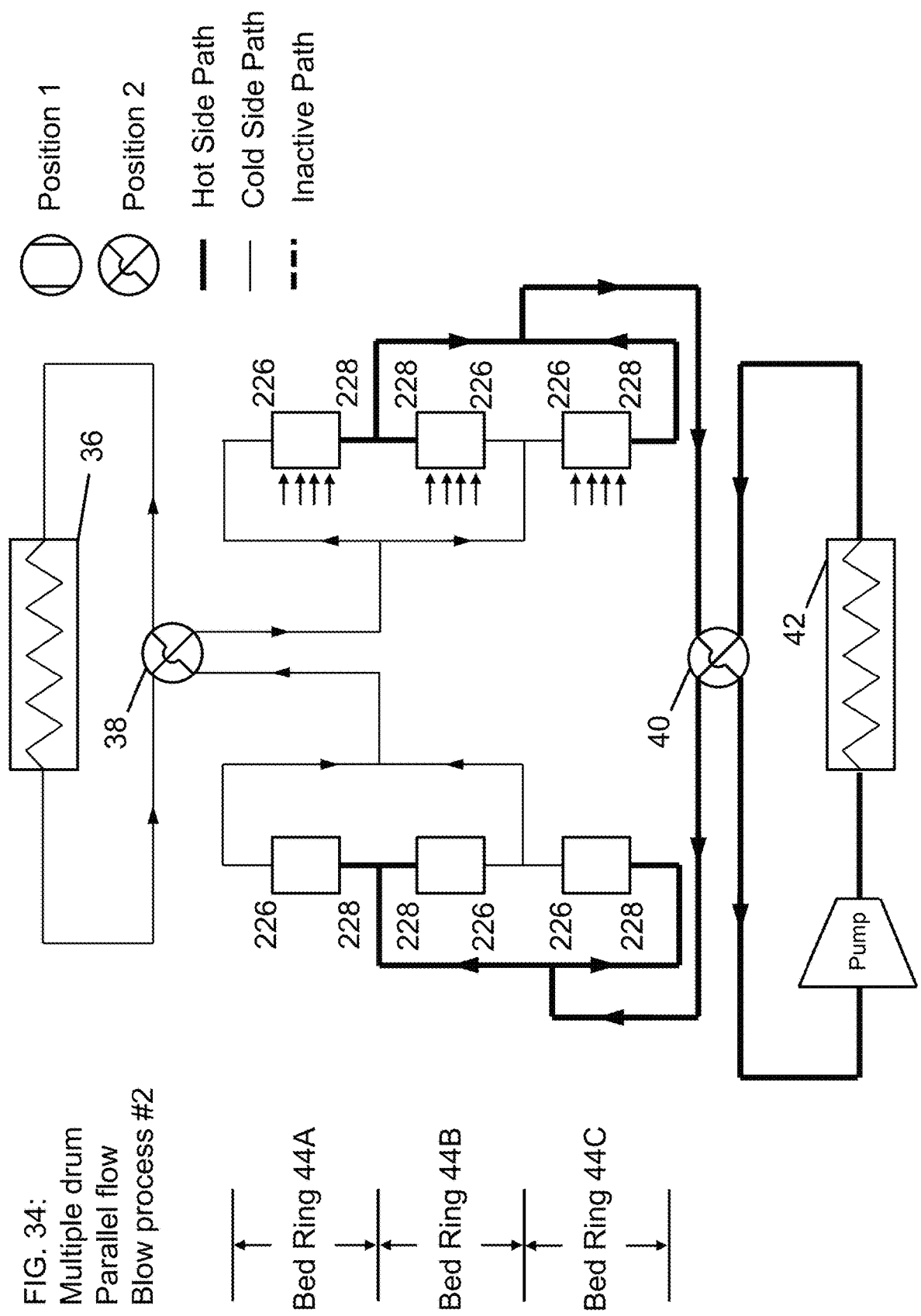
FIG. 34 is a flow schematic for the MR apparatus of FIG. 27 in a parallel flow configuration, during the second blow process, in accordance with an illustrative embodiment.

To complete the AMR cycle for the three-drum embodiment, the hot end control valve 40 and the cold end control valve 38 are reversed as shown in FIG. 34. This scenario is referred to herein as blow process #2. The flow schematic shown in FIG. 34 corresponds to a condition where the magnetic-field source 46 (shown in FIGS. 27 and 28) has rotated 90°, so that the beds in each bed ring 44A, 44B, 44C that were previously magnetized are now demagnetized (a cross-section of this flow process is not provided). In this case the flow direction through the beds in each bed ring 44A, 44B, 44C is reversed.

Figure 35:
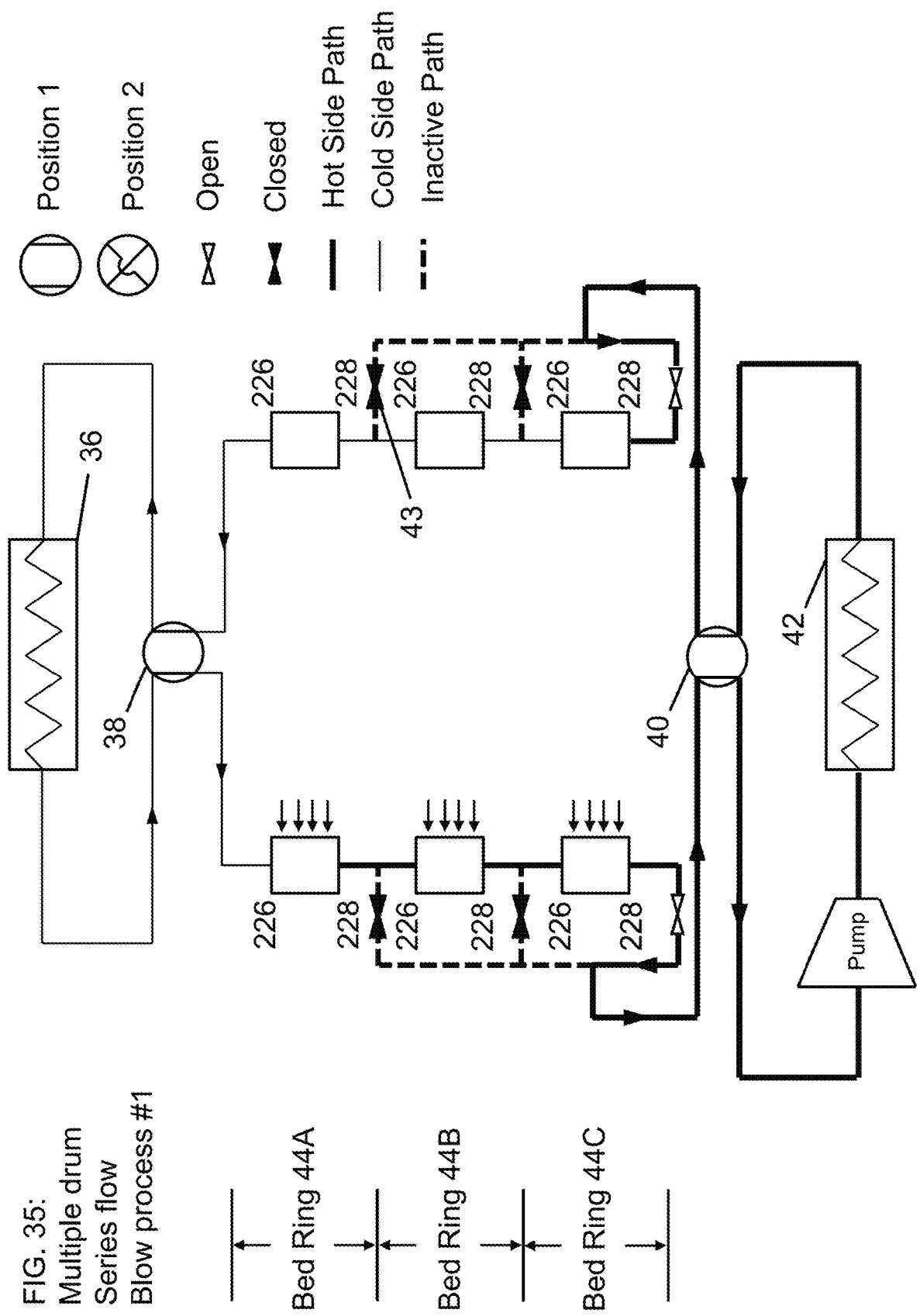
FIG. 35 is a flow schematic for the MR apparatus of FIG. 27 in a series flow configuration, during the first blow process, in accordance with an illustrative embodiment.
Figure 36:
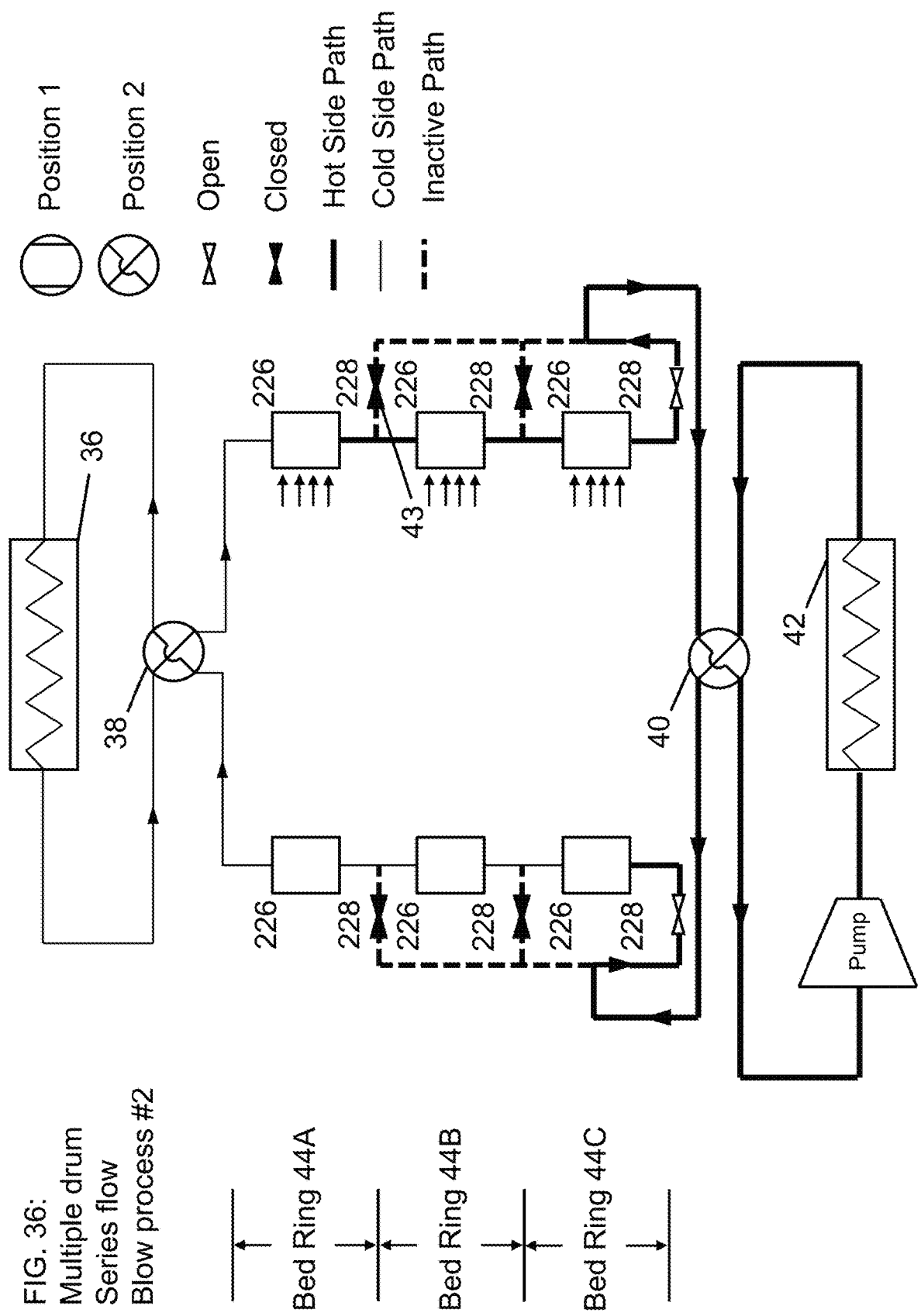
FIG. 36 is a flow schematic for the MR apparatus of FIG. 27 in a series flow configuration, during the second blow process, in accordance with an illustrative embodiment.

Additional apparatus configurations can be used for the three-drum embodiment. For example, devices to control the flow through each bed from all three bed rings 44A, 44B, 44C (shown in FIGS. 27 and 28) can be used to modify the cooling power or otherwise alter the performance of the MR apparatus 9. Alternatively, the flow could be configured to pass through the bed rings 44A, 44B, 44C in series similar to the series embodiment of FIG. 22. An example of the series flow configuration for the three-drum embodiment is shown in FIGS. 35 and 36. FIG. 35 shows the first blow process 1 for the case where all three bed rings 44A, 44B, 44C are active, while FIG. 36 shows blow process 2. The number of active bed rings 44A, 44B, 44C may be controlled by opening/closing valves 43. In the apparatus configuration shown in FIGS. 35 and 36, at least one of the two or more beds at a given circumferential position in each of the two bed rings 44A and 44B, or 44B and 44C in each ring pair (the first ring pair, formed by bed rings 44A and 44B and the second ring pair formed by bed rings 44B and 44C) experience flow in the same axial direction.

Figure 37:
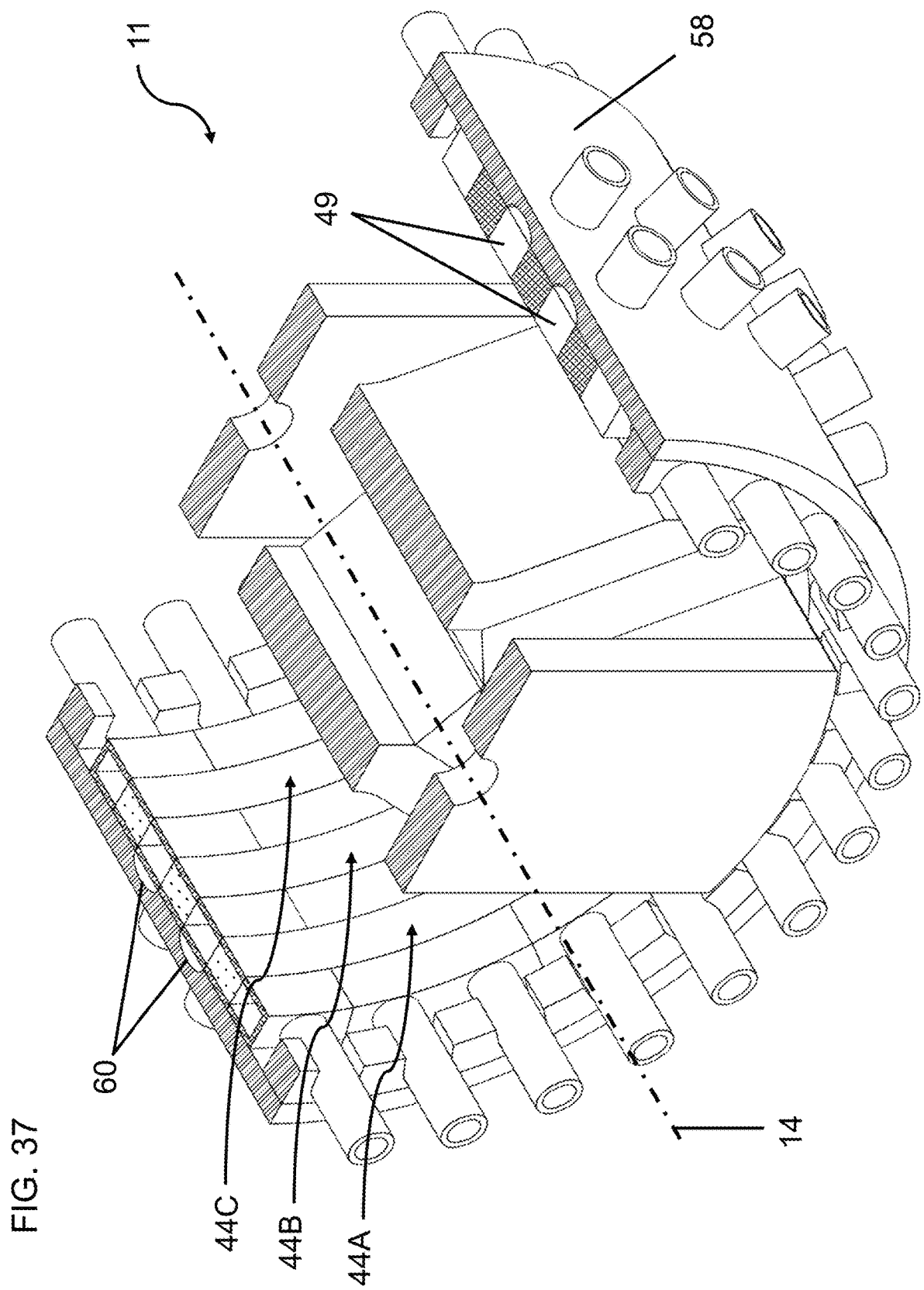
FIG. 37 is an isometric view of an MR apparatus having three bed rings and a modified circumferential flux return, at a cross-section through the low field region of the gap, along a symmetry plane that is parallel to the central axis, in accordance with an illustrative embodiment.
Figure 38:
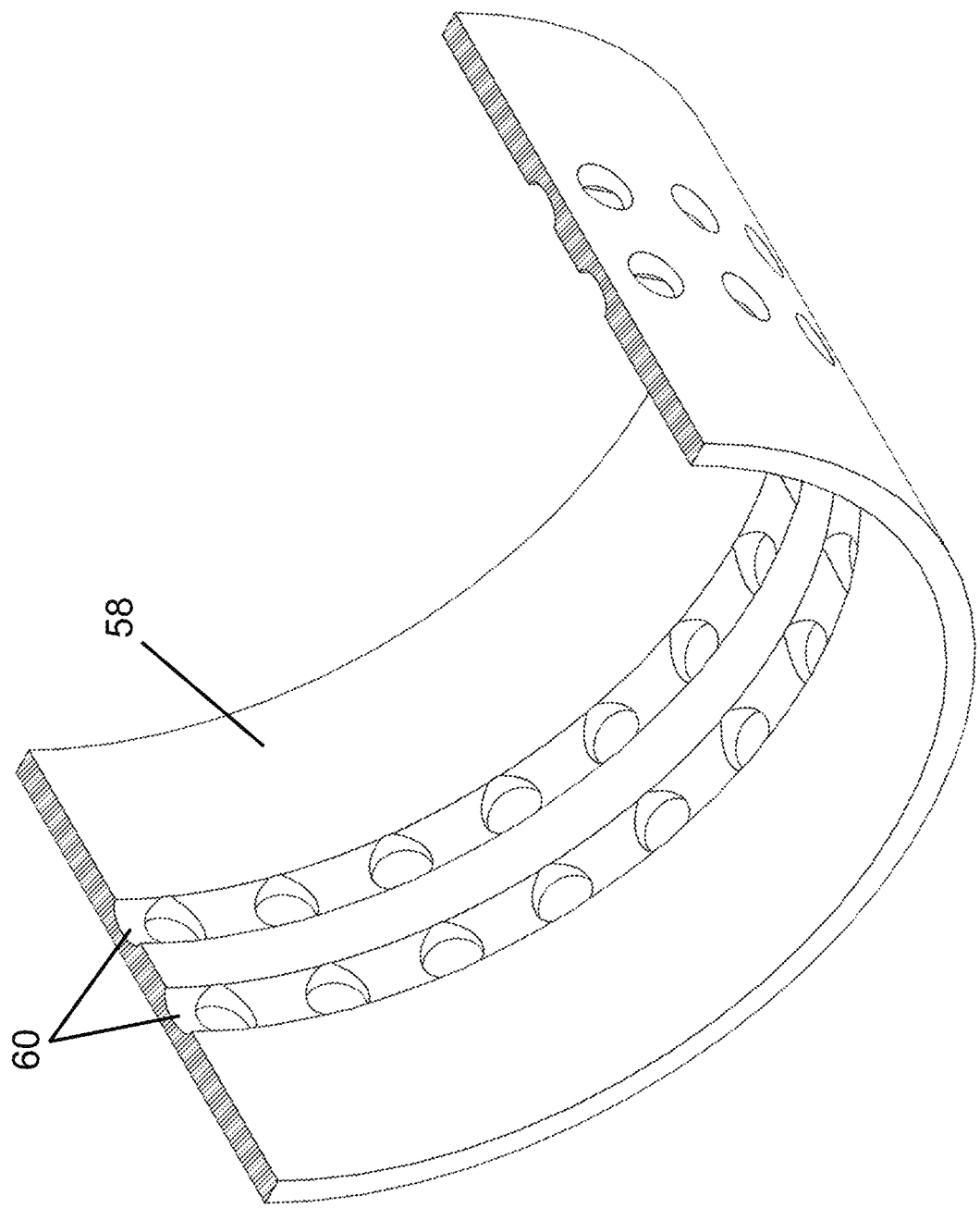
FIG. 38 is an isometric view of a circumferential flux return from the MR apparatus of FIG. 37 at a cross-section along a symmetry plane that is parallel to the central axis, in accordance with an illustrative embodiment.

FIG. 37 generally depicts an MR apparatus 11 that is similar to the three-drum embodiment wherein surface features are added to the bed facing surface(s) of the OFR 58 at several different axial positions along the length of the OFR 58. As shown in FIG. 38, these surface features take the form of continuous circumferential grooves 60 although a variety of other shapes are contemplated. As shown in FIG. 37, these grooves 60 are located at axial positions that are substantially aligned with the shared fluid plena 49 between bed rings 44A, 44B, 44C. In other words, there exists a plane normal to the central axis 14 that passes through both a groove 60 and the shared fluid plena 49. These grooves increase the reluctance of the magnetic circuit in regions of the gap that are not occupied by bed rings 44A, 44B, 44C to reduce flux leakage, which increases the mass efficiency of the permanent magnet material. A similar reduction in the magnetic flux leakage can be achieved by introducing surface features into other magnetic circuit components, which include: pole pieces, magnets, and flux return pieces in the MR apparatus 11. For example, the magnetic flux leakage could alternatively be reduced by introducing surface features into the gap facing surfaces of a pole piece 560A (FIG. 29) at the outer radius of the pole piece.

Specific compositions and methods of a drum-type magnetic refrigeration apparatus have been disclosed although many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes" and "comprises" and associated variants should be interpreted as referring to elements, components, or steps in a non-exclusive manner, indicating that the referenced elements, components, or steps may be present, or utilized, or combined with other elements, components, or steps that are not expressly referenced.

What is claimed is:

1. A magnetic refrigeration (MR) apparatus, comprising:
   a heat transfer fluid;
   one or more hot side heat exchangers (HHEXs);
   two or more bed rings that each comprise two or more beds of magnetocaloric material (MCM) arranged along a circumferential direction, wherein a first bed ring of the two or more bed rings and a second bed ring of the two or more bed rings form a ring pair, wherein a first bed of the first bed ring is at the same circumferential position as a second bed of the second bed ring;
   one or more pumps or fluid displacement devices configured to move the heat transfer fluid through the one or more HHEXs and the two or more beds;
   a magnetic-field source that applies a time-varying magnetic field oriented in a substantially radial direction through a gap containing the two or more bed rings via relative rotation of the magnetic-field source with respect to the two or more bed rings about a central axis, wherein the time-varying magnetic field is shared between at least two of the two or more bed rings; and
   a shared fluid conduit engaged with and extending between an axial end of the first bed in the first bed ring and an axial end of the second bed in the second bed ring, the shared fluid conduit defining a shared fluid plenum that fluidly couples the first bed to the second bed.

2. The MR apparatus according to claim 1, wherein the heat transfer fluid passes into or out of the shared fluid conduit in the substantially radial direction.

3. The MR apparatus according to claim 1, wherein the heat transfer fluid passes in the substantially radial direction through a connection between the fluid plenum and one or more flow tubes.

4. The MR apparatus according to claim 1, wherein one or more beds at a first circumferential position in the first bed ring experiences flow in a positive axial direction parallel to the central axis and, simultaneously, one or more beds at the first circumferential position in the second bed ring experiences flow in a negative axial direction.

5. The MR apparatus according to claim 1, wherein one or more beds at a given circumferential position in the first bed ring experiences flow in a same axial direction as one or more beds at a corresponding circumferential position in the second bed ring, wherein each bed ring comprises a first end that is fluidly connected to one or more HHEXs and a second end that is fluidly connected to one or more cold side heat exchangers (CHEXs), and wherein the first end of a bed ring nearest an axial end of the MR apparatus faces toward the axial end of the MR apparatus and a second end of the bed ring faces toward the remaining bed rings.

6. The MR apparatus according to claim 1, wherein a length of the magnetic-field source in a direction parallel to the central axis is greater than a length of at least one of the two or more bed rings in a direction parallel to the central axis.

7. The MR apparatus according to claim 1, wherein a length of the magnetic-field source in a direction parallel to the central axis is greater than or equal to 1.5 times a length of at least one of the two or more bed rings in a direction parallel to the central axis.

8. The MR apparatus according to claim 1, wherein a length of the magnetic-field source in a direction parallel to the central axis is greater than or equal to 2 times a length of at least one of the two or more bed rings in a direction parallel to the central axis.

9. The MR apparatus according to claim 1, wherein the magnetic-field source comprises one or more poles, wherein each pole comprises a pole piece, a magnet, and a flux return piece, wherein a length of at least one of the pole piece, the magnet, and the flux return piece, in a direction parallel to the central axis, is greater than a length of at least one of the two or more bed rings in a direction parallel to the central axis.

10. The MR apparatus according to claim 1, wherein the magnetic-field source comprises one or more poles, wherein each pole comprises a pole piece, a magnet, and a flux return piece, wherein a length of at least one of the pole piece, the magnet, and the flux return piece, parallel to the central axis, is greater than or equal to 1.5 times a length of at least one of the two or more bed rings.

11. The MR apparatus according to claim 1, wherein the magnetic-field source comprises one or more poles, wherein each pole comprises a pole piece, a magnet, and a flux return piece, wherein a length of at least one of the pole piece, the magnet, and the flux return piece, parallel to the central axis, is greater than or equal to 2 times a length of at least one of the two or more bed rings.

12. The MR apparatus according to claim 1, further comprising one or more flow tubes that are connected to the shared fluid plenum.

13. A magnetic refrigeration (MR) apparatus comprising:
a heat transfer fluid;
one or more hot side heat exchangers (HHEXs);
two or more bed rings that each comprise two or more beds of magnetocaloric material (MCM) arranged along a circumferential direction, wherein a first bed ring of the two or more bed rings and a second bed ring of the two or more bed rings form a ring pair;
one or more pumps or fluid displacement devices configured to move the heat transfer fluid through the one or more HHEXs and the two or more beds;
one or more magnetic-field sources that apply a time-varying magnetic field oriented in a substantially radial direction through a gap containing the two or more bed rings via relative rotation of the one or more magnetic-field sources with respect to the two or more bed rings about a central axis, wherein a first magnetic-field source of the one or more magnetic-field sources generates a single magnetic field that is shared between at least two of the two or more bed rings, the single magnetic field forming at least a portion of the time-varying magnetic field; and
a shared fluid conduit engaged with and extending between an axial end of at least one bed in the first bed ring and an axial end of at least one bed in the second bed ring, the shared fluid conduit defining a shared fluid plenum;
one or more circumferential flux returns that are located at an axial position along the central axis that is aligned with an axial position of at least one of the two or more bed rings; and
one or more radial through-hole passageways in at least one of the one or more circumferential flux returns,
wherein a dimension of the through-hole passageways in a direction that is parallel to the central axis is less than a dimension of the through-hole passageways in a substantially circumferential direction.

14. The MR apparatus according to claim 1, wherein the magnetic-field source comprises two or more permanent magnets, wherein a magnetization vector direction of at least one of the two or more permanent magnets is oriented in an axial direction relative to the central axis of the first magnetic-field source, and wherein the at least one of the two or more permanent magnets is located near an axial end of the magnetic-field source.

15. The MR apparatus according to claim 1, further comprising one or more valves that are configured to control the flow of the heat transfer fluid to at least one of the two or more bed rings; and one or more cold side heat exchangers (CHEXs).

16. The MR apparatus according to claim 1, wherein each of the two or more bed rings contain the same amount of MCM and each of the two or more bed rings are the same length in a direction of flow.

17. A method of transferring heat by an MR apparatus, the MR apparatus having a heat transfer fluid, one or more HHEXs, two or more bed rings that each comprise two or more beds of magnetocaloric material MCM arranged along a circumferential direction, one or more pumps or fluid displacement devices configured to move the heat transfer fluid through the one or more HHEXs and at least one of the beds, and a magnetic-field source that applies a time-varying magnetic field oriented in a substantially radial direction through a gap containing the two or more bed rings via relative rotation of the one or more magnetic-field source with respect to the two or more bed rings about a central axis, said method comprising:
passing the time-varying magnetic field that is generated by the magnetic-field source through at least two of the two or more bed rings;
passing the heat transfer fluid through a first bed in a first one of the two or more bed rings; and
passing the heat transfer fluid into a shared fluid conduit that is engaged with and extends between an axial end of at least one bed in the first bed ring and an axial end of at least one bed in the second bed ring, the at least one bed in the first bed ring disposed at the same circumferential position as the at least one bed in the second bed ring, the shared fluid conduit defining a shared fluid plenum that fluidly couples the at least one bed in the first bed ring to the at least one bed in the second bed ring.

18. The method of claim 17, further comprising passing the heat transfer fluid into or out of the shared fluid conduit in the substantially radial direction.

19. The method of claim 17, further comprising passing the heat transfer fluid in the substantially radial direction through a connection between the fluid plenum and one or more flow tubes; and passing magnetic flux that is provided by the magnetic-field source through the two or more bed rings simultaneously.

* * * * *